United States Patent
Yoneda et al.

(10) Patent No.: US 12,187,859 B2
(45) Date of Patent: Jan. 7, 2025

(54) PROCESS FOR PRODUCING AQUEOUS FLUOROPOLYMER DISPERSION

(71) Applicant: DAIKIN INDUSTRIES, LTD., Osaka (JP)

(72) Inventors: Satoru Yoneda, Osaka (JP); Masahiro Higashi, Osaka (JP); Sumi Ishihara, Osaka (JP); Hirotoshi Yoshida, Osaka (JP); Yohei Fujimoto, Osaka (JP); Yosuke Kishikawa, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 519 days.

(21) Appl. No.: 17/606,309

(22) PCT Filed: Apr. 27, 2020

(86) PCT No.: PCT/JP2020/018039
§ 371 (c)(1),
(2) Date: Oct. 25, 2021

(87) PCT Pub. No.: WO2020/218618
PCT Pub. Date: Oct. 29, 2020

(65) Prior Publication Data
US 2022/0213277 A1    Jul. 7, 2022

(30) Foreign Application Priority Data
Apr. 26, 2019   (JP) ................. 2019-085977

(51) Int. Cl.
*C08J 3/05*  (2006.01)
*C08F 114/26*  (2006.01)

(52) U.S. Cl.
CPC ........... *C08J 3/05* (2013.01); *C08F 114/26* (2013.01); *C08J 2327/18* (2013.01)

(58) Field of Classification Search
CPC ......... C08J 3/05; C08J 2327/18; C08F 114/26
See application file for complete search history.

(56) References Cited

U.S. PATENT DOCUMENTS

| | | | |
|---|---|---|---|
| 4,369,266 A * | 1/1983 | Kuhls | B01D 61/58 528/502 A |
| 2004/0171736 A1 | 9/2004 | Dadalas et al. | |
| 2004/0186219 A1 | 9/2004 | Dadalas et al. | |
| 2005/0189299 A1 * | 9/2005 | Malvasi | B01J 41/04 210/683 |
| 2007/0149695 A1 | 6/2007 | Hintzer et al. | |
| 2008/0287599 A1 | 11/2008 | Dadalas et al. | |
| 2012/0116003 A1 | 5/2012 | Brothers et al. | |
| 2013/0131267 A1* | 5/2013 | Tsuda | C07C 59/135 562/514 |
| 2015/0148481 A1 | 5/2015 | Brothers et al. | |
| 2016/0122241 A1 | 5/2016 | Ieva et al. | |
| 2016/0122509 A1 | 5/2016 | Brothers et al. | |
| 2016/0228825 A1 | 8/2016 | Chan et al. | |
| 2017/0073435 A1 | 3/2017 | Brothers et al. | |
| 2020/0255551 A1 | 8/2020 | Taira et al. | |
| 2020/0291141 A1 | 9/2020 | Brothers et al. | |
| 2021/0108008 A1 | 4/2021 | Kato et al. | |
| 2021/0115224 A1 | 4/2021 | Kato et al. | |
| 2022/0002531 A1* | 1/2022 | Nanba | C08F 214/26 |

FOREIGN PATENT DOCUMENTS

| | | |
|---|---|---|
| EP | 0911357 A1 | 4/1999 |
| EP | 3885372 A1 | 9/2021 |
| JP | 2005-501956 A | 1/2005 |
| JP | 2005-200650 A | 7/2005 |
| JP | 2006-523758 A | 10/2006 |
| JP | 2007-332321 A | 12/2007 |
| JP | 2009-102490 A | 5/2009 |
| JP | 2009-521586 A | 6/2009 |
| JP | 2009-172830 A | 8/2009 |
| JP | 2013-166844 A | 8/2013 |
| JP | 2013-542308 A | 11/2013 |
| JP | 2014-224166 A | 12/2014 |
| JP | 2016-520732 A | 7/2016 |
| JP | 2016-534748 A | 11/2016 |
| JP | 2016-537499 A | 12/2016 |
| WO | 2018/181898 A1 | 10/2018 |
| WO | 2018/181904 A1 | 10/2018 |
| WO | 2019/031617 A1 | 2/2019 |

OTHER PUBLICATIONS

Sigma Triton X-100 (Year: 2024).*
International Preliminary Report on Patentability (with translation of the Written Opinion) dated Sep. 28, 2021, issued by the International Bureau in application No. PCT/JP2020/018039.
Extended European Search Report dated Dec. 6, 2022 from the European Patent Office in EP Application No. 20795569.1.
International Search Report for PCT/JP2020/018039 dated Jul. 28, 2020 (PCT/ISA/210).

* cited by examiner

*Primary Examiner* — Robert S Jones, Jr.
*Assistant Examiner* — Jiangtian Xu
(74) *Attorney, Agent, or Firm* — Sughrue Mion, PLLC

(57) ABSTRACT

A method for producing a fluoropolymer aqueous dispersion, including a step A of subjecting a pre-treatment aqueous dispersion containing a fluoropolymer obtained by polymerization in the presence of a hydrocarbon surfactant to ultrafiltration, microfiltration, or dialysis membrane treatment, or a combination thereof. The ultrafiltration is performed using an ultrafiltration membrane having a molecular weight cutoff of $0.3 \times 10^4$ Da or more.

10 Claims, No Drawings

PROCESS FOR PRODUCING AQUEOUS FLUOROPOLYMER DISPERSION

CROSS REFERENCE TO RELATED APPLICATIONS

This application is a National Stage of International Application No. PCT/JP2020/018039 filed Apr. 27, 2020, claiming priority based on Japanese Patent Application No. 2019-085977 filed Apr. 26, 2019.

TECHNICAL FIELD

The present disclosure relates to a method for producing a fluoropolymer aqueous dispersion.

BACKGROUND ART

Fluorine-containing anionic surfactants have been used in production of fluoropolymer aqueous dispersion by emulsion polymerization. Recently, it has been proposed to use hydrocarbon surfactants instead of the fluorine-containing anionic surfactant.

For example, Patent Document 1 discloses a method for polymerizing fluoromonomer to form a dispersion of fluoropolymer particles in an aqueous medium in a polymerization reactor comprising an initial period and a stabilization period subsequent to the initial period, wherein the initial period comprises: preparing an initial dispersion of fluoropolymer particles in the aqueous medium in the polymerization reactor, and the stabilization period comprises: polymerizing fluoromonomer in the polymerization reactor, and adding hydrocarbon-containing surfactant to the polymerization reactor, wherein during the stabilization period no fluorosurfactant is added.

In addition, Patent Document 2 discloses that ultrafiltration is used for concentration to increase the amount of fluoropolymer solids in a dispersion system containing an ammonium salt of perfluorooctanoic acid obtained by emulsion polymerization.

RELATED ART

Patent Documents

Patent Document 1: National Publication of International Patent Application No. 2013-542308
Patent Document 2: National Publication of International Patent Application No. 2006-523758

SUMMARY OF THE INVENTION

Problem to be Solved by the Invention

The present disclosure provides a method for producing a fluoropolymer aqueous dispersion with reduced coloration.

Means for Solving the Problem

The present disclosure provides method for producing a fluoropolymer aqueous dispersion, including a step A of subjecting a pre-treatment aqueous dispersion containing a fluoropolymer obtained by polymerization in the presence of a hydrocarbon surfactant to ultrafiltration, microfiltration, or dialysis membrane treatment, or a combination thereof.

The step A is preferably performed at a temperature of 3° C. or higher.

The ultrafiltration is preferably performed using an ultrafiltration membrane having a molecular weight cutoff of $0.3 \times 10^4$ Da or more, more preferably an ultrafiltration membrane having a molecular weight cutoff of $3.0 \times 10^4$ Da or more, still more preferably an ultrafiltration membrane having a molecular weight cutoff of $5.0 \times 10^4$ Da or more, and particularly preferably an ultrafiltration membrane having a molecular weight cutoff of $8.0 \times 10^4$ Da or more.

Further, the ultrafiltration is preferably performed at a pressure of 0.01 MPa or higher.

The microfiltration is preferably performed at a pressure of 0.01 MPa or higher.

The production method of the present disclosure preferably includes a step B of adding a hydrocarbon surfactant to the pre-treatment aqueous dispersion before the step A. The hydrocarbon surfactant added in the step B is preferably a nonionic surfactant, and more preferably at least one nonionic surfactant selected from the group consisting of a compound represented by the following general formula (i):

$$R^3\text{—O-A}^1\text{-H} \qquad (i)$$

wherein $R^3$ is a linear or branched primary or secondary alkyl group having 8 to 18 carbon atoms, and $A^1$ is a polyoxyalkylene chain, and a compound represented by the following general formula (ii):

$$R^4\text{—C}_6\text{H}_4\text{—O-A}^2\text{-H} \qquad (ii)$$

wherein $R^4$ is a linear or branched primary or secondary alkyl group having 4 to 12 carbon atoms, and $A^2$ is a polyoxyalkylene chain.

The fluoropolymer is preferably polytetrafluoroethylene.

Effects of Invention

The production method of the present disclosure allows to obtain a fluoropolymer aqueous dispersion with reduced coloration.

DESCRIPTION OF EMBODIMENTS

Before the production method of the present disclosure is specifically described, several terms used herein are defined or described.

The fluororesin as used herein means a partially crystalline fluoropolymer which is a fluoroplastic. The fluororesin has a melting point and has thermoplasticity, and may be either melt-fabricable or non melt-processible.

The melt-fabricable as used herein means that a polymer has an ability to be processed in a molten state using a conventional processing device such as an extruder or an injection molding machine. Thus, a melt-fabricable fluororesin usually has a melt flow rate of 0.01 to 500 g/10 min as measured by the measurement method to be described later.

The fluoroelastomer as used herein means an amorphous fluoropolymer. The term "amorphous" means that a fluoropolymer has a melting peak (ΔH) of 4.5 J/g or lower as determined by differential scanning calorimetry (DSC) (temperature-increasing rate: 10° C./min) or differential thermal analysis (DTA) (temperature-increasing rate: 10° C./min). The fluoroelastomer exhibits elastomeric characteristics when crosslinked. The elastomeric characteristics mean that a polymer has an ability to be stretched and to retain its original length when the force required to stretch the polymer is no longer applied.

The partially fluorinated elastomer as used herein means a fluoropolymer containing a fluoromonomer unit, having a perfluoromonomer unit content of less than 90 mol % based on all polymerized units, having a glass transition temperature of 20° C. or lower, and having a melting peak (ΔH) of 4.5 J/g or lower.

As used herein, the term "perfluororubber (perfluoroelastomer)" refers to a fluoropolymer having a perfluoromonomer unit content of 90 mol % or more based on the total polymerization unit, having a glass transition temperature of 20° C. or lower and a melting peak (ΔH) of 4.5 J/g or less, and further having a concentration of fluorine atoms contained in the fluoropolymer of 71% by mass or more. The fluorine atom concentration in the fluoropolymer as used herein is the concentration (% by mass) of the fluorine atoms contained in the fluoropolymer calculated based on the type and content of each monomer constituting the fluoropolymer.

The perfluoromonomer as used herein means a monomer free from a carbon-hydrogen bond in the molecule. The perfluoromonomer may be a monomer containing carbon atoms and fluorine atoms in which some of the fluorine atoms bonded to any of the carbon atoms are replaced by chlorine atoms, and may be a monomer containing a nitrogen atom, an oxygen atom, a sulfur atom, a phosphorus atom, a boron atom, or a silicon atom in addition to the carbon atoms. The perfluoromonomer is preferably a monomer in which all hydrogen atoms are replaced by fluorine atoms. The perfluoromonomer does not encompass a monomer that provides a crosslinking site.

The monomer that provides a crosslinking site is a monomer (cure-site monomer) having a crosslinkable group that provides the fluoropolymer with a crosslinking site for forming a crosslink with the curing agent.

The polytetrafluoroethylene (PTFE) as used herein is preferably a fluoropolymer having a tetrafluoroethylene content of 99 mol % or more based on all polymerized units.

The fluororesin other than polytetrafluoroethylene and the fluoroelastomer as used herein are each preferably a fluoropolymer having a tetrafluoroethylene content of less than 99 mol % based on all polymerized units.

The content of each monomer constituting the fluoropolymer can be calculated herein by any appropriate combination of NMR, FT-IR, elemental analysis, and X-ray fluorescence analysis in accordance with the type of the monomer.

The term "organic group" as used herein means a group containing one or more carbon atoms or a group obtainable by removing one hydrogen atom from an organic compound.

Examples of the "organic group" include:
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents,
a heteroaryl group optionally having one or more substituents,
a cyano group,
a formyl group,
$R^aO—$,
$R^aCO—$,
$R^aSO_2—$,
$R^aCOO—$,
$R^aNRaCO—$,
$R^aCONRa—$,
$R^aOCO—$,
$R^aOSO_2—$, and
$R^aNRbSO_2—$,
wherein each $R^a$ is independently
an alkyl group optionally having one or more substituents,
an alkenyl group optionally having one or more substituents,
an alkynyl group optionally having one or more substituents,
a cycloalkyl group optionally having one or more substituents,
a cycloalkenyl group optionally having one or more substituents,
a cycloalkadienyl group optionally having one or more substituents,
an aryl group optionally having one or more substituents,
an aralkyl group optionally having one or more substituents,
a non-aromatic heterocyclic group optionally having one or more substituents, or
a heteroaryl group optionally having one or more substituents, and
each $R^b$ is independently H or an alkyl group optionally having one or more substituents.

The organic group is preferably an alkyl group optionally having one or more substituents.

The term "substituent" as used herein means a group capable of replacing another atom or group. Examples of the "substituent" include an aliphatic group, an aromatic group, a heterocyclic group, an acyl group, an acyloxy group, an acylamino group, an aliphatic oxy group, an aromatic oxy group, a heterocyclic oxy group, an aliphatic oxycarbonyl group, an aromatic oxycarbonyl group, a heterocyclic oxycarbonyl group, a carbamoyl group, an aliphatic sulfonyl group, an aromatic sulfonyl group, a heterocyclic sulfonyl group, an aliphatic sulfonyloxy group, an aromatic sulfonyloxy group, a heterocyclic sulfonyloxy group, a sulfamoyl group, an aliphatic sulfonamide group, an aromatic sulfonamide group, a heterocyclic sulfonamide group, an amino group, an aliphatic amino group, an aromatic amino group, a heterocyclic amino group, an aliphatic oxycarbonylamino group, an aromatic oxycarbonylamino group, a heterocyclic oxycarbonylamino group, an aliphatic sulfinyl group, an aromatic sulfinyl group, an aliphatic thio group, an aromatic thio group, a hydroxy group, a cyano group, a sulfo group, a carboxy group, an aliphatic oxyamino group, an aromatic oxyamino group, a carbamoylamino group, a sulfamoyl amino group, a halogen atom, a sulfamoyl carbamoyl group, a carbamoyl sulfamoyl group, a dialiphatic oxyphosphinyl group, and a diaromatic oxyphosphinyl group.

The aliphatic group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic group include alkyl groups having 1 to 8, preferably 1 to 4 carbon atoms in total, such as a methyl group, an ethyl group, a vinyl group, a cyclohexyl group, and a carbamoylmethyl group.

The aromatic group may have, for example, a nitro group, a halogen atom, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic group include aryl groups having 6 to 12 carbon atoms, preferably 6 to 10 carbon atoms in total, such as a phenyl group, a 4-nitrophenyl group, a 4-acetylaminophenyl group, and a 4-methanesulfonylphenyl group.

The heterocyclic group may have a halogen atom, a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the heterocyclic group include 5- or 6-membered heterocyclic groups having 2 to 12, preferably 2 to 10 carbon atoms in total, such as a 2-tetrahydrofuryl group and a 2-pyrimidyl group.

The acyl group may have an aliphatic carbonyl group, an arylcarbonyl group, a heterocyclic carbonyl group, a hydroxy group, a halogen atom, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the acyl group include acyl groups having 2 to 8, preferably 2 to 4 carbon atoms in total, such as an acetyl group, a propanoyl group, a benzoyl group, and a 3-pyridinecarbonyl group.

The acylamino group may have an aliphatic group, an aromatic group, a heterocyclic group, or the like, and may have, for example, an acetylamino group, a benzoylamino group, a 2-pyridinecarbonylamino group, a propanoylamino group, or the like. Examples of the acylamino group include acylamino groups having 2 to 12, preferably 2 to 8 carbon atoms in total, and alkylcarbonylamino groups having 2 to 8 carbon atoms in total, such as an acetylamino group, a benzoylamino group, a 2-pyridinecarbonylamino group, and a propanoylamino group.

The aliphatic oxycarbonyl group may be saturated or unsaturated, and may have a hydroxy group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic oxycarbonyl group include alkoxycarbonyl groups having 2 to 8, preferably 2 to 4 carbon atoms in total, such as a methoxycarbonyl group, an ethoxycarbonyl group, and a (t)-butoxycarbonyl group.

The carbamoyl group may have an aliphatic group, an aromatic group, a heterocyclic group, or the like. Examples of the carbamoyl group include an unsubstituted carbamoyl group and alkylcarbamoyl groups having 2 to 9 carbon atoms in total, preferably an unsubstituted carbamoyl group and alkylcarbamoyl groups having 2 to 5 carbon atoms in total, such as a N-methylcarbamoyl group, a N,N-dimethylcarbamoyl group, and a N-phenylcarbamoyl group.

The aliphatic sulfonyl group may be saturated or unsaturated, and may have a hydroxy group, an aromatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aliphatic sulfonyl group include alkylsulfonyl groups having 1 to 6 carbon atoms in total, preferably 1 to 4 carbon atoms in total, such as methanesulfonyl group.

The aromatic sulfonyl group may have a hydroxy group, an aliphatic group, an aliphatic oxy group, a carbamoyl group, an aliphatic oxycarbonyl group, an aliphatic thio group, an amino group, an aliphatic amino group, an acylamino group, a carbamoylamino group, or the like. Examples of the aromatic sulfonyl group include arylsulfonyl groups having 6 to 10 carbon atoms in total, such as a benzenesulfonyl group.

The amino group may have an aliphatic group, an aromatic group, a heterocyclic group, or the like.

The acylamino group may have, for example, an acetylamino group, a benzoylamino group, a 2-pyridinecarbonylamino group, a propanoylamino group, or the like. Examples of the acylamino group include acylamino groups having 2 to 12 carbon atoms in total, preferably 2 to 8 carbon atoms in total, and more preferably alkylcarbonylamino groups having 2 to 8 carbon atoms in total, such as an acetylamino group, a benzoylamino group, a 2-pyridinecarbonylamino group, and a propanoylamino group.

The aliphatic sulfonamide group, aromatic sulfonamide group, and heterocyclic sulfonamide group may be, for example, a methanesulfonamide group, a benzenesulfonamide group, a 2-pyridinesulfonamide group, or the like.

The sulfamoyl group may have an aliphatic group, an aromatic group, a heterocyclic group, or the like. Examples of the sulfamoyl group include a sulfamoyl group, alkylsulfamoyl groups having 1 to 9 carbon atoms in total, dialkylsulfamoyl groups having 2 to 10 carbon atoms in total, arylsulfamoyl groups having 7 to 13 carbon atoms in total, and heterocyclic sulfamoyl groups having 2 to 12 carbon atoms in total, more preferably a sulfamoyl group, alkylsulfamoyl groups having 1 to 7 carbon atoms in total, dialkylsulfamoyl groups having 3 to 6 carbon atoms in total, arylsulfamoyl groups having 6 to 11 carbon atoms in total, and heterocyclic sulfamoyl groups having 2 to 10 carbon atoms in total, such as a sulfamoyl group, a methylsulfamoyl group, a N,N-dimethylsulfamoyl group, a phenylsulfamoyl group, and a 4-pyridinesulfamoyl group.

The aliphatic oxy group may be saturated or unsaturated, and may have a methoxy group, an ethoxy group, an i-propyloxy group, a cyclohexyloxy group, a methoxyethoxy group, or the like. Examples of the aliphatic oxy group include alkoxy groups having 1 to 8, preferably 1 to 6 carbon atoms in total, such as a methoxy group, an ethoxy group, an i-propyloxy group, a cyclohexyloxy group, and a methoxyethoxy group.

The aromatic amino group and the heterocyclic amino group each may have an aliphatic group, an aliphatic oxy group, a halogen atom, a carbamoyl group, a heterocyclic group ring-fused with the aryl group, and an aliphatic oxycarbonyl group, preferably an aliphatic group having 1 to 4 carbon atoms in total, an aliphatic oxy group having 1 to 4 carbon atoms in total, a halogen atom, a carbamoyl group having 1 to 4 carbon atoms in total, a nitro group, or an aliphatic oxycarbonyl group having 2 to 4 carbon atoms in total.

The aliphatic thio group may be saturated or unsaturated, and examples thereof include alkylthio groups having 1 to 8 carbon atoms in total, more preferably 1 to 6 carbon atoms in total, such as a methylthio group, an ethylthio group, a carbamoylmethylthio group, and a t-butylthio group.

The carbamoylamino group may have an aliphatic group, an aryl group, a heterocyclic group or the like. Examples of the carbamoylamino group include a carbamoylamino group, alkylcarbamoylamino groups having 2 to 9 carbon atoms in total, dialkylcarbamoylamino groups having 3 to 10 carbon atoms in total, arylcarbamoylamino groups having 7 to 13 carbon atoms in total, and heterocyclic carbamoylamino groups having 3 to 12 carbon atoms in total, preferably a carbamoylamino group, alkylcarbamoylamino groups having 2 to 7 carbon atoms in total, dialkylcarbamoylamino groups having 3 to 6 carbon atoms in total, arylcarbamoylamino groups having 7 to 11 carbon atoms in total, and heterocyclic carbamoylamino groups having 3 to 10 carbon atoms in total, such as a carbamoylamino group, a methylcarbamoylamino group, a N,N-dimethylcarbamoylamino group, a phenylcarbamoylamino group, and a 4-pyridinecarbamoylamino group.

The ranges expressed by the endpoints as used herein each include all numerical values within the range (for example, the range of 1 to 10 includes 1.4, 1.9, 2.33, 5.75, 9.98, and the like).

The phrase "at least one" as used herein includes all numerical values equal to or greater than 1 (e.g., at least 2, at least 4, at least 6, at least 8, at least 10, at least 25, at least 50, at least 100, and the like).

As used herein, ppm and ppb mean values obtained in terms of mass unless otherwise specified.

Next, the production method of the present disclosure will be specifically described.

The production method of the present disclosure includes a step A of subjecting a pre-treatment aqueous dispersion containing a fluoropolymer obtained by polymerization in the presence of a hydrocarbon surfactant to ultrafiltration, microfiltration, or dialysis membrane treatment, or a combination thereof.

An aqueous dispersion containing a fluoropolymer obtained by polymerization in the presence of a hydrocarbon surfactant may be colored. The production method of the present disclosure has been completed by finding that coloration can be significantly reduced by performing a specific treatment, that is, at least one of ultrafiltration, microfiltration, or dialysis membrane treatment, on the pre-treatment aqueous dispersion.

The ultrafiltration or microfiltration is not limited to the cross-flow method or the dead-end method, but the cross-flow method is preferable from the viewpoint of reducing clogging of the membrane.

The ultrafiltration can be performed using an ultrafiltration membrane. The ultrafiltration can be performed using, for example, an ultrafiltration apparatus having an ultrafiltration membrane, and a centrifugal ultrafiltration method, a batch type ultrafiltration method, a circulation type ultrafiltration method, or the like can be adopted.

The molecular weight cutoff of the ultrafiltration membrane is usually about $0.1 \times 10^4$ to $30 \times 10^4$ Da. The ultrafiltration membrane preferably has a molecular weight cutoff of $0.3 \times 10^4$ Da or more because clogging of the membrane can be suppressed and coloration can be efficiently reduced. The molecular weight cutoff is more preferably $0.5 \times 10^4$ Da or more, still more preferably $1.0 \times 10^4$ Da or more, further preferably $1.5 \times 10^4$ Da or more, still further preferably $2.0 \times 10^4$ Da or more, particularly preferably $3.0 \times 10^4$ Da or more, and most preferably $5.0 \times 10^4$ Da or more. The molecular weight cutoff may be $8.0 \times 10^4$ Da or more.

The molecular weight cutoff is preferably $20 \times 10^4$ Da or less, and more preferably $10 \times 10^4$ Da or less, from the viewpoint of reducing coloration.

The molecular weight cutoff of the ultrafiltration membrane may be, for example, a molecular weight at which 90% of water can be blocked when polystyrene having a known weight-average molecular weight is passed through the membrane. The quantification of polystyrene can be performed using gel permeation chromatography.

The ultrafiltration membrane preferably has an effective membrane area of 0.01 to 50 m². The effective membrane area is more preferably 0.012 m² or more, still more preferably 0.015 m² or more, and more preferably 45 m² or less, still more preferably 40 m² or less.

Examples of the shape of the ultrafiltration membrane include, but are not limited to, conventionally known ones, and examples thereof include a hollow fiber type, a flat membrane type, a spiral type, and a tubular type. From the viewpoint of suppressing clogging, the hollow fiber type is preferable.

The inner diameter of the hollow fiber type ultrafiltration membrane is not limited, and may be, for example, 0.1 to 2 mm. Preferably, the inner diameter is 0.8 to 1.4 mm.

The length of the hollow fiber type ultrafiltration membrane is not limited, and may be, for example, 0.05 to 3 m. Preferably, the length is 0.05 to 2 mm.

The material of the ultrafiltration membrane is not limited, and examples thereof include organic materials such as cellulose, cellulose ester, polysulfone, sulfonated polysulfone, polyether sulfone, sulfonated polyether sulfone, chlorinated polyethylene, polypropylene, polyolefin, polyvinyl alcohol, polymethyl methacrylate, polyacrylonitrile, polyvinylidene fluoride, and polytetrafluoroethylene; metals such as stainless steel; and inorganic materials such as ceramics.

The material of the ultrafiltration membrane is preferably an organic material, more preferably chlorinated polyethylene, polypropylene, polyvinylidene fluoride, polytetrafluoroethylene, polyacrylonitrile, polysulfone, or polyethersulfone, and still more preferably polyacrylonitrile or polyvinylidene fluoride.

Specific examples of the ultrafiltration membrane include Type G-5, Type G-10, Type G-20, Type G-50, Type PW and Type HWS UF, manufactured by DESAL; HFM-180, HFM-183, HFM-251, HFM-300, HFM-116, HFM-183, HFM-300, HFK-131, HFK-328, MPT-U20, MPS-U20P and MPS-U20S, manufactured by KOCH; SPE1, SPE3, SPE5, SPE10, SPE30, SPV5, SPV50 and SOW30, manufactured by Synder; products of Microza® UF series, manufactured by Asahi Kasei Corporation; and NTR7410, manufactured by NITTO DENKO CORPORATION.

From the viewpoint of reducing coloration, the ultrafiltration is preferably performed at a pressure (water pressure) of 0.01 MPa or higher. The pressure is more preferably 0.03 MPa or higher, and still more preferably 0.05 MPa or higher. Further, the pressure is preferably 0.5 MPa or lower, more preferably 0.25 MPa or lower, and still more preferably 0.2 MPa or lower from the viewpoint of pressure resistance.

The microfiltration can be performed using a microfiltration membrane. The microfiltration membrane typically has an average pore diameter of 0.05 to 1.0 μm.

Since the microfiltration membrane can efficiently reduce coloration, the average pore diameter is preferably 0.075 μm or more, more preferably 0.1 μm or more, still more preferably 0.10 μm or more, and particularly preferably 0.15 μm or more. Further, the average pore diameter is preferably 1.00 μm or less. The average pore diameter is more preferably 0.50 μm or less, and still more preferably 0.25 μm or less.

The average pore diameter of the microfiltration membrane can be measured in conformity with ASTM F316-03 (bubble point method).

The microfiltration membrane preferably has an effective membrane area of 0.01 to 50 m². The effective membrane area is more preferably 0.012 m² or more, still more preferably 0.015 m² or more, and more preferably 45 m² or less, still more preferably 40 m² or less.

Examples of the shape of the microfiltration membrane include, but are not limited to, conventionally known ones, and examples thereof include a hollow fiber type, a flat membrane type, a spiral type, and a tubular type. From the viewpoint of suppressing clogging, the hollow fiber type is preferable.

The inner diameter of the hollow fiber type ultrafiltration membrane is not limited, and may be, for example, 0.1 to 2 mm. Preferably, the inner diameter is 0.8 to 1.4 mm.

The length of the hollow fiber type ultrafiltration membrane is not limited, and may be, for example, 0.05 to 3 m. Preferably, the length is 0.05 to 2 m.

Examples of the material of the microfiltration membrane include cellulose series, aromatic polyamide, polyvinyl alcohol, polysulfone, polyethersulfone, polyvinylidene fluoride, polyethylene, polyacrylonitrile, polypropylene, polycarbonate, polytetrafluoroethylene, ceramics and metals. Among these, aromatic polyamide, polyvinyl alcohol, polysulfone, polyvinylidene fluoride, polyethylene, polyacrylonitrile, polypropylene, polycarbonate or polytetrafluoroethylene is preferable, and polyacrylonitrile or polyvinylidene fluoride is particularly preferable.

Specific examples of the microfiltration membrane include Cefilt manufactured by NGK Insulators, Ltd.; Microza U series and Microza P series manufactured by Asahi Kasei Corporation; Poreflon SPMW, Poreflon OPMW, and Poreflon PM manufactured by Sumitomo Electric Industries, Ltd.; Trefil manufactured by Toray Industries, Inc.; NADIR MP005 and NADIR MV020 manufactured by MICRODYN-NADIR; and X-flow manufactured by Norit.

From the viewpoint of reducing coloration, the microfiltration is preferably performed at a pressure (water pressure) of 0.01 MPa or higher. The pressure is more preferably 0.03 MPa or higher, and still more preferably 0.05 MPa or higher. Further, the pressure is preferably 0.5 MPa or lower, more preferably 0.25 MPa or lower, and still more preferably 0.2 MPa or lower from the viewpoint of pressure resistance.

The dialysis membrane treatment is performed using a dialysis membrane. The dialysis membrane usually has a molecular weight cutoff of $0.05 \times 10^4$ to $100 \times 10^4$ Da.

The dialysis membrane preferably has a molecular weight cutoff of $0.3 \times 10^4$ Da or more because clogging of the membrane can be suppressed and coloration can be efficiently reduced. The molecular weight cutoff is more preferably $0.5 \times 10^4$ Da or more, still more preferably $1.0 \times 10^4$ Da or more, further preferably $1.5 \times 10^4$ Da or more, still further preferably $2.0 \times 10^4$ Da or more, particularly preferably $3.0 \times 10^4$ Da or more, and most preferably $5.0 \times 10^4$ Da or more. The molecular weight cutoff may be $8.0 \times 10^4$ Da or more.

The molecular weight cutoff is preferably $20 \times 10^4$ Da or less, and more preferably $10 \times 10^4$ Da or less, from the viewpoint of reducing coloration.

The molecular weight cutoff of the dialysis membrane can be measured, for example, by the same method as that for the ultrafiltration membrane.

The material of the dialysis membrane is not limited, and examples thereof include polyethylene, cellulose, polyacrylonitrile, polymethylmethacrylate, ethylene vinyl alcohol copolymer, polysulfone, polyamide, and polyester polymer alloy.

Specific examples of the dialysis membrane include Spectra/Por® Float-A-Lyzer, Tube-A-Lyzer, Dialysis tubing, 6 Dialysis tubing, and 7 Dialysis tubing, manufactured by Spectrum Laboratories, Inc.

The step A (the ultrafiltration, microfiltration, or dialysis membrane treatment) is preferably performed at a temperature of 3° C. or higher. The temperature is more preferably 5° C. or higher, still more preferably 7° C. or higher, and particularly preferably 10° C. or higher. Coloring can be further reduced by setting the temperature within the above range. The temperature is preferably 80° C. or lower, more preferably 78° C. or lower, still more preferably 75° C. or lower, and particularly preferably 70° C. or lower.

The time for the ultrafiltration, microfiltration, or dialysis membrane treatment is not limited, and is preferably 30 minutes or more, and more preferably 60 minutes or more. Further, the time is preferably 7200 minutes or less, and more preferably 4320 minutes or less.

The treatment amount in the ultrafiltration, microfiltration, or dialysis membrane treatment is not limited, and is preferably 0 001 L/min or more, and more preferably 001 L/min or more. Further, the treatment amount is preferably 100 L/min or less, and more preferably 50 L/min or less.

The ultrafiltration, microfiltration or dialysis membrane treatment may be performed once or repeated a plurality of times, respectively. For example, the treatment may be performed once or more, twice or more, or three or more times. Further, the treatment may be performed 10 times or less.

The ultrafiltration, microfiltration and dialysis membrane treatment may also be performed in combination. For example, the ultrafiltration and microfiltration may be performed in combination, the ultrafiltration and dialysis membrane treatment may be performed in combination, the microfiltration and dialysis membrane treatment may be performed in combination, the ultrafiltration, microfiltration, and dialysis membrane treatment may be performed in combination.

Among the ultrafiltration, microfiltration or dialysis membrane treatment, ultrafiltration or microfiltration is preferable, and microfiltration is more preferable.

The step A is particularly preferably performed at a pressure of 0.01 MPa or higher and 3 to 80° C. using an ultrafiltration membrane having a molecular weight cutoff of $1.0 \times 10^4$ Da or more. The molecular weight cutoff is more preferably $3.0 \times 10^4$ Da or more, and still more preferably $5.0 \times 10^4$ Da or more.

In the method for producing a fluoropolymer aqueous dispersion of the present disclosure, a step of adding water to a pre-treatment aqueous dispersion and a step of adjusting the pH of the pre-treatment aqueous dispersion by adding a pH adjuster may be performed while performing ultrafiltration, microfiltration, or dialysis membrane treatment.

The step A may include a step of adding water to the pre-treatment aqueous dispersion, and the water may be added stepwise or continuously. Further, a step of adding a pH adjuster to the pre-treatment aqueous dispersion may also be included.

The end point of the ultrafiltration, microfiltration or dialysis membrane treatment may be appropriately determined and is not limited. For example, the end point may be determined based on the color of the resulting fluoropolymer aqueous dispersion.

The pre-treatment aqueous dispersion contains a fluoropolymer obtained by polymerization in the presence of a hydrocarbon surfactant. The pre-treatment aqueous dispersion may be an aqueous dispersion as polymerized, may be a diluted or concentrated product of an aqueous dispersion as polymerized, or may be a dispersion stabilized product thereof.

From the viewpoint of reducing coloration, the pre-treatment aqueous dispersion preferably contains 70% by mass or less of the fluoropolymer, more preferably 40% by mass or less, and still more preferably 25% by mass or less. Further, from the viewpoint of treatment time, the content thereof is preferably 0.1% by mass or more, more preferably 1.0% by mass or more, and still more preferably 2.0% by mass or more.

The pre-treatment aqueous dispersion preferably has a pH of 1 to 10, more preferably 2 to 9, from the viewpoint of further reducing coloration. The pH can be adjusted using a pH adjuster. The pH adjuster may be an acid or an alkali, and examples thereof include phosphate, sodium hydroxide, potassium hydroxide, and aqueous ammonia.

The pre-treatment aqueous dispersion may be irradiated with ultraviolet rays. The irradiated ultraviolet rays preferably have a wavelength of 10 to 400 nm, and more preferably a wavelength of 100 to 280 nm.

It is also preferable that the production method of the present disclosure includes a step of irradiating the pre-treatment aqueous dispersion with ultraviolet rays before the step A.

The pre-treatment aqueous dispersion may be treated with an oxygen source. That is, it is also preferable that the production method of the present disclosure includes a step of adding an oxygen source to the pre-treatment aqueous dispersion before the step A. From the viewpoint of reducing coloration, the amount of the oxygen source added is preferably 2% by mass or more, more preferably 5% by mass or more, and still more preferably 10% by mass or more based on the pre-treatment aqueous dispersion. Further, from the viewpoint of safety, the amount thereof is preferably 30% by mass or less, and more preferably 20% by mass or less.

Examples of the oxygen source include air, oxygen-rich gas, ozone-containing gas, hydrogen peroxide, hypochlorous acid, and nitrite.

The pre-treatment aqueous dispersion contains the fluoropolymer and an aqueous medium. Further, the pre-treatment aqueous dispersion may also contain a hydrocarbon surfactant used in the polymerization, or a hydrocarbon surfactant may be added after the polymerization in addition to the hydrocarbon surfactant used in the polymerization.

The aqueous medium means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

The pre-treatment aqueous dispersion may have a lightness $L^*$ of 70 or less. Further, the lightness may be 80 or less or 90 or less.

The lightness $L^*$ is measured by an X-rite colorimeter.

The content of the hydrocarbon surfactant in the pre-treatment aqueous dispersion is preferably 0.0001 to 15% by mass based on the aqueous dispersion. When the amount of the dispersion stabilizer is less than 0.0001% by mass, the dispersion stability may deteriorate, and when the amount thereof is more than 15% by mass, dispersion effects commensurate with the amount thereof may not be obtained, which is impractical. The lower limit of the hydrocarbon surfactant is more preferably 0.001% by mass, while the upper limit thereof is more preferably 10% by mass, still more preferably 2% by mass.

The pre-treatment aqueous dispersion is obtained by polymerizing in the presence of a hydrocarbon surfactant. More specifically, the pre-treatment aqueous dispersion is obtained by polymerizing a fluoromonomer in an aqueous medium in the presence of a hydrocarbon surfactant. The production method of the present disclosure may include, before the step A, a step C of polymerizing a fluoromonomer in an aqueous medium in the presence of a hydrocarbon surfactant to obtain an aqueous dispersion containing a fluoropolymer (pre-treatment aqueous dispersion).

The fluoromonomer preferably has at least one double bond. The fluoromonomer is preferably at least one selected from the group consisting of tetrafluoroethylene (TFE), hexafluoropropylene (HFP), chlorotrifluoroethylene (CTFE), vinyl fluoride, vinylidene fluoride (VDF), trifluoroethylene, fluoroalkylvinyl ether, fluoroalkylethylene, fluoroalkyl allyl ether, trifluoropropylene, pentafluoropropylene, trifluorobutene, tetrafluoroisobutene, hexafluoroisobutene, fluoromonomers represented by the general formula (100): $CHX^{101}=CX^{102}Rf^{202}$ (wherein one of $X^{101}$ and $X^{102}$ is H and the other is F, and $Rf^{101}$ is a linear or branched fluoroalkyl group having 1 to 12 carbon atoms), fluorinated vinyl heterocyclic compounds, and monomers providing a crosslinking site.

The fluoroalkylvinyl ether is preferably at least one selected from the group consisting of a fluoromonomer represented by the general formula (110): $CF_2=CF-ORf^{111}$ wherein $Rf^{111}$ represents a perfluoroorganic group;

a fluoromonomer represented by the general formula (120): $CF_2=CF-OCH_2-Rf^{121}$ wherein $Rf^{121}$ is a perfluoroalkyl group having 1 to 5 carbon atoms;

a fluoromonomer represented by the general formula (130): $CF_2=CFOCF_2ORf^{131}$ wherein $Rf^{131}$ is a linear or branched perfluoroalkyl group having 1 to 6 carbon atoms, a cyclic perfluoroalkyl group having 5 to 6 carbon atoms, and a linear or branched perfluorooxyalkyl group having 2 to 6 carbon atoms and 1 to 3 oxygen atoms;

a fluoromonomer represented by the general formula (140): $CF_2=CFO(CF_2CF(Y^{141})O)_m(CF_2)_nF$ wherein $Y^{141}$ represents a fluorine atom or a trifluoromethyl group; m is an integer of 1 to 4; and n is an integer of 1 to 4; and a fluoromonomer represented by the general formula (150): $CF_2=CF-O-(CF_2CFY^{151}-O)_n-(CFY^{152})_m-A^{151}$ wherein $Y^{151}$ represents a fluorine atom, a chlorine atom, $-SO_2F$ group, or a perfluoroalkyl group; the perfluoroalkyl group may contain an etheric oxygen and $-SO_2F$ group; n represents an integer of 0 to 3; n $Y^{151}$ may be the same or different; $Y^{152}$ represents a fluorine atom, a chlorine atom, or a $-SO_2F$ group; m represents an integer of 1 to 5; m $Y^{152}$ may be the same or different; $A^{151}$ represents $-SO_2X^{151}$, $-COZ^{151}$ or $-POZ^{152}Z^{153}$; $X^{151}$ represents F, Cl, Br, I, $-OR^{151}$ or $-NR^{152}R^{153}$; $Z^{151}$, $Z^{152}$, and $Z^{153}$ are the same or different and represent $-ZR^{154}R^{155}$ or $-OR^{156}$; and $R^{151}$, $R^{152}$, $R^{153}$, $R^{154}$, $R^{155}$, and $R^{156}$ are the same or different and represent H, ammonium, an alkali metal, an alkyl group optionally containing a fluorine atom, an aryl group, or a sulfonyl-containing group.

The "perfluoroorganic group" as used herein means an organic group in which all hydrogen atoms bonded to the carbon atoms are replaced by fluorine atoms. The perfluoroorganic group optionally has ether oxygen.

Examples of the fluoromonomer represented by the general formula (110) include a fluoromonomer in which $Rf^{111}$ is a perfluoroalkyl group having 1 to 10 carbon atoms. The perfluoroalkyl group preferably has 1 to 5 carbon atoms.

Examples of the perfluoroorganic group in the general formula (110) include a perfluoromethyl group, a perfluoroethyl group, a perfluoropropyl group, a perfluorobutyl group, a perfluoropentyl group, and a perfluorohexyl group.

Examples of the fluoromonomer represented by the general formula (110) further include those represented by the general formula (110) in which $Rf^{111}$ is a perfluoro(alkoxyalkyl) group having 4 to 9 carbon atoms; those in which $Rf^{111}$ is a group represented by the following formula:

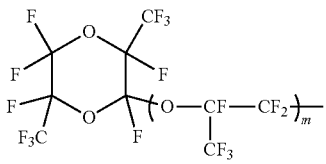

wherein m represents 0 or an integer of 1 to 4; and those in which $Rf^{111}$ is a group represented by the following formula:

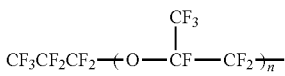

wherein n is an integer of 1 to 4.

Among the fluoromonomers represented by the general formula (110),
preferred is a fluoromonomer represented by the general formula (160): $CF_2=CF-ORf^{161}$
wherein $Rf^{161}$ represents a perfluoroalkyl group having 1 to 10 carbon atoms. $Rf^{161}$ is preferably a perfluoroalkyl group having 1 to 5 carbon atoms.

The fluoroalkyl vinyl ether is preferably at least one selected from the group consisting of fluoromonomers represented by the general formulas (160), (130), and (140).

The fluoromonomer represented by the general formula (160) is preferably at least one selected from the group consisting of perfluoro(methyl vinyl ether), perfluoro(ethyl vinyl ether), and perfluoro(propyl vinyl ether), and more preferably at least one selected from the group consisting of perfluoro(methyl vinyl ether) and perfluoro(propyl vinyl ether).

The fluoromonomer represented by the general formula (130) is preferably at least one selected from the group consisting of $CF_2=CFOCF_2OCF_3$, $CF_2=CFOCF_2OCF_2CF_3$, and $CF_2=CFOCF_2OCF_2CF_2OCF_3$.

The fluoromonomer represented by the general formula (140) is preferably at least one selected from the group consisting of $CF_2=CFOCF_2CF(CF_3)O(CF_2)_3F$, $CF_2=CFO(CF_2CF(CF_3)O)_2(CF_2)_3F$, and $CF_2=CFO(CF_2CF(CF_3)O)_2(CF_2)_2F$.

The fluoromonomer represented by the general formula (150) is preferably at least one selected from the group consisting of $CF_2=CFOCF_2CF_2SO_2F$, $CF_2=CFOCF_2CF(CF_3)OCF_2CF_2SO_2F$, $CF_2=CFOCF_2CF(CF_2CF_2SO_2F)OCF_2CF_2SO_2F$, and $CF_2=CFOCF_2CF(SO_2F)_2$.

The fluoromonomer represented by the general formula (100) is preferably a fluoromonomer in which $Rf^{101}$ is a linear fluoroalkyl group, and more preferably a fluoromonomer in which $Rf^{101}$ is a linear perfluoroalkyl group. $Rf^{101}$ preferably has 1 to 6 carbon atoms. Examples of the fluoromonomer represented by the general formula (100) include $CH_2=CFCF_3$, $CH_2=CFCF_2CF_3$, $CH_2=CFCF_2CF_2CF_3$, $CH_2=CFCF_2CF_2CF_2H$, $CH_2=CFCF_2CF_2CF_2CF_3$, $CHF=CHCF_3$ (E-form), and $CHF=CHCF_3$ (Z-form), among which preferred is 2,3,3,3-tetrafluoropropylene represented by $CH_2=CFCF_3$.

The fluoroalkylethylene is preferably
a fluoroalkylethylene represented by the general formula (170): $CH_2=CH-(CF_2)_n-X^{171}$
(wherein $X^{171}$ is H or F and n is an integer of 3 to 10), more preferably at least one selected from the group consisting of $CH_2=CH-C_4F_9$ and $CH_2=CH-C_6F_{13}$.

An example of the fluoroalkyl allyl ether is
a fluoromonomer represented by the general formula (180): $CF_2=CF-CF_2-ORf^{111}$
wherein $Rf^{111}$ represents a perfluoroorganic group.

$Rf^{111}$ of the general formula (180) is the same as $Rf^{111}$ of the general formula (110). $Rf^{111}$ is preferably a perfluoroalkyl group having 1 to 10 carbon atoms or a perfluoroalkoxyalkyl group having 1 to 10 carbon atoms. The fluoroalkyl allyl ether represented by the general formula (180) is preferably at least one selected from the group consisting of $CF_2=CF-CF_2-O-CF_3$, $CF_2=CF-CF_2-O-C_2F_5$, $CF_2=CF-CF_2-O-C_3F_7$, and $CF_2=CF-CF_2-O-C_4F_9$, more preferably at least one selected from the group consisting of $CF_2=CF-CF_2-O-C_2F_5$, $CF_2=CF-CF_2-O-C_3F_7$, and $CF_2=CF-CF_2-O-C_4F_9$, and still more preferably $CF_2=CF-CF_2-O-CF_2CF_2CF_3$.

An example of the fluorinated vinyl heterocyclic compound is a fluorinated vinyl heterocyclic compound represented by the general formula (230):

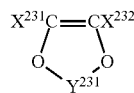

wherein $X^{231}$ and $X^{232}$ are each independently F, Cl, a methoxy group, or a fluorinated methoxy group; and $Y^{231}$ is represented by the formula $Y^{232}$ or $Y^{233}$:

wherein $Z^{231}$ and $Z^{232}$ are each independently F or a fluorinated alkyl group having 1 to 3 carbon atoms.

The monomer providing a crosslinking site is preferably at least one selected from the group consisting of:
a fluoromonomer represented by the general formula (180): $CX^{181}_2=CX^{182}-R_f^{181}CHR^{181}X^{183}$
wherein $X^{181}$ and $X^{182}$ are each independently a hydrogen atom, a fluorine atom, or $CH_3$, and $Rf^{181}$ is a fluoroalkylene group, a perfluoroalkylene group, a fluoro(poly)oxyalkylene group or a perfluoro(poly)oxyalkylene group, $R^{181}$ is a hydrogen atom or $CH_3$, and $X^{183}$ is an iodine atom or a bromine atom;
a fluoromonomer represented by the general formula (190): $CX^{191}_2=CX^{192}-R_f^{191}X^{193}$
wherein $X^{191}$ and $X^{192}$ are each independently a hydrogen atom, a fluorine atom, or $CH_3$, and $Rf^{191}$ is a fluoroalkylene group, a perfluoroalkylene group, a fluoropolyoxyalkylene group or a perfluoropolyoxyalkylene group, and $X^{193}$ is an iodine atom or a bromine atom;

a fluoromonomer represented by the general formula (200): $CF_2=CFO(CF_2CF(CF_3)O)_m(CF_2)_n—X^{201}$ wherein m is an integer of 0 to 5, n is an integer of 1 to 3, and $X^{201}$ is a cyano group, a carboxyl group, an alkoxycarbonyl group, an iodine atom, a bromine atom, or $—CH_2I$; and a fluoromonomer represented by the general formula (210): $CH_2=CFCF_2O(CF(CF_3)CF_2O)_m(CF(CF_3))_n—X^{211}$ wherein m is an integer of 0 to 5, n is an integer of 1 to 3, and $X^{211}$ is a cyano group, a carboxyl group, an alkoxycarbonyl group, an iodine atom, a bromine atom, or $—CH_2OH$; and a monomer represented by the general formula (220): $CR^{221}R^{222}=CR^{223}—Z^{221}—CR^{224}=CR^{225}R^{226}$ wherein $R^{221}$, $R^{222}$, $R^{223}$, $R^{224}$, $R^{225}$, and $R^{226}$ are the same or different and a hydrogen atom or an alkyl group having 1 to 5 carbon atoms; $Z^{221}$ is a linear or branched alkylene group having 1 to 18 carbon atoms and optionally having an oxygen atom, a cycloalkylene group having 3 to 18 carbon atoms, an at least partially fluorinated alkylene or oxyalkylene group having 1 to 10 carbon atoms, or a (per)fluoropolyoxyalkylene group which is represented by:

$-(Q)_p\text{-}CR_2O—(CF_2CF_2O)_m(CF_2O)_n—CF_2\text{-}(Q)_p\text{-}$ (wherein Q is an alkylene group or an oxyalkylene group; p is 0 or 1; and m/n is 0.2 to 5) and has a molecular weight of 500 to 10,000.

$X^{183}$ and $X^{193}$ are preferably an iodine atom. $R_f^{181}$ and $R_f^{191}$ are preferably a perfluoroalkylene group having 1 to 5 carbon atoms. $R^{181}$ is preferably a hydrogen atom. $X^{201}$ is preferably a cyano group, an alkoxycarbonyl group, an iodine atom, a bromine atom, or $—CH_2I$. $X^{211}$ is preferably a cyano group, an alkoxycarbonyl group, an iodine atom, a bromine atom, or $—CH_2OH$.

The monomer providing a crosslinking site is preferably at least one selected from the group consisting of $CF_2=CFOCF_2CF(CF_3)OCF_2CF_2CN$, $CF_2=CFOCF_2CF(CF_3)OCF_2CF_2COOH$, $CF_2=CFOCF_2CF(CF_3)OCF_2CF_2CH_2I$, $CF_2=CFOCF_2CF_2CH_2I$, $CH_2=CFCF_2OCF(CF_3)CF_2OCF(CF_3)CN$, $CH_2=CFCF_2OCF(CF_3)CF_2OCF(CF_3)COOH$, $CH_2=CFCF_2OCF(CF_3)CF_2OCF(CF_3)CH_2OH$, $CH_2=CHCF_2CF_2I$, $CH_2=CH(CF_2)_2CH=CH_2$, $CH_2=CH(CF_2)_6CH=CH_2$, and $CF_2=CFO(CF_2)_5CN$, and more preferably at least one selected from the group consisting of $CF_2=CFOCF_2CF(CF_3)OCF_2CF_2CN$ and $CF_2=CFOCF_2CF_2CH_2I$.

In the step C, the fluoromonomer and the fluorine-free monomer may be polymerized. Examples of the fluorine-free monomer include hydrocarbon monomers having reactivity with the fluoromonomer. Examples of the hydrocarbon monomer include alkenes such as ethylene, propylene, butylene and isobutylene; alkyl vinyl ethers such as ethyl vinyl ether, propyl vinyl ether, butyl vinyl ether, isobutyl vinyl ether and cyclohexyl vinyl ether; vinyl esters such as vinyl acetate, vinyl propionate, vinyl n-butyrate, vinyl isobutyrate, vinyl valerate, vinyl pivalate, vinyl caproate, vinyl caprylate, vinyl caprate, vinyl versatate, vinyl laurate, vinyl myristate, vinyl palmitate, vinyl stearate, vinyl benzoate, vinyl para-tert-butylbenzoate, vinyl cyclohexanecarboxylate, vinyl monochloroacetate, vinyl adipate, vinyl acrylate, vinyl methacrylate, vinyl crotonate, vinyl sorbate, vinyl cinnamate, vinyl undecylenate, vinyl hydroxyacetate, vinyl hydroxypropioate, vinyl hydroxybutyrate, vinyl hydroxyvalerate, hydroxyisobutyrate, and vinyl hydroxycyclohexanecarboxylate; alkyl allyl ethers such as ethyl allyl ether, propyl allyl ether, butyl allyl ether, isobutyl allyl ether, and cyclohexyl allyl ether; and alkyl allyl esters such as ethyl allyl ester, propyl allyl ester, butyl allyl ester, isobutyl allyl ester, and cyclohexyl allyl ester.

The fluorine-free monomer may also be a functional group-containing hydrocarbon monomer (excluding the monomer providing a crosslinking site). Examples of the functional group-containing hydrocarbon monomer include hydroxyalkyl vinyl ethers such as hydroxyethyl vinyl ether, hydroxypropyl vinyl ether, hydroxybutyl vinyl ether, hydroxyisobutyl vinyl ether, and hydroxycyclohexyl vinyl ether; fluorine-free monomers having a carboxyl group such as itaconic acid, succinic acid, succinic anhydride, fumaric acid, fumaric anhydride, crotonic acid, maleic acid, maleic anhydride, and perfluorobutenoic acid; fluorine-free monomers having a glycidyl group such as glycidyl vinyl ether and glycidyl allyl ether; fluorine-free monomers having an amino group such as aminoalkyl vinyl ether and aminoalkyl allyl ether; and fluorine-free monomers having an amide group such as (meth)acrylamide and methylol acrylamide.

In the step C, a pre-treatment aqueous dispersion containing particles of a desired fluoropolymer can be obtained by polymerizing one or two or more of the fluoromonomers.

The hydrocarbon surfactant used to obtain the aqueous dispersion containing the fluoropolymer may be, but not limited to, for example, those disclosed in National Publication of International Patent Application No. 2013-542308, National Publication of International Patent Application No. 2013-542309, and National Publication of International Patent Application No. 2013-542310.

The hydrocarbon surfactant may be a surfactant having a hydrophilic moiety and a hydrophobic on the same molecule. These may be cationic, nonionic or anionic.

Cationic hydrocarbon surfactants usually have a positively charged hydrophilic moiety such as alkylated ammonium halide such as alkylated ammonium bromide and a hydrophobic moiety such as long chain fatty acids.

Anionic hydrocarbon surfactants usually have a hydrophilic moiety such as a carboxylate, a sulfonate or a sulfate and a hydrophobic moiety that is a long chain hydrocarbon moiety such as alkyl.

Nonionic hydrocarbon surfactants are usually free from charged groups and have hydrophobic moieties that are long chain hydrocarbons. The hydrophilic moiety of the nonionic hydrocarbon surfactant contains water-soluble functional groups such as chains of ethylene ether derived from polymerization with ethylene oxide.

Examples of the nonionic hydrocarbon surfactant include a compound represented by the following general formula (i):

$$R^3—O\text{-}A^1\text{-}H \qquad (i)$$

wherein $R^3$ is a linear or branched primary or secondary alkyl group having 8 to 18 carbon atoms, and $A^1$ is a polyoxyalkylene chain.

$R^3$ preferably has 10 to 16, more preferably 12 to 16 carbon atoms. When $R^3$ has 18 or less carbon atoms, the aqueous dispersion tends to have good dispersion stability. Further, when $R^3$ has more than 18 carbon atoms, it is difficult to handle due to its high flowing temperature. When $R^3$ has less than 8 carbon atoms, the surface tension of the aqueous dispersion becomes high, so that the permeability and wettability are likely to decrease.

The polyoxyalkylene chain may be composed of oxyethylene and oxypropylene. The polyoxyalkylene chain is preferably a polyoxyalkylene chain composed of an average repeating number of 5 to 20 oxyethylene groups and an average repeating number of 0 to 2 oxypropylene groups, and is a hydrophilic group. The number of oxyethylene units may have either a broad or narrow monomodal distribution as typically supplied, or a broader or bimodal distribution which may be obtained by blending. When the average repeating number of oxypropylene groups is more than 0, the oxyethylene groups and oxypropylene groups in the polyoxyalkylene chain may be arranged in blocks or randomly.

From the viewpoint of viscosity and stability of the aqueous dispersion, the polyoxyalkylene chain is preferably a polyoxyalkylene chain composed of an average repeating number of 7 to 12 oxyethylene groups and an average repeating number of 0 to 2 oxypropylene groups. In particular, when $A^1$ has 0.5 to 1.5 oxypropylene groups on average, low foaming properties are good, which is preferable.

More preferably, $R^3$ is $(R')(R'')HC—$, where R' and R'' are the same or different linear, branched, or cyclic alkyl groups, and the total amount of carbon atoms is at least 5, preferably 7 to 17. Preferably, at least one of R' or R'' is a branched or cyclic hydrocarbon group.

Also, the cloud point of the nonionic surfactant is a measure of its solubility in water. The surfactant used in the aqueous dispersion of the present disclosure (nonionic surfactant used in the production method of the present disclosure (nonionic hydrocarbon surfactant)) has a cloud point of about 30° C. to about 90° C., preferably about 35° C. to about 85° C.

Specific examples of the compound represented by the general formula (i) (polyoxyethylene alkyl ether) include $C_{13}H_{27}—O—(C_2H_4O)_{10}—H$, $C_{13}H_{27}—O—(C_2H_4O)_8—H$, $C_{12}H_{25}—O—(C_2H_4O)_{10}—H$, $C_{10}H_{21}CH(CH_3)CH_2—O—(C_2H_4O)_9—H$, $C_{13}H_{27}—O—(C_2H_4O)_9—(CH(CH_3)CH_2O)—H$, $C_{16}H_{33}—O—(C_2H_4O)_{10}—H$, and $HC(C_5H_{11})(C_7H_{15})—O—(C_2H_4O)_9—H$. Examples of commercially available products of the compound represented by the general formula (i) (polyoxyethylene alkyl ether) include Genapol X080 (product name, manufactured by Clariant), NOIGEN TDS series (manufactured by DKS Co., Ltd.) exemplified by NOIGEN TDS-80 (trade name), LEOCOL TD series (manufactured by Lion Corp.) exemplified by LEOCOL TD-90 (trade name), LIONOL® TD series (manufactured by Lion Corp.), T-Det A series (manufactured by Harcros Chemicals Inc.) exemplified by T-Det A 138 (trade name), and TERGITOL® 15 S series (manufactured by Dow Chemical Co., Ltd.).

The nonionic surfactant is preferably an ethoxylate of 2,6,8-trimethyl-4-nonanol having about 4 to about 18 ethylene oxide units on average, an ethoxylate of 2,6,8-trimethyl-4-nonanol having about 6 to about 12 ethylene oxide units on average, or a mixture thereof. This type of nonionic surfactant is also commercially available, for example, as TERGITOL TMN-6, TERGITOL TMN-10, and TERGITOL TMN-100X (all product names, manufactured by Dow Chemical Co., Ltd.).

The hydrophobic group of the nonionic surfactant may be any of an alkylphenol group, a linear alkyl group, and a branched alkyl group.

Examples of the polyoxyethylene alkylphenyl ether-based nonionic compound include, for example, a compound represented by the following general formula (ii):

$$R^4—C_6H_4—O-A^2-H \quad (ii)$$

wherein $R^4$ is a linear or branched primary or secondary alkyl group having 4 to 12 carbon atoms, and $A^2$ is a polyoxyalkylene chain. Specific examples of the polyoxyethylene alkylphenyl ether-based nonionic compound include Triton® X-100 (trade name, manufactured by Dow Chemical Co., Ltd.).

Examples of the nonionic surfactant also include polyol compounds. Specific examples thereof include those described in International Publication No. WO2011/014715.

Typical examples of the polyol compound include compounds having one or more sugar units as polyol unit. The sugar units may have been modified to contain at least one long chain. Examples of suitable polyol compounds containing at least one long chain moiety include alkyl glycosides, modified alkyl glycosides, sugar esters, and combinations thereof. Examples of the sugars include, but are not limited to, monosaccharides, oligosaccharides, and sorbitanes. Examples of monosaccharides include pentoses and hexoses. Typical examples of monosaccharides include ribose, glucose, galactose, mannose, fructose, arabinose, and xylose. Examples of oligosaccharides include oligomers of 2 to 10 of the same or different monosaccharides. Examples of oligosaccharides include, but are not limited to, saccharose, maltose, lactose, raffinose, and isomaltose.

Typically, sugars suitable for use as the polyol compound include cyclic compounds containing a 5-membered ring of four carbon atoms and one heteroatom (typically oxygen or sulfur, preferably oxygen atom), or cyclic compounds containing a 6-membered ring of five carbon atoms and one heteroatom as described above, preferably, an oxygen atom. These further contain at least two or at least three hydroxy groups (—OH groups) bonded to the carbon ring atoms. Typically, the sugars have been modified in that one or more of the hydrogen atoms of a hydroxy group (and/or hydroxyalkyl group) bonded to the carbon ring atoms has been replaced by the long chain residues such that an ether or ester bond is created between the long chain residue and the sugar moiety.

The sugar-based polyol may contain a single sugar unit or a plurality of sugar units. The single sugar unit or the plurality of sugar units may be modified with long chain moieties as described above. Specific examples of sugar-based polyol compound include glycosides, sugar esters, sorbitan esters, and mixtures and combinations thereof.

A preferred type of polyol compounds are alkyl or modified alkyl glucosides. These type of surfactants contains at least one glucose moiety. Examples of alkyl or modified alkyl glucosides include compounds represented by the formula:

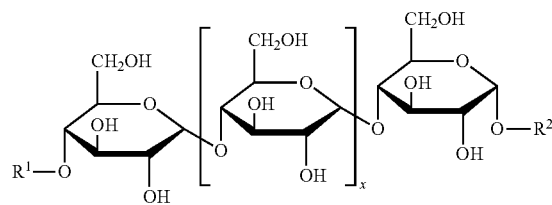

wherein x represents 0, 1, 2, 3, 4, or 5 and $R^1$ and $R^2$ each independently represent H or a long chain unit containing at least 6 carbon atoms, with the proviso that at least one of $R^1$ and $R^2$ is not H. Typical examples of $R^1$ and $R^2$ include aliphatic alcohol residues. Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof.

It is understood that the above formula represents specific examples of alkyl poly glucosides showing glucose in its pyranose form but other sugars or the same sugars but in different enantiomeric or diastereomeric forms may also be used.

Alkyl glucosides are available, for example, by acid-catalyzed reactions of glucose, starch, or n-butyl glucoside with aliphatic alcohols which typically yields a mixture of various alkyl glucosides (Alkyl polyglycylside, Rompp, Lexikon Chemie, Version 2.0, Stuttgart/New York, Georg Thieme Verlag, 1999). Examples of the aliphatic alcohols include hexanol, heptanol, octanol, nonanol, decanol, undecanol, dodecanol (lauryl alcohol), tetradecanol, hexadecanol (cetyl alcohol), heptadecanol, octadecanol (stearyl alcohol), eicosanoic acid, and combinations thereof. Alkyl glucosides are also commercially available under the trade name GLUCOPON or DISPONIL from Cognis GmbH, Dusseldorf, Germany.

Examples of other nonionic surfactants include bifunctional block copolymers supplied from BASF Corporation as Pluronic® R series, tridecyl alcohol alkoxylates supplied from BASF Corporation as Iconol® TDA series, and hydrocarbon-containing siloxane surfactants.

Examples of the anionic hydrocarbon surfactant include Versatic® 10 manufactured by Resolution Performance Products, and Avanel S series (S-70, S-74, etc.) manufactured by BASF Corporation.

Examples of the anionic hydrocarbon surfactant include an anionic surfactant represented by R-L-M, wherein R is a linear or branched alkyl group having 1 or more carbon atoms and optionally having a substituent, or a cyclic alkyl group having 3 or more carbon atoms and optionally having a substituent, and optionally contains a monovalent or divalent heterocycle or optionally forms a ring when having 3 or more carbon atoms; L is $—ArSO_3^-$, $—SO_3^-$, $—SO_4—$, $—PO_3^-$ or $—COO^-$, and, M is, H, a metal atom, $NR^5_4$, where each $R^5$ may be the same or different and are H or an organic group, imidazolium optionally having a substituent, pyridinium optionally having a substituent, or phosphonium optionally having a substituent; and $—ArSO_3^-$ is an aryl sulfonate. $R^5$ is preferably H or an organic group having 1 to 10 carbon atoms, and more preferably H or an organic group having 1 to 4 carbon atoms.

Specific examples thereof include a compound represented by $CH_3—(CH_2)_n-L-M$, wherein n is an integer of 6 to 17, as represented by lauryl acid and lauryl sulfate (dodecyl sulfate), and L and M are the same as described above.

Mixtures of those in which R is an alkyl group having 12 to 16 carbon atoms and L-M is a sulfate can also be used. Examples of the anionic hydrocarbon surfactant include an anionic surfactant represented by $R^6-(L-M)_2$, wherein $R^6$ is a linear or branched alkylene group having 1 or more carbon atoms and optionally having a substituent, or a cyclic alkylene group having 3 or more carbon atoms and optionally having a substituent, and optionally contains a monovalent or divalent heterocycle or optionally forms a ring when having 3 or more carbon atoms; L is $—ArSO_3^-$, $—SO_3^-$, $—SO_4—$, $—PO_3^-$ or $—COO^-$, and, M is, H, a metal atom, $NR^5_4$, imidazolium optionally having a substituent, pyridinium optionally having a substituent, or phosphonium optionally having a substituent, where each $R^5$ is H or an organic group, and $—ArSO_3^-$ is an aryl sulfonate.

Examples of the anionic hydrocarbon surfactant include an anionic surfactant represented by $R^7(-L-M)_3$, wherein $R^7$ is a linear or branched alkylidine group having 1 or more carbon atoms and optionally having a substituent, or a cyclic alkylidine group having 3 or more carbon atoms and optionally having a substituent, and optionally contains a monovalent or divalent heterocycle or optionally forms a ring when having 3 or more carbon atoms; L is $—ArSO_3^-$, $—SO_3^-$, $—SO_4—$, $—PO_3^-$ or $—COO^-$, and, M is, H, a metal atom, $NR^5_4$, imidazolium optionally having a substituent, pyridinium optionally having a substituent, or phosphonium optionally having a substituent, each $R^5$ is H or an organic group; and $—ArSO_3^-$ is an aryl sulfonate.

$R^5$ is preferably H or an alkyl group, more preferably H or an alkyl group having 1 to 10 carbon atoms, and still more preferably H or an alkyl group having 1 to 4 carbon atoms.

Examples of the hydrocarbon surfactant include a siloxane hydrocarbon surfactant. Examples of the siloxane hydrocarbon surfactant include those described in Silicone Surfactants, R. M. Hill, Marcel Dekker, Inc., ISBN: 0-8247-00104. The structure of the siloxane hydrocarbon surfactant includes defined hydrophobic and hydrophilic moieties. The hydrophobic moiety contains one or more dihydrocarbyl siloxane units, where the substituents on the silicone atoms are completely hydrocarbon. In the sense that the carbon atoms of the hydrocarbyl groups are fully substituted with hydrogen atoms where they can be substituted by halogen such as fluorine, these siloxane hydrocarbon surfactants can also be regarded as hydrocarbon surfactants, i.e. the monovalent substituents on the carbon atoms of the hydrocarbyl groups are hydrogen.

The hydrophilic moiety of the siloxane hydrocarbon surfactant may contain one or more polar moieties including ionic groups such as sulfate, sulfonate, phosphonate, phosphate ester, carboxylate, carbonate, sulfosuccinate, taurate (as the free acid, a salt or an ester), phosphine oxides, betaine, betaine copolyol, or quaternary ammonium salts. Ionic hydrophobic moieties may also contain ionically functionalized siloxane grafts.

Examples of such siloxane hydrocarbon surfactants include polydimethylsiloxane-graft-(meth)acrylic acid salts, polydimethylsiloxane-graft-polyacrylate salts, and polydimethylsiloxane-grafted quaternary amines.

The polar moieties of the hydrophilic moiety of the siloxane hydrocarbon surfactant may contain nonionic groups formed by polyethers, such as polyethylene oxide (PEO), and mixed polyethylene oxide/propylene oxide polyethers (PEO/PPO); mono- and disaccharides; and water-soluble heterocycles such as pyrrolidinone. The ratio of ethylene oxide to propylene oxide (EO/PO) may be varied in mixed polyethylene oxide/polypropylene oxide polyethers.

The hydrophilic moiety of the siloxane hydrocarbon surfactant may also contain a combination of ionic and nonionic moieties. Such moieties include, for example, ionically end-functionalized or randomly functionalized polyether or polyol. Preferred for carrying out the present disclosure is a siloxane having a nonionic moiety, i.e., a nonionic siloxane hydrocarbon surfactant.

The arrangement of the hydrophobic and hydrophilic moieties of the structure of a siloxane hydrocarbon surfactant may take the form of a diblock polymer (AB), triblock polymer (ABA), wherein the "B" represents the siloxane portion of the molecule, or a multi-block polymer. Alternatively, the siloxane surfactant may include a graft polymer.

The siloxane hydrocarbon surfactants also include those disclosed in U.S. Pat. No. 6,841,616.

Examples of the siloxane-based anionic hydrocarbon surfactant include Noveon® by Lubrizol Advanced Materials, Inc. and SilSense™ PE-100 silicone and SilSense™ CA-1 silicone available from Consumer Specialties.

Examples of the anionic hydrocarbon surfactant also include a sulfosuccinate surfactant Lankropol® K8300 by Akzo Nobel Surface Chemistry LLC.

Examples of the sulfosuccinate surfactant include sodium diisodecyl sulfosuccinate (Emulsogen® SB10 by Clariant) and sodium diisotridecyl sulfosuccinate (Polirol® TR/LNA by Cesapinia Chemicals).

Examples of the hydrocarbon surfactants also include PolyFox® surfactants by Omnova Solutions, Inc. (PolyFox™ PF-156A, PolyFox™ PF-136A, etc.).

The hydrocarbon surfactant is preferably an anionic hydrocarbon surfactant. The anionic hydrocarbon surfactant used may be those described above, including the following preferred hydrocarbon surfactants.

The anionic hydrocarbon surfactant includes a compound (α) represented by the following formula (α):

$$R^{100}\text{—COOM} \quad (\alpha)$$

wherein $R^{100}$ is a monovalent organic group containing 1 or more carbon atoms; and M is H, a metal atom, $NR^{101}_4$, imidazolium optionally having a substituent, pyridinium optionally having a substituent, or phosphonium optionally having a substituent, wherein $R^{101}$ is H or an organic group and may be the same or different.

$R^{101}$ is preferably H or a $C_{1-10}$ organic group, more preferably H or a $C_{1-4}$ organic group, and still more preferably H or a $C_{1-4}$ alkyl group.

From the viewpoint of surfactant function, the number of carbon atoms in $R^{100}$ is preferably 2 or more, and more preferably 3 or more. From the viewpoint of water-solubility, the number of carbon atoms in $R^{100}$ is preferably 29 or less, and more preferably 23 or less.

Examples of the metal atom as M include alkali metals (Group 1) and alkaline earth metals (Group 2), and preferred is Na, K, or Li. M is preferably H, a metal atom, or $NR^{101}_4$, more preferably H, an alkali metal (Group 1), an alkaline earth metal (Group 2), or $NR^{101}_4$, still more preferably H, Na, K, Li, or $NH_4$, further preferably Na, K, or $NH_4$, particularly preferably Na or $NH_4$, and most preferably $NH_4$.

Examples of the compound (a) include an anionic surfactant represented by $R^{102}$—COOM, wherein $R^{102}$ is a linear or branched, alkyl group, alkenyl group, alkylene group, or alkenylene group having 1 or more carbon atoms and optionally having a substituent, or a cyclic alkyl group, alkenyl group, alkylene group, or alkenylene group having 3 or more carbon atoms and optionally having a substituent, each of which optionally contains an ether bond; when having 3 or more carbon atoms, $R^{102}$ optionally contains a monovalent or divalent heterocycle, or optionally forms a ring; and M is as described above.

Specific examples thereof include a compound represented by  $CH_3$—$(CH_2)_n$—COOM, wherein n is an integer of 2 to 28, and M is as described above.

From the viewpoint of emulsion stability, the anionic hydrocarbon surfactant may be free from a carbonyl group which is not in a carboxyl group.

Preferred examples of the anionic hydrocarbon surfactant free from the carbonyl group include a compound represented by the following formula (A): $R^{103}$—COO-M (A), wherein $R^{103}$ is an alkyl group, an alkenyl group, an alkylene group, or an alkenylene group, each of which optionally contains an ether bond; M is H, a metal atom, $NR^{101}_4$, imidazolium optionally having a substituent, pyridinium optionally having a substituent, or phosphonium optionally having a substituent; and $R^{101}$ is the same or different and is H or an organic group having 1 to 10 carbon atoms.

In the formula (A), $R^{103}$ is preferably an alkyl group or an alkenyl group, each of which optionally contains an ether group. The alkyl group or alkenyl group for $R^{103}$ may be linear or branched. The number of carbon atoms in $R^{103}$ may be, but is not limited to, 2 to 29.

The alkyl group, alkenyl group, alkylene group, or alkenylene group in $R^{103}$ is preferably free from a carbonyl group which is not in an ester group.

When the alkyl group is linear, the number of carbon atoms in $R^{103}$ is preferably 3 to 29, and more preferably 5 to 23. When the alkyl group is branched, the number of carbon atoms in $R^{103}$ is preferably 5 to 35, and more preferably 11 to 23.

When the alkenyl group is linear, the number of carbon atoms in $R^{103}$ is preferably 2 to 29, and more preferably 9 to 23. When the alkenyl group is branched, the number of carbon atoms in $R^{103}$ is preferably 2 to 29, more preferably 3 to 29, and still more preferably 9 to 23.

Examples of the alkyl group and alkenyl group include a methyl group, an ethyl group, an isobutyl group, a t-butyl group, and a vinyl group.

Examples of the anionic hydrocarbon surfactant include butyric acid, valeric acid, caproic acid, enanthic acid, caprylic acid, pelargonic acid, capric acid, lauric acid, myristic acid, pentadecylic acid, palmitic acid, palmitoleic acid, margaric acid, stearic acid, oleic acid, vaccenic acid, linoleic acid, (9,12,15)-linolenic acid, (6,9,12)linolenic acid, eleostearic acid, arachidic acid, 8,11-eicosadienoic acid, mead acid, arachidonic acid, behenic acid, lignoceric acid, nervonic acid, cerotic acid, montanic acid, melissic acid, crotonic acid, myristoleic acid, palmitoleic acid, sapienoic acid, oleic acid, elaidic acid, vaccenic acid, gadoleic acid, eicosenoic acid, erucic acid, nervonic acid, linoleic acid, eicosadienoic acid, docosadienoic acid, linolenic acid, pinolenic acid, α-eleostearic acid, β-eleostearic acid, mead acid, dihomo-γ-linolenic acid, eicosatrienoic acid, stearidonic acid, arachidonic acid, eicosatetraenoic acid, adrenic acid, boseopentaenoic acid, eicosapentaenoic acid, osbond acid, sardine acid, tetracosapentaenoic acid, docosahexaenoic acid, nisinic acid, and salts thereof.

In particular, at least one selected from the group consisting of lauric acid, capric acid, myristic acid, pentadecylic acid, palmitic acid, and salts thereof is preferred, lauric acid and a salt thereof are more preferred, a salt of lauric acid is particularly preferred, and sodium laurate or ammonium laurate is most preferred.

Examples of the salts include, but are not limited to, those in which hydrogen of the carboxyl group is a metal atom, $NR^{101}_4$, imidazolium optionally having a substituent, pyridinium optionally having a substituent, or phosphonium optionally having a substituent as M in the formula described above.

Examples of the hydrocarbon surfactant also include a hydrocarbon surfactant having one or more carbonyl groups which are not in a carboxyl group.

Further, a hydrocarbon surfactant obtained by subjecting the hydrocarbon surfactant having one or more carbonyl groups which are not in a carboxyl group to a radical treatment or an oxidation treatment may also be used.

The radical treatment may be any treatment that generates radicals in the hydrocarbon surfactant having one or more carbonyl groups which are not in carboxyl group, for example, a treatment in which deionized water and the hydrocarbon surfactant are added to the reactor, the reactor is hermetically sealed, the inside of the reactor is purged with nitrogen, the reactor is heated and pressurized, a polymerization initiator is charged, the reactor is stirred for a certain time, and then the reactor is depressurized to the atmospheric pressure, and the reactor is cooled. The oxidation treatment is a treatment in which an oxidizing agent is added to a hydrocarbon surfactant having one or more carbonyl groups which are not in a carboxyl group. Examples of the oxidizing agent include oxygen, ozone, hydrogen peroxide solution, manganese(IV) oxide, potassium permanganate, potassium dichromate, nitric acid, and sulfur dioxide. In order to promote the radical treatment or the oxidation treatment, the radical treatment or the oxidation treatment may be performed in a pH-adjusted aqueous solution. The pH of the aqueous solution for radical treatment or oxidation treatment is preferably less than 7, and the pH of the aqueous solution can be adjusted by using, for example, sulfuric acid, nitric acid, hydrochloric acid or the like.

The polymerization step preferably includes a step of continuously adding a hydrocarbon surfactant having one or more carbonyl groups which are not in a carboxyl group and particularly preferably includes a step of continuously adding a hydrocarbon surfactant obtained by subjecting the hydrocarbon surfactant having one or more carbonyl groups which are not in a carboxyl group to a radical treatment or an oxidation treatment. In the step of continuously adding the hydrocarbon surfactant, the amount of the hydrocarbon surfactant added is preferably 0.001 to 10% by mass based on 100% by mass of the aqueous medium. The lower limit thereof is more preferably 0.005% by mass, and still more preferably 0.01% by mass, while the upper limit thereof is more preferably 5% by mass, and still more preferably 2% by mass.

The hydrocarbon surfactant having one or more carbonyl groups which are not in a carboxyl group is preferably a surfactant represented by the formula: R—X, wherein R is a fluorine-free organic group having one or more carbonyl groups which are not in a carboxyl group and having 1 to 2,000 carbon atoms, X is, —OSO$_3$X$^1$, —COOX$^1$, or —SO$_3$X$^1$, wherein X$^1$ is H, a metal atom, NR$^1_4$, imidazolium optionally having a substituent, pyridinium optionally having a substituent, or phosphonium optionally having a substituent, wherein R$^1$ is H or an organic group and may be the same or different. R preferably has 500 or less carbon atoms, more preferably 100 or less, still more preferably 50 or less, and further preferably 30 or less.

The hydrocarbon surfactant is more preferably at least one selected from the group consisting of a surfactant (a) represented by the following formula (a):

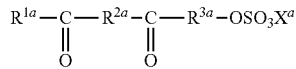

wherein R$^{1a}$ is a linear or branched alkyl group having 1 or more carbon atoms or a cyclic alkyl group having 3 or more carbon atoms, with a hydrogen atom bonded to a carbon atom therein being optionally replaced by a hydroxy group or a monovalent organic group containing an ester bond, optionally contains a carbonyl group when having 2 or more carbon atoms, and optionally contains a monovalent or divalent heterocycle or optionally forms a ring when having 3 or more carbon atoms; R$^{2a}$ and R$^{3a}$ are each independently a single bond or a divalent linking group; the total number of carbon atoms of R$^{1a}$, R$^{2a}$, and R$^{3a}$ is 6 or more; X$^a$ is H, a metal atom, NR$^{4a}_4$, imidazolium optionally having a substituent, pyridinium optionally having a substituent, or phosphonium optionally having a substituent, wherein R$^{4a}$ is H or an organic group and may be the same or different; any two of R$^{1a}$, R$^{2a}$, and R$^{3a}$ optionally bind to each other to form a ring;

a surfactant (b) represented by the following formula (b):

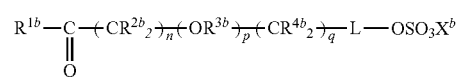

wherein R$^{1b}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms; R$^{2b}$ and R$^{4b}$ are each independently H or a substituent; R$^{3m}$ is an alkylene group having 1 to 10 carbon atoms and optionally having a substituent; n is an integer of 1 or more; p and q are each independently an integer of 0 or more; X$^b$ is H, a metal atom, NR$^{5b}_4$, imidazolium optionally having a substituent, pyridinium optionally having a substituent, or phosphonium optionally having a substituent, wherein R$^{5b}$ is H or an organic group and may be the same or different. Any two of R$^{1b}$, R$^{2b}$, R$^{3b}$, and R$^{4b}$ optionally bind to each other to form a ring; L is a single bond, —CO$_2$—B—*, —OCO—B—*, —CONR$^{6b}$—B—*, —NR$^{6b}$CO—B—*, or —CO— other than the carbonyl groups in —CO$_2$—B—, —OCO—B—, —CONR$^{6b}$—B—, and —NR$^6$CO—B—, wherein B is a single bond or an alkylene group having 1 to 10 carbon atoms and optionally having a substituent, R$^{6b}$ is H or an alkyl group having 1 to 4 carbon atoms and optionally having a substituent; and indicates the side bonded to —OSO$_3$X$^b$ in the formula;

a surfactant (c) presented by the following formula (c):

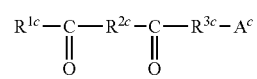

wherein R$^{1c}$ is a linear or branched alkyl group having 1 or more carbon atoms or a cyclic alkyl group having 3 or more carbon atoms, with a hydrogen atom bonded to a carbon atom therein being optionally replaced by a hydroxy group or a monovalent organic group containing an ester bond, optionally contains a carbonyl group when having 2 or more carbon atoms, and optionally contains a monovalent or divalent heterocycle or optionally forms a ring when having 3 or more carbon atoms; R$^{2c}$ and R$^{3c}$ are each independently a single bond or a divalent linking group; the total number of carbon atoms of R$^{1c}$, R$^{2c}$, and R$^{3c}$ is 5 or more; A$^c$ is —COOX$^c$ or —SO$_3$X$^c$, wherein X$^c$ is H, a metal atom, NR$^{4c}_4$, imidazolium optionally having a substituent, pyridinium optionally having a substituent, or phosphonium optionally having a substituent, wherein R$^{4c}$ is H or an organic group and may be the same or different; and any two of R$^{1c}$, R$^{2c}$, and R$^{3c}$ optionally bind to each other to form a ring; and a surfactant (d) represented by the following formula (d):

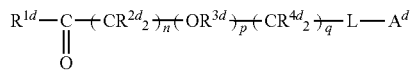

wherein $R^{1d}$ is a linear or branched alkyl group having 1 or more carbon atoms and optionally having a substituent or a cyclic alkyl group having 3 or more carbon atoms and optionally having a substituent, and optionally contains a monovalent or divalent heterocycle or optionally forms a ring when having 3 or more carbon atoms; $R^{2d}$ and $R^{4d}$ are each independently H or a substituent; $R^{3d}$ is an alkylene group having 1 to 10 carbon atoms and optionally having a substituent; n is an integer of 1 or more; p and q are each independently an integer of 0 or more; $A^d$ is —$SO_3X^d$ or —$COOX^d$, wherein $X^d$ is H, a metal atom, $NR^{5d}_4$, imidazolium optionally having a substituent, pyridinium optionally having a substituent, or phosphonium optionally having a substituent, wherein $R^{5d}$ is H or an organic group and may be the same or different; any two of $R^{1d}$, $R^{2d}$, $R^{3d}$, and $R^{4d}$ optionally bind to each other to form a ring; L is a single bond, —$CO_2$—B—*, —OCO—B—*, —$CONR^{6d}$—B—*, —$NR^{6d}CO$—B—*, or —CO— other than the carbonyl groups in —$CO_2$—B—, —OCO—B—, —$CONR^{6d}$—B—, and —$NR^{6d}CO$—B—, wherein B is a single bond or an alkylene group having 1 to 10 carbon atoms and optionally having a substituent, $R^{6d}$ is H or an alkyl group having 1 to 4 carbon atoms and optionally having a substituent; and * indicates the side bonded to $A^b$ in the formula.

The surfactant (a) is described below.

In the formula (a), $R^{1a}$ is a linear or branched alkyl group having 1 or more carbon atoms or a cyclic alkyl group having 3 or more carbon atoms.

When having 3 or more carbon atoms, the alkyl group optionally contains a carbonyl group (—C(=O)—) between two carbon atoms. When having 2 or more carbon atoms, the alkyl group optionally contains the carbonyl group at an end of the alkyl group. In other words, acyl groups such as an acetyl group represented by $CH_3$—C(=O)— are also included in the alkyl group.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1a}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the carbonyl groups and the number of carbon atoms constituting the heterocycles. For example, the number of carbon atoms in the group represented by $CH_3$—C(=O)—$CH_2$— is 3, the number of carbon atoms in the group represented by $CH_3$—C(=O)—$C_2H_4$—C(=O)—$C_2H_4$— is 7, and the number of carbon atoms in the group represented by $CH_3$—C(=O)— is 2.

In the alkyl group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{101a}$, wherein $R^{101a}$ is an alkyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

In the formula, $R^{2a}$ and $R^{1a}$ are each independently a single bond or a divalent linking group.

Preferably, $R^{2a}$ and $R^{1a}$ are each independently a single bond, or a linear or branched alkylene group having 1 or more carbon atoms, or a cyclic alkylene group having 3 or more carbon atoms.

The alkylene group constituting $R^{2a}$ and $R^{3a}$ is preferably free from a carbonyl group.

In the alkylene group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{102a}$, wherein $R^{102a}$ is an alkyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

the total number of carbon atoms of $R^{1a}$, $R^{2a}$, and $R^{3a}$ is 6 or more; The total number of carbon atoms is preferably 8 or more, more preferably 9 or more, still more preferably 10 or more, and preferably 20 or less, more preferably 18 or less, still more preferably 15 or less.

Any two of $R^{1a}$, $R^{2a}$, and $R^{3a}$ optionally bind to each other to form a ring.

In the formula (a), $X^a$ is H, a metal atom, $NR^{4a}_4$, imidazolium optionally having a substituent, pyridinium optionally having a substituent, or phosphonium optionally having a substituent, wherein $R^{4a}$ is H or an organic group. The four $R^{4a}$ may be the same as or different from each other. $R^{4a}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li. $X^a$ is preferably H, an alkali metal (Group 1), an alkaline earth metal (Group 2), or $NR^{4a}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^a$ is $NH_4$, the solubility of the surfactant in an aqueous medium is excellent, and the metal component is unlikely to remain in the PTFE or the final product.

$R^{1a}$ is preferably a linear or branched alkyl group having 1 to 8 carbon atoms and free from a carbonyl group, a cyclic alkyl group having 3 to 8 carbon atoms and free from a carbonyl group, a linear or branched alkyl group having 2 to 45 carbon atoms and containing 1 to 10 carbonyl groups, a cyclic alkyl group having 3 to 45 carbon atoms and containing a carbonyl group, or an alkyl group having 3 to 45 carbon atoms and containing a monovalent or divalent heterocycle.

$R^{1a}$ is more preferably a group represented by the following formula:

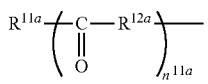

wherein $n^{11a}$ is an integer of 0 to 10; $R^{11a}$ is a linear or branched alkyl group having 1 to 5 carbon atoms or a cyclic alkyl group having 3 to 5 carbon atoms; $R^{12a}$ is an alkylene group having 0 to 3 carbon atoms; and when $n^{11a}$ is an integer of 2 to 10, each $R^{12a}$ may be the same or different.

$n^{11a}$ is preferably an integer of 0 to 5, more preferably an integer of 0 to 3, and still more preferably an integer of 1 to 3.

The alkyl group for $R^{11a}$ is preferably free from a carbonyl group.

In the alkyl group for $R^{11a}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{103a}$, wherein $R^{103a}$ is an alkyl group.

In the alkyl group for $R^{11a}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^{12a}$ is an alkylene group having 0 to 3 carbon atoms. The alkylene group preferably has 1 to 3 carbon atoms.

The alkylene group for $R^{12a}$ may be either linear or branched.

The alkylene group for $R^{12a}$ is preferably free from a carbonyl group. $R^{12a}$ is more preferably an ethylene group (—$C_2H_4$—) or a propylene group (—$C_3H_6$—).

In the alkylene group for $R^{12a}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{104a}$, wherein $R^{104a}$ is an alkyl group.

In the alkylene group for $R^{12a}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

$R^{2a}$ and $R^{1a}$ are preferably each independently an alkylene group having 1 or more carbon atoms and free from a carbonyl group, more preferably an alkylene group having 1 to 3 carbon atoms and free from a carbonyl group, and still more preferably an ethylene group (—$C_2H_4$—) or a propylene group (—$C_2H_6$—).

Examples of the surfactant (a) include the following surfactants. In each formula, $X^a$ is defined as described above.

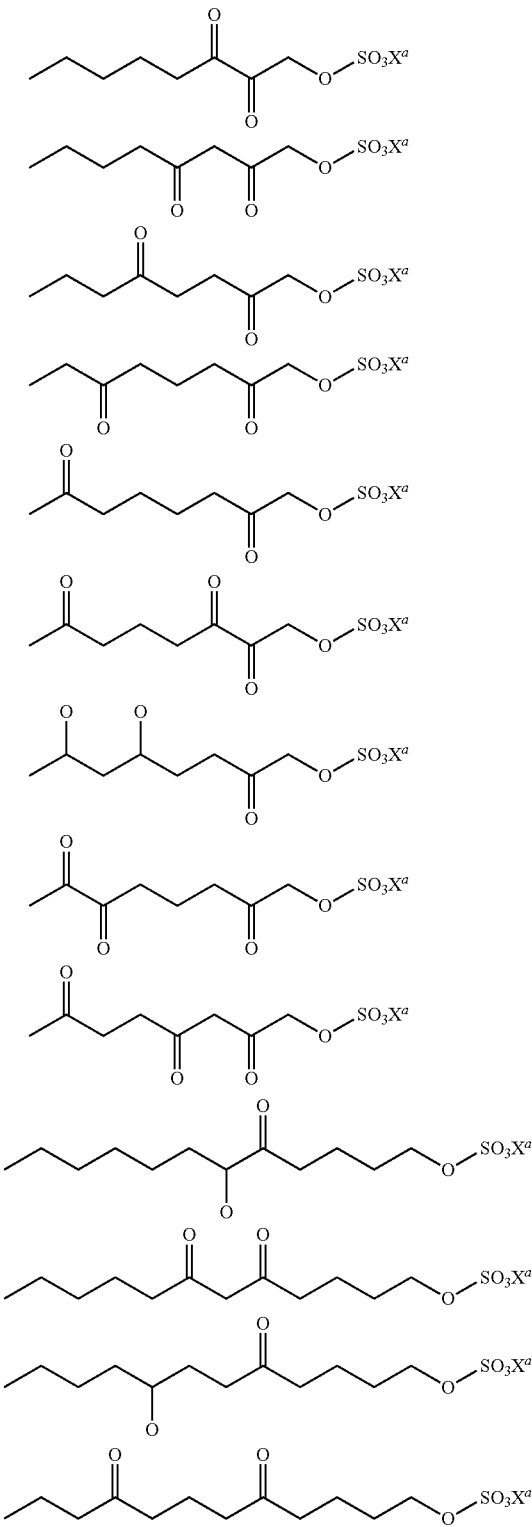

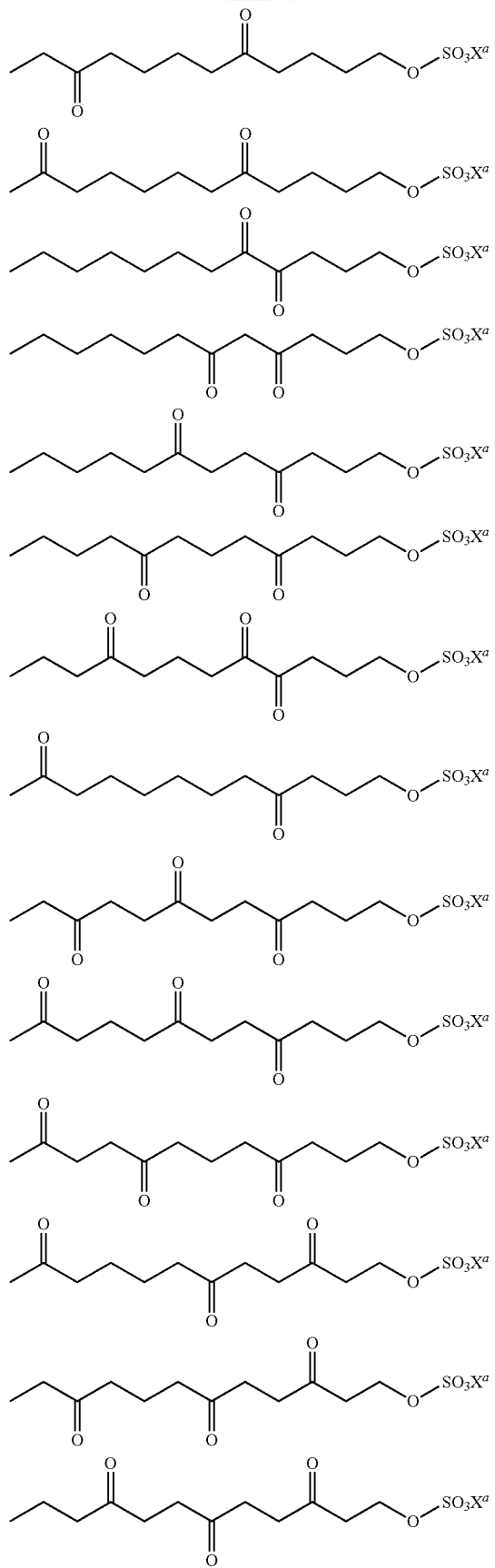
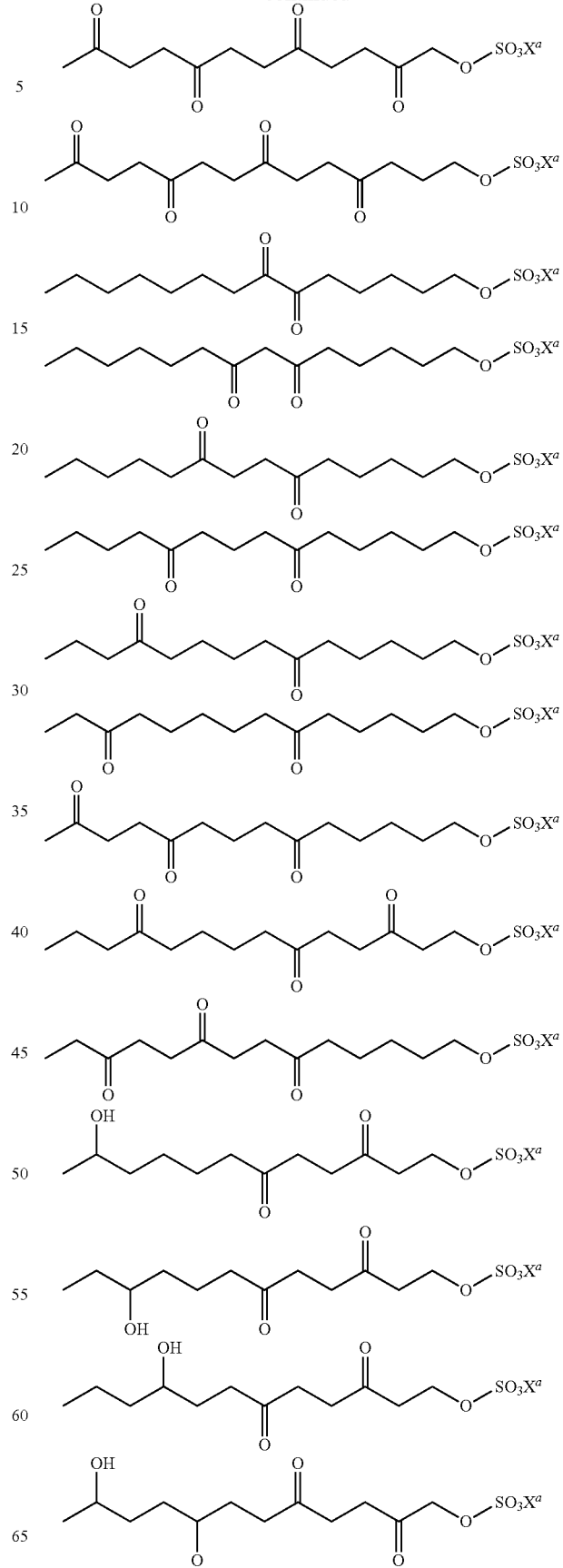

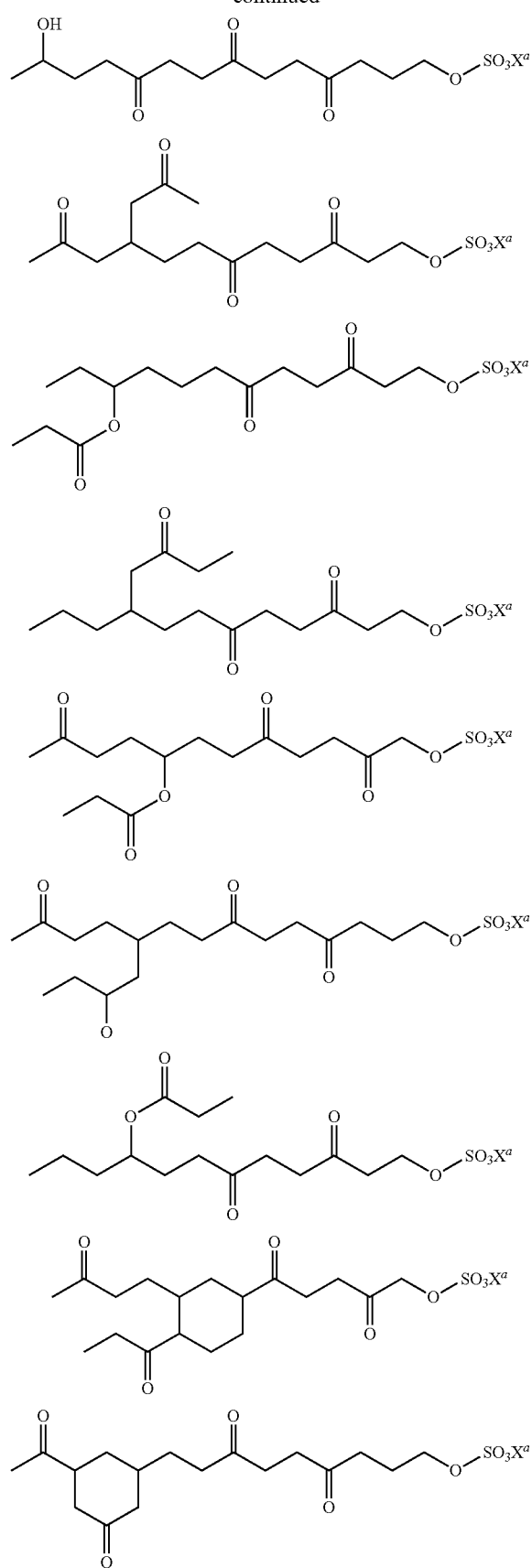
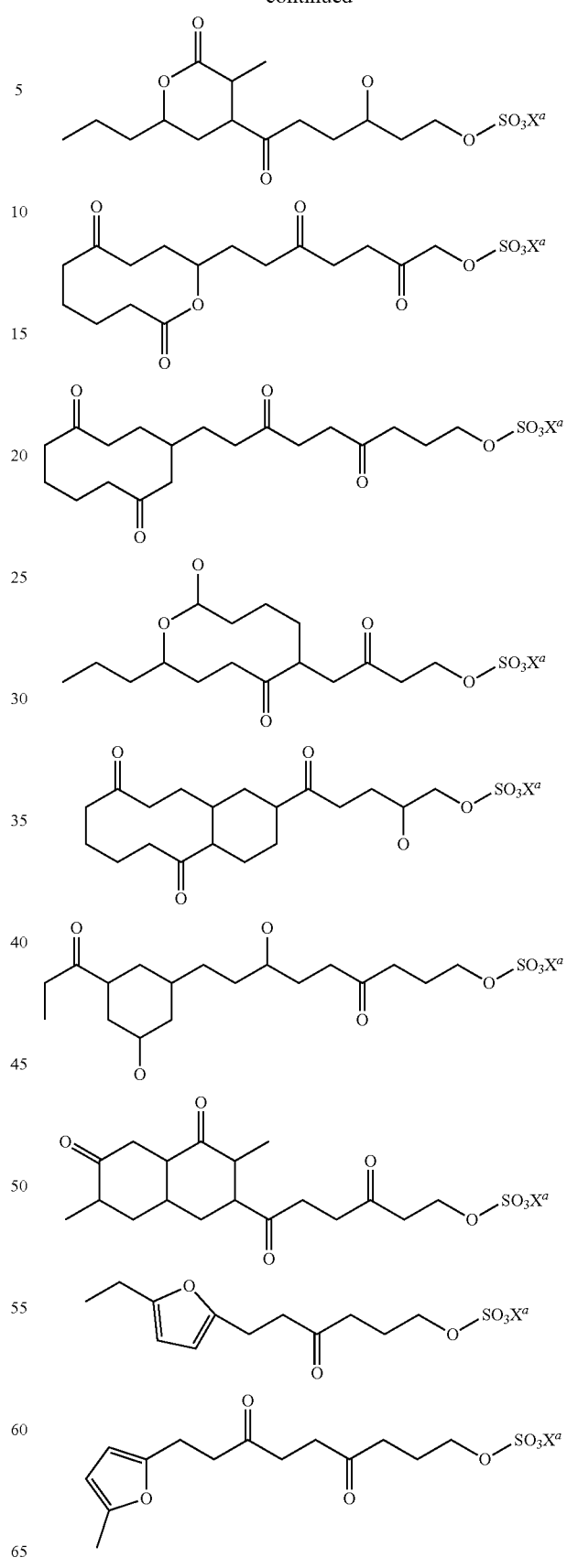

-continued

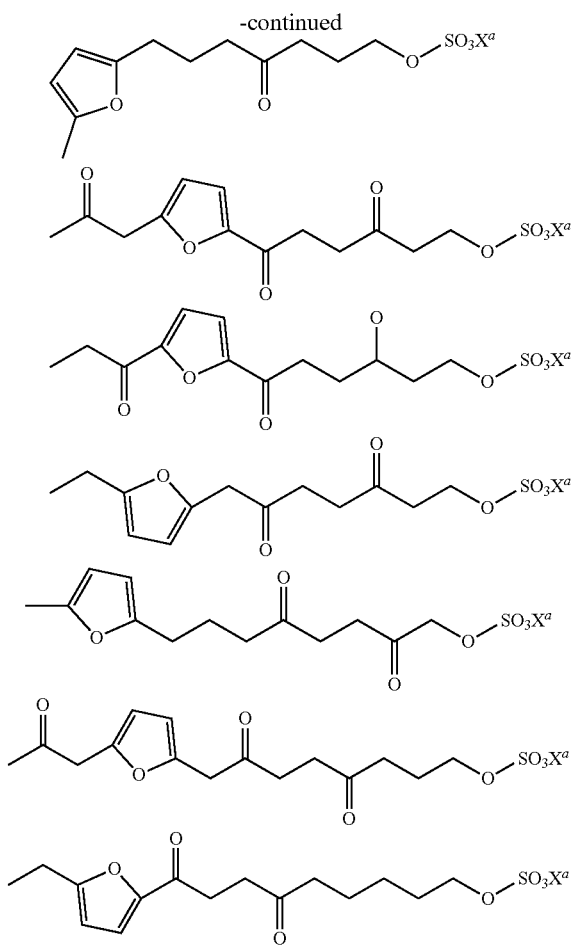

Next, the surfactant (b) is described below.

In the formula (b), $R^{1b}$ is a linear or branched alkyl group having 1 or more carbon atoms and optionally having a substituent or a cyclic alkyl group having 3 or more carbon atoms and optionally having a substituent.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1b}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the heterocycles.

The substituent which may be contained in the alkyl group for $R^{1b}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^{1b}$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

$R^{1b}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group (—CH$_3$) or an ethyl group (—C$_2$H$_5$), and most preferably a methyl group (—CH$_3$).

In the formula (b), $R^{2b}$ and $R^{4b}$ are each independently H or a substituent. A plurality of $R^{2b}$ and $R^{4b}$ may be the same or different.

The substituent for each of $R^{2b}$ and $R^{4b}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for each of $R^{2b}$ and $R^{4b}$ is preferably free from a carbonyl group. In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

The alkyl group for each of $R^{2b}$ and $R^{4b}$ is preferably a linear or branched alkyl group having 1 to 10 carbon atoms and free from a carbonyl group or a cyclic alkyl group having 3 to 10 carbon atoms and free from a carbonyl group, more preferably a linear or branched alkyl group having 1 to 10 carbon atoms and free from a carbonyl group, still more preferably a linear or branched alkyl group having 1 to 3 carbon atoms and not having a substituent, and particularly preferably a methyl group (—CH$_3$) or an ethyl group (—C$_2$H$_5$).

$R^{2b}$ and $R^{4b}$ are preferably each independently H or a linear or branched alkyl group having 1 to 10 carbon atoms and free from a carbonyl group, more preferably H or a linear or branched alkyl group having 1 to 3 carbon atoms and not having a substituent, still more preferably H, a methyl group (—CH$_3$), or an ethyl group (—C$_2$H$_5$), and particularly preferably H.

In the formula (b), $R^{3b}$ is an alkylene group having 1 to 10 carbon atoms and optionally having a substituent. When a plurality of $R^{3b}$ are present, they may be the same or different.

The alkylene group is preferably free from a carbonyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkyl group free from halogen atoms such as fluorine atoms and chlorine atoms.

The alkylene group preferably does not have any substituent.

The alkylene group is preferably a linear or branched alkylene group having 1 to 10 carbon atoms and optionally having a substituent or a cyclic alkylene group having 3 to 10 carbon atoms and optionally having a substituent, preferably a linear or branched alkylene group having 1 to 10 carbon atoms and free from a carbonyl group or a cyclic alkylene group having 3 to 10 carbon atoms and free from a carbonyl group, more preferably a linear or branched alkylene group having 1 to 10 carbon atoms and not having a substituent, and still more preferably a methylene group (—$CH_2$—), an ethylene group (—$C_2H_4$—), an isopropylene group (—$CH(CH_3)CH_2$—), or a propylene group (—$C_3H_6$—).

Any two of $R^{1b}$, $R^{2b}$, $R_{3b}$, and $R^{4b}$ optionally bind to each other to form a ring, but preferably do not form a ring.

In the formula (b), n is an integer of 1 or more. In the formula, n is preferably an integer of 1 to 40, more preferably an integer of 1 to 30, still more preferably an integer of 5 to 25, and particularly preferably an integer of 5 to 9 and 11 to 25.

In the formula (b), p and q are each independently an integer of 0 or more. p is preferably an integer of 0 to 10, more preferably 0 or 1. q is preferably an integer of 0 to 10, more preferably an integer of 0 to 5.

The sum of n, p, and q is preferably an integer of 5 or more. The sum of n, p, and q is more preferably an integer of 8 or more. The sum of n, p, and q is also preferably an integer of 60 or less, more preferably an integer of 50 or less, and still more preferably an integer of 40 or less.

In the formula (b), $X^b$ is H, a metal atom, $NR^{5b}_4$, imidazolium optionally having a substituent, pyridinium optionally having a substituent, or phosphonium optionally having a substituent, wherein $R^{5b}$ is H or an organic group. The four $R^{5b}$ may be the same as or different from each other. $R^{5b}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li. $X^b$ may be a metal atom or $NR^{5b}_4$, wherein $R^{5b}$ is defined as described above.

$X^b$ is preferably H, an alkali metal (Group 1), an alkaline earth metal (Group 2), or $NR^{5b}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^b$ is $NH_4$, the solubility of the surfactant in an aqueous medium is excellent, and the metal component is unlikely to remain in the PTFE or the final product.

In the formula (b), L is a single bond, —$CO_2$—B—*, —OCO—B—*, —$CONR^{6b}$—B—*, —$NR^{6b}CO$—B—*, or —CO— other than the carbonyl groups in —$CO_2$—B—, —OCO—B—, —$CONR^6$—B—, and —$NR^{6b}CO$—B—, wherein B is a single bond or an alkylene group having 1 to 10 carbon atoms and optionally having a substituent, $R^{6b}$ is H or an alkyl group having 1 to 4 carbon atoms and optionally having a substituent. The alkylene group more preferably has 1 to 5 carbon atoms. $R^6$ is more preferably H or a methyl group. * indicates the side bonded to —$OSO_3X^b$ in the formula.

L is preferably a single bond.

The surfactant (b) is preferably a compound represented by the following formula:

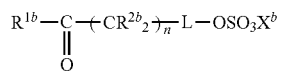

wherein $R^{1b}$, $R^{2b}$, L, n, and $X^b$ are defined as described above.

The surfactant (b) preferably has a $^1$H-NMR spectrum in which all peak intensities observed in a chemical shift range of 2.0 to 5.0 ppm give an integral value of 10% or more.

The surfactant (b) preferably has a $^1$H-NMR spectrum in which all peak intensities observed in a chemical shift range of 2.0 to 5.0 ppm give an integral value within the above range. In this case, the surfactant preferably has a ketone structure in the molecule.

The integral value of the surfactant (b) is more preferably 15 or more, and preferably 95 or less, more preferably 80 or less, and still more preferably 70 or less.

The integral value is determined using a heavy water solvent at room temperature. The heavy water content is adjusted to 4.79 ppm.

Examples of the surfactant (b) include:
$CH_3C(O)$
$CH_2CH_2CH_2CH_2CH_2CH_2CH_2CH_2CH_2OSO_3Na$,
$CH_3C(O)CH_2CH_2CH_2CH_2CH_2CH_2CH_2CH_2OSO_3Na$,
$CH_3C(O)CH_2CH_2CH_2CH_2CH_2CH_2CH_2OSO_3Na$,
$CH_3C(O)CH_2CH_2CH_2CH_2CH_2CH_2OSO_3Na$,
$CH_3C(O)CH_2CH_2CH_2CH_2CH_2OSO_3Na$,
$CH_3C(O)CH_2CH_2CH_2CH_2OSO_3Na$,
$(CH_3)_3CC(O)$
$CH_2CH_2CH_2CH_2CH_2CH_2CH_2CH_2OSO_3Na$,
$(CH_3)_2CHC(O)$
$CH_2CH_2CH_2CH_2CH_2CH_2CH_2CH_2OSO_3Na$,
$(CH_2)_5CHC(O)$
$CH_2CH_2CH_2CH_2CH_2CH_2CH_2CH_2OSO_3Na$,
$CH_3CH_2C(O)$
$CH_2CH_2CH_2CH_2CH_2CH_2CH_2OSO_3Na$,
$CH_3CH_2CH_2C(O)$
$CH_2CH_2CH_2CH_2CH_2CH_2OSO_3Na$,
$CH_3CH_2CH_2CH_2C(O)$
$CH_2CH_2CH_2CH_2CH_2OSO_3Na$,
$CH_3CH_2CH_2CH_2CH_2C(O)$
$CH_2CH_2CH_2CH_2OSO_3Na$,
$CH_3CH_2CH_2CH_2CH_2CH_2C(O)$
$CH_2CH_2CH_2OSO_3Na$,
$CH_3CH_2CH_2CH_2CH_2CH_2CH_2C(O)$
$CH_2CH_2OSO_3Na$,
$CH_3CH_2CH_2CH_2CH_2CH_2CH_2CH_2C(O)$
$CH_2OSO_3Na$,
$CH_3C(O)$
$CH_2CH_2CH_2CH_2CH_2CH_2CH_2CH_2OCH_2CH_2OSO_3Na$,
$CH_3C(O)CH_2CH_2CH_2CH_2CH_2CH_2CH_2CH_2C(O)$
$NHCH_2OSO_3Na$,
$CH_3C(O)CH_2CH_2CH_2CH_2CH_2CH_2CH_2CH_2NHC$
$(O)CH_2OSO_3Na$,
$CH_3C(O)CH_2CH_2CH_2CH_2CH_2CH_2CH_2CH_2C(O)$
$OSO_3Na$,
$CH_3C(O)CH_2CH_2CH_2CH_2CH_2CH_2CH_2CH_2C(O)$
$OCH_2OSO_3Na$,
$CH_3C(O)CH_2CH_2CH_2CH_2CH_2CH_2CH_2CH_2OC(O)$
$CH_2OSO_3Na$,
$CH_3C(O)$
$CH_2CH_2CH_2CH_2CH_2CH_2CH_2CH_2OSO_3H$, CH$_3$C(O)
CH$_2$CH$_2$CH$_2$CH$_2$CH$_2$CH$_2$CH$_2$CH$_2$CH$_2$OSO$_3$Li,
CH$_3$C(O)
CH$_2$CH$_2$CH$_2$CH$_2$CH$_2$CH$_2$CH$_2$CH$_2$CH$_2$OSO$_3$K,
CH$_3$C(O)
CH$_2$CH$_2$CH$_2$CH$_2$CH$_2$CH$_2$CH$_2$CH$_2$CH$_2$OSO$_3$NH$_4$,
CH$_3$C(O)CH$_2$CH$_2$CH$_2$CH$_2$CH$_2$CH$_2$CH$_2$CH$_2$CH(CH$_3$)$_2$
OSO$_3$Na,
CH$_3$C(O)
CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$CH$_2$OSO$_3$Na,
CH$_3$C(O)
CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$OSO$_3$Na,
CH$_3$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$OSO$_3$Na,
CH$_3$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$OSO$_3$Na,
CH$_3$C(O)
CH$_2$CH$_2$CH$_2$CH$_2$CH$_2$CH$_2$CH$_2$CH$_2$CH$_2$CH$_2$CH$_2$CH$_2$
CH$_2$OSO$_3$Na,
CH$_3$C(O)
CH$_2$CH$_2$CH$_2$CH$_2$CH$_2$CH$_2$CH$_2$CH$_2$CH$_2$CH$_2$CH$_2$CH$_2$
OSO$_3$Na,
CH$_3$C(O)
CH$_2$CH$_2$CH$_2$CH$_2$CH$_2$CH$_2$CH$_2$CH$_2$CH$_2$CH$_2$CH$_2$OSO$_3$
Na,
CH$_3$C(O)
CH$_2$CH$_2$CH$_2$CH$_2$CH$_2$CH$_2$CH$_2$CH$_2$CH$_2$CH$_2$OSO$_3$Na,
(CH$_3$)$_3$CC(O)
CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$CH$_2$OSO$_3$Na,
(CH$_3$)$_2$CHC(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$CH$_2$OS$_3$Na,
(CH$_2$)$_5$CHC(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$CH$_2$OSO$_3$Na,
CH$_3$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$CH$_2$OSO$_3$Na,
CH$_3$CH$_2$CH$_2$CH$_2$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$OSO$_3$Na,
CH$_3$CH$_2$CH$_2$CH$_2$CH$_2$CH$_2$CH$_2$CH$_2$C(O)
CH$_2$CH$_2$CH$_2$CH$_2$CH$_2$CH$_2$CH$_2$CH$_2$CH$_2$CH$_2$OSO$_3$Na,
CH$_3$CH$_2$CH$_2$CH$_2$CH$_2$CH$_2$CH$_2$CH$_2$CH$_2$CH$_2$CH$_2$C(O)
CH$_2$CH$_2$CH$_2$CH$_2$CH$_2$CH$_2$CH$_2$OSO$_3$Na,
CH$_3$CH$_2$CH$_2$CH$_2$CH$_2$CH$_2$CH$_2$CH$_2$CH$_2$CH$_2$CH$_2$CH$_2$CH$_2$
CH$_2$C(O)CH$_2$CH$_2$CH$_2$CH$_2$OSO$_3$Na,
CH$_3$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$OCH$_2$CH$_2$OSO$_3$Na,
CH$_3$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$C(O)NHCH$_2$CH$_2$OSO$_3$Na,
CH$_3$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$NHC(O)CH$_2$CH$_2$OSO$_3$Na,
CH$_3$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$C(O)OCH$_2$CH$_2$OSO$_3$Na,
CH$_3$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$OC(O)CH$_2$CH$_2$OSO$_3$Na,
CH$_3$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$C(O)OSO$_3$Na,
CH$_3$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$OSO$_3$H,
CH$_3$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$OSO$_3$Li,
CH$_3$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$OSO$_3$K,
CH$_3$CH$_2$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$OSO$_3$NH$_4$, and
CH$_3$C(O)
CH$_2$CH$_2$CH$_2$CH$_2$CH$_2$CH$_2$CH$_2$CH$_2$CH$_2$CH$_2$CH$_2$CH$_2$
CH$_2$CH$_2$CH$_2$CH$_2$CH$_2$CH$_2$CH$_2$CH$_2$OSO$_3$Na.

The surfactant (c) will be described.

In the formula (c), $R^{1c}$ is a linear or branched alkyl group having 1 or more carbon atoms or a cyclic alkyl group having 3 or more carbon atoms.

When having 3 or more carbon atoms, the alkyl group optionally contains a carbonyl group (—C(=O)—) between two carbon atoms. When having 2 or more carbon atoms, the alkyl group optionally contains the carbonyl group at an end of the alkyl group. In other words, acyl groups such as an acetyl group represented by CH$_3$—C(=O)— are also included in the alkyl group.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1c}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the carbonyl groups and the number of carbon atoms constituting the heterocycles. For example, the number of carbon atoms in the group represented by CH$_3$—C(=O)—CH$_2$— is 3, the number of carbon atoms in the group represented by CH$_3$—C(=O)—C$_2$H$_4$—C(=O)—C$_2$H$_4$— is 7, and the number of carbon atoms in the group represented by CH$_3$—C(=O)— is 2.

In the alkyl group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{101c}$, wherein $R^{101c}$ is an alkyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

In the formula (c), $R^{2c}$ and $R^{3c}$ are each independently a single bond or a divalent linking group.

Preferably, $R^{2c}$ and $R^{3c}$ are each independently a single bond, a linear or branched alkylene group having 1 or more carbon atoms, or a cyclic alkylene group having 3 or more carbon atoms.

The alkylene group constituting $R^{2c}$ and $R^{3c}$ is preferably free from a carbonyl group.

In the alkylene group, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{102c}$, wherein $R^{102c}$ is an alkyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The total number of carbon atoms of $R^{1c}$, $R^{2c}$, and $R^{3c}$ is 5 or more. The total number of carbon atoms is preferably 7 or more, more preferably 9 or more, and preferably 20 or less, more preferably 18 or less, still more preferably 15 or less.

Any two of $R^{1c}$, $R^{2c}$, and $R^{3c}$ optionally bind to each other to form a ring.

In the formula (c), $A^c$ is —COO$X^c$ or —SO$_3$$X^c$, wherein $X^c$ is H, a metal atom, NR$^{4c}_4$, imidazolium optionally having a substituent, pyridinium optionally having a substituent, or phosphonium optionally having a substituent, wherein $R^{4c}$ is H or an organic group and may be the same or different. $R^{4c}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li.

$X^c$ is preferably H, an alkali metal (Group 1), an alkaline earth metal (Group 2), or NR$^{4c}_4$, more preferably H, Na, K, Li, or NH$_4$ because they are easily dissolved in water, still more preferably Na, K, or NH$_4$ because they are more easily dissolved in water, particularly preferably Na or NH$_4$, and most preferably NH$_4$ because it can be easily removed. When $X^c$ is NH$_4$, the solubility of the surfactant in an aqueous medium is excellent, and the metal component is unlikely to remain in the PTFE or the final product.

$R^{1c}$ is preferably a linear or branched alkyl group having 1 to 8 carbon atoms and free from a carbonyl group, a cyclic alkyl group having 3 to 8 carbon atoms and free from a carbonyl group, a linear or branched alkyl group having 2 to 45 carbon atoms and containing 1 to 10 carbonyl groups, a cyclic alkyl group having 3 to 45 carbon atoms and containing a carbonyl group, or an alkyl group having 3 to 45 carbon atoms and containing a monovalent or divalent heterocycle.

$R^{1c}$ is more preferably a group represented by the following formula:

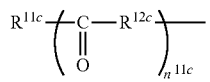

wherein $n^{11c}$ is an integer of 0 to 10; $R^{11c}$ is a linear or branched alkyl group having 1 to 5 carbon atoms or a cyclic alkyl group having 3 to 5 carbon atoms; $R^{12c}$ is an alkylene group having 0 to 3 carbon atoms; and when $n^{11c}$ is an integer of 2 to 10, each $R^{12c}$ may be the same or different.

In the formula, $n^{11c}$ is preferably an integer of 0 to 5, more preferably an integer of 0 to 3, and still more preferably an integer of 1 to 3.

The alkyl group for $R^{11c}$ is preferably free from a carbonyl group.

In the alkyl group for $R^{11c}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{103c}$, wherein $R^{103c}$ is an alkyl group.

In the alkyl group for $R^{11c}$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^{12c}$ is an alkylene group having 0 to 3 carbon atoms. The alkylene group preferably has 1 to 3 carbon atoms.

The alkylene group for $R^{12c}$ may be either linear or branched.

The alkylene group for $R^{12c}$ is preferably free from a carbonyl group. $R^{12c}$ is more preferably an ethylene group (—C$_2$H$_4$—) or a propylene group (—C$_3$H$_6$—).

In the alkylene group for $R^{12c}$, a hydrogen atom bonded to a carbon atom may be replaced by a functional group such as a hydroxy group (—OH) or a monovalent organic group containing an ester bond. Still, it is preferably not replaced by any functional group.

An example of the monovalent organic group containing an ester bond is a group represented by the formula: —O—C(=O)—$R^{104c}$, wherein $R^{104c}$ is an alkyl group.

In the alkylene group for $R^{12c}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

$R^{2c}$ and $R^{3c}$ are preferably each independently an alkylene group having 1 or more carbon atoms and free from a carbonyl group, more preferably an alkylene group having 1 to 3 carbon atoms and free from a carbonyl group, and still more preferably an ethylene group (—C$_2$H$_4$—) or a propylene group (—C$_3$H$_6$—).

Examples of the surfactant (c) include the following surfactants. In each formula, $A^c$ is defined as described above.

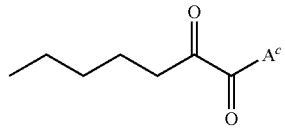

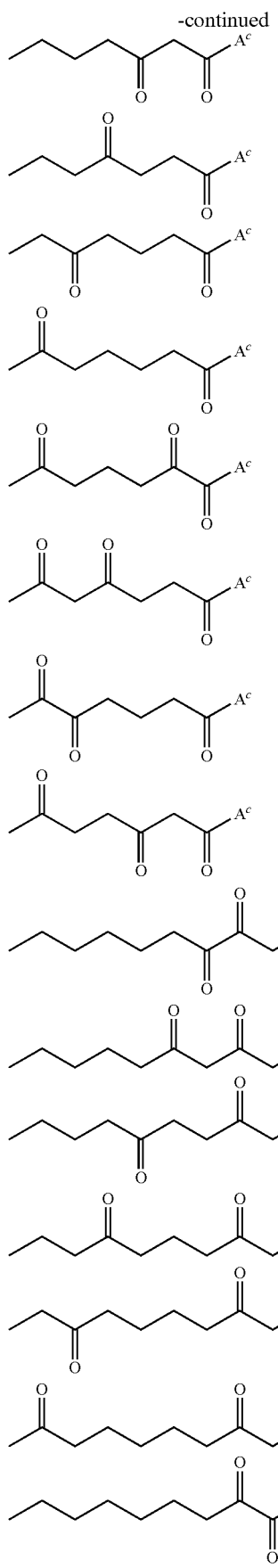
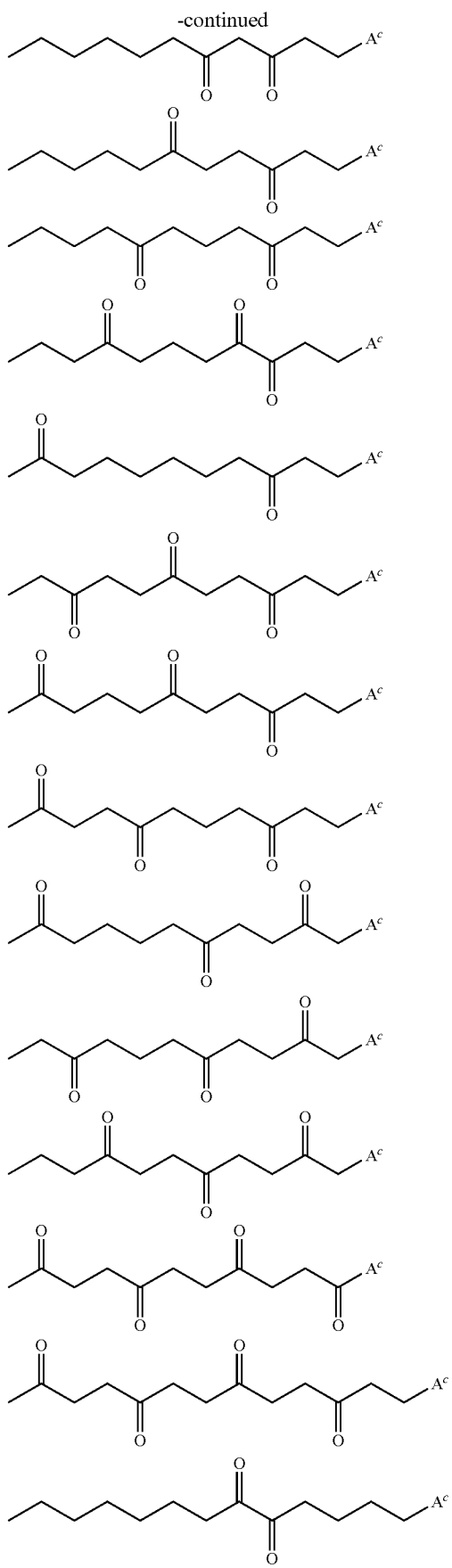

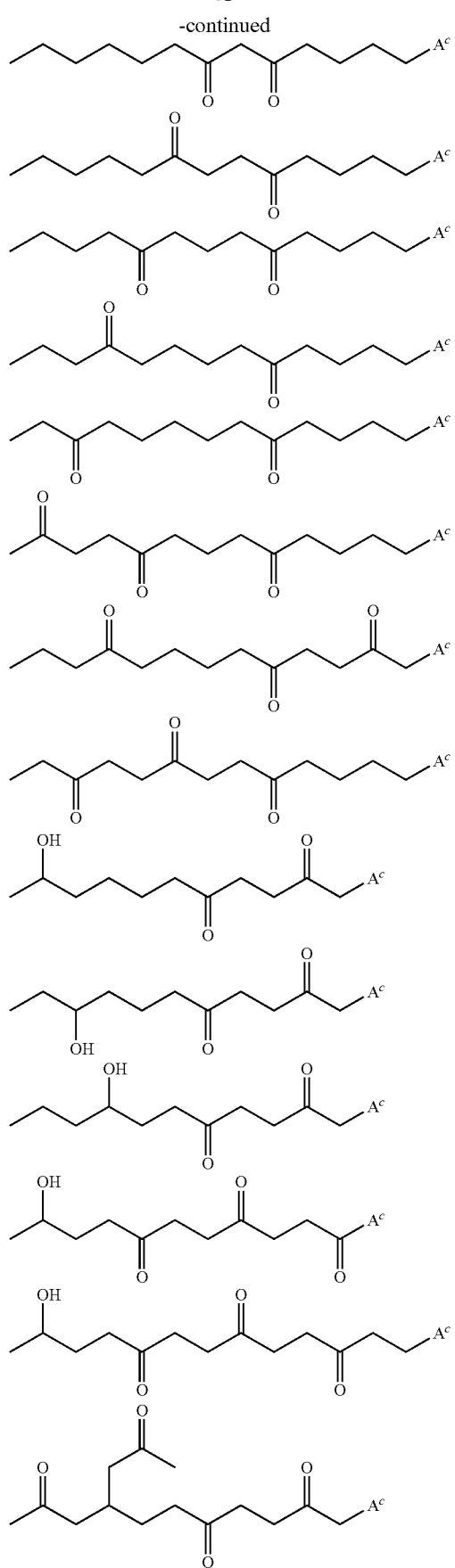
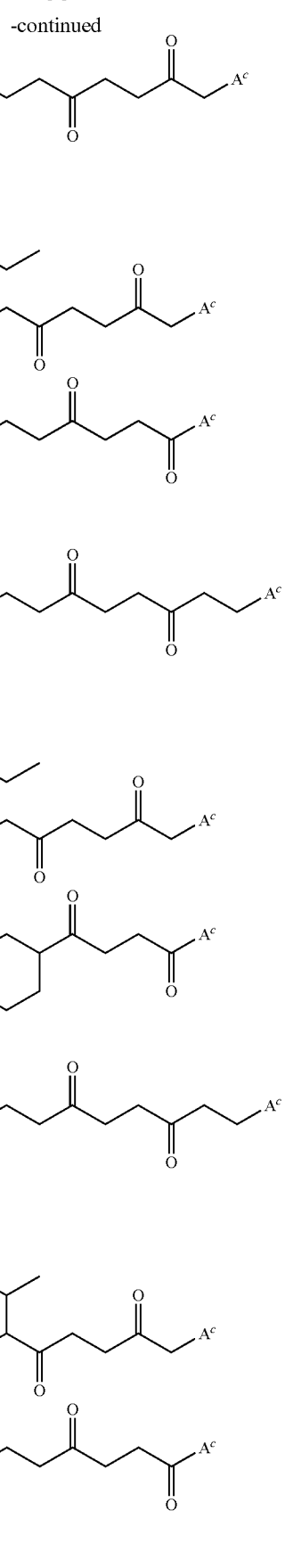

-continued

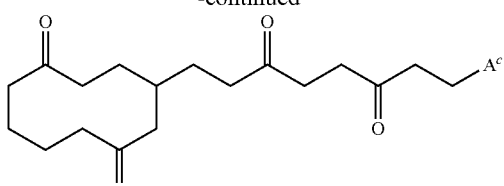
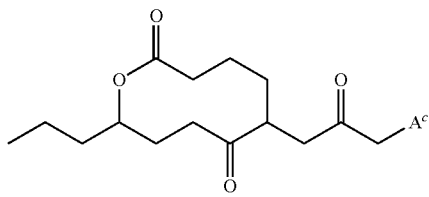
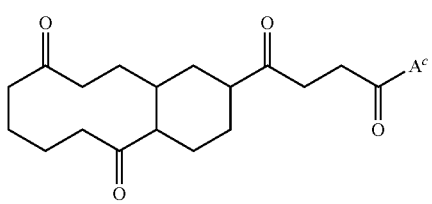
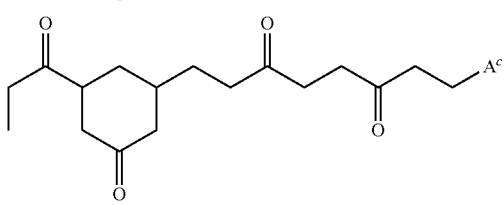
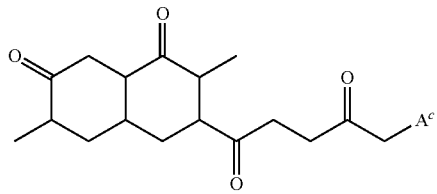
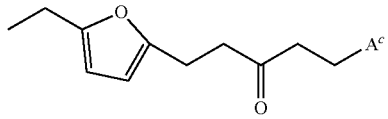
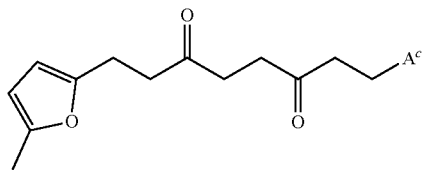
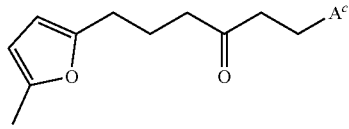
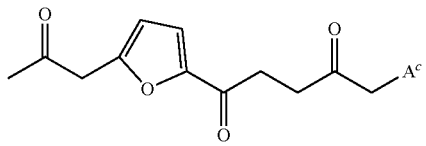
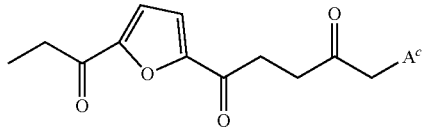

-continued

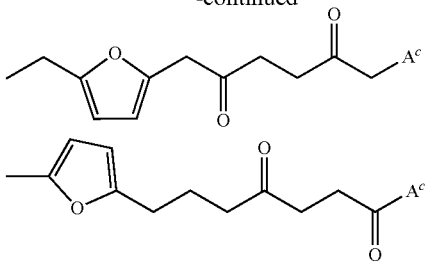
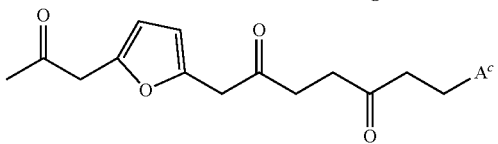
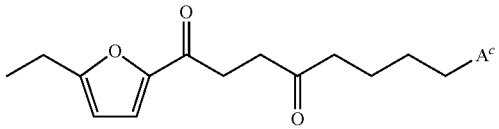

The surfactant (d) will be described.

In the formula (d), $R^{1d}$ is a linear or branched alkyl group having 1 or more carbon atoms and optionally having a substituent or a cyclic alkyl group having 3 or more carbon atoms and optionally having a substituent.

When having 3 or more carbon atoms, the alkyl group optionally contains a monovalent or divalent heterocycle, or optionally forms a ring. The heterocycle is preferably an unsaturated heterocycle, more preferably an oxygen-containing unsaturated heterocycle, and examples thereof include a furan ring. In $R^{1d}$, a divalent heterocycle may be present between two carbon atoms, or a divalent heterocycle may be present at an end and bind to —C(=O)—, or a monovalent heterocycle may be present at an end of the alkyl group.

The "number of carbon atoms" in the alkyl group as used herein includes the number of carbon atoms constituting the heterocycles.

The substituent which may be contained in the alkyl group for $R^{1d}$ is preferably a halogen atom, a linear or branched alkyl group having 1 to 10 carbon atoms, or a cyclic alkyl group having 3 to 10 carbon atoms, or a hydroxy group, and particularly preferably a methyl group or an ethyl group.

The alkyl group for $R^{1d}$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

$R^{1d}$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group (—$CH_3$) or an ethyl group (—$C_2H_5$), and most preferably a methyl group (—$CH_3$).

In the formula (d), $R^{2d}$ and $R^{4d}$ are each independently H or a substituent. A plurality of $R^{2d}$ and $R^{4d}$ may be the same or different.

The substituent for each of $R^{2d}$ and $R^{4d}$ is preferably a halogen atom, a linear or branched alkyl group having 1 to 10 carbon atoms, a cyclic alkyl group having 3 to 10 carbon atoms, or a hydroxy group, and particularly preferably a methyl group or an ethyl group.

The alkyl group for each of $R^{2d}$ and $R^{4d}$ is preferably free from a carbonyl group. In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably does not have any substituent.

The alkyl group for each of $R^{2d}$ and $R^{4d}$ is preferably a linear or branched alkyl group having 1 to 10 carbon atoms and free from a carbonyl group or a cyclic alkyl group having 3 to 10 carbon atoms and free from a carbonyl group, more preferably a linear or branched alkyl group having 1 to 10 carbon atoms and free from a carbonyl group, still more preferably a linear or branched alkyl group having 1 to 3 carbon atoms and not having a substituent, and particularly preferably a methyl group (—$CH_3$) or an ethyl group (—$C_2H_5$).

$R^{2d}$ and $R^{4d}$ are preferably each independently H or a linear or branched alkyl group having 1 to 10 carbon atoms and free from a carbonyl group, more preferably H or a linear or branched alkyl group having 1 to 3 carbon atoms and not having a substituent, further preferably H, a methyl group (—$CH_3$), or an ethyl group (—$C_2H_5$), and particularly preferably H.

In the formula (d), $R^{3d}$ is an alkylene group having 1 to 10 carbon atoms and optionally having a substituent. When a plurality of $R^{3d}$ are present, they may be the same or different.

The alkylene group is preferably free from a carbonyl group.

In the alkylene group, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkyl group free from halogen atoms such as fluorine atoms and chlorine atoms.

The alkylene group preferably does not have any substituent.

The alkylene group is preferably a linear or branched alkylene group having 1 to 10 carbon atoms and optionally having a substituent or a cyclic alkylene group having 3 to 10 carbon atoms and optionally having a substituent, preferably a linear or branched alkylene group having 1 to 10 carbon atoms and free from a carbonyl group or a cyclic alkylene group having 3 to 10 carbon atoms and free from a carbonyl group, more preferably a linear or branched alkylene group having 1 to 10 carbon atoms and not having a substituent, and still more preferably a methylene group (—$CH_2$—), an ethylene group (—$C_2H_4$—), an isopropylene group (—$CH(CH_3)CH_2$—), or a propylene group (—$C_3H_6$—).

Any two of $R^{1b}$, $R^{2b}$, $R^{3b}$, and $R^{4b}$ optionally bind to each other to form a ring.

In the formula (d), n is an integer of 1 or more. In the formula, n is preferably an integer of 1 to 40, more preferably an integer of 1 to 30, and still more preferably an integer of 5 to 25.

In the formula (d), p and q are each independently an integer of 0 or more. p is preferably an integer of 0 to 10, more preferably 0 or 1. q is preferably an integer of 0 to 10, more preferably an integer of 0 to 5.

The sum of n, p, and q is preferably an integer of 6 or more. The sum of n, p, and q is more preferably an integer of 8 or more. The sum of n, p, and q is also preferably an integer of 60 or less, more preferably an integer of 50 or less, and still more preferably an integer of 40 or less.

In the formula (d), $A^d$ is —$SO_3X^d$ or —$COOX^d$, wherein $X^d$ is H, a metal atom, $NR^{5d}_4$, imidazolium optionally having a substituent, pyridinium optionally having a substituent, or phosphonium optionally having a substituent, wherein $R^{5d}$ is H or an organic group and may be the same or different. $R^{5d}$ is preferably H or an organic group having 1 to 10 carbon atoms, and more preferably H or an organic group having 1 to 4 carbon atoms. Examples of the metal atom include monovalent and divalent metal atoms, and examples thereof include alkali metals (Group 1) and alkaline earth metals (Group 2), and preferred is Na, K or Li. $X^d$ may be a metal atom or $NR^{5d}_4$, wherein $R^{5d}$ is defined as described above.

$X^d$ is preferably H, an alkali metal (Group 1), an alkaline earth metal (Group 2), or $NR^{5d}_4$, more preferably H, Na, K, Li, or $NH_4$ because they are easily dissolved in water, still more preferably Na, K, or $NH_4$ because they are more easily dissolved in water, particularly preferably Na or $NH_4$, and most preferably $NH_4$ because it can be easily removed. When $X^d$ is $NH_4$, the solubility of the surfactant in an aqueous medium is excellent, and the metal component is unlikely to remain in the PTFE or the final product.

In the formula (d), L is a single bond, —$CO_2$—B—*, —OCO—B—*, —$CONR^{6d}$—B—*, —$NR^{6d}CO$—B—*, or —CO— other than the carbonyl groups in —$CO_2$—B—, —OCO—B—, —$CONR^{6d}$—B—, and —$NR^{6d}CO$—B—, wherein B is a single bond or an alkylene group having 1 to 10 carbon atoms and optionally having a substituent, $R^{6d}$ is H or an alkyl group having 1 to 4 carbon atoms and optionally having a substituent. The alkylene group more preferably has 1 to 5 carbon atoms. $R^{6d}$ is more preferably H or a methyl group. * indicates the side bonded to $A^d$ in the formula.

L is preferably a single bond.

The surfactant preferably has a $^1$H-NMR spectrum in which all peak intensities observed in a chemical shift range of 2.0 to 5.0 ppm give an integral value of 10 or higher.

The surfactant preferably has a $^1$H-NMR spectrum in which all peak intensities observed in a chemical shift range of 2.0 to 5.0 ppm give an integral value within the above range. In this case, the surfactant preferably has a ketone structure in the molecule.

The integral value of the surfactant is more preferably 15 or more, and preferably 95 or less, more preferably 80 or less, and still more preferably 70 or less.

The integral value is determined using a heavy water solvent at room temperature. The heavy water content is adjusted to 4.79 ppm.

Examples of the surfactant (d) include:
$CH_3C(O)CH_2CH_2CH_2CH_2CH_2CH_2CH_2COOK$,
$CH_3C(O)CH_2CH_2CH_2CH_2CH_2CH_2CH_2COONa$,
$CH_3C(O)CH_2CH_2CH_2CH_2CH_2CH_2COONa$,
$CH_3C(O)CH_2CH_2CH_2CH_2CH_2COONa$,
$CH_3C(O)CH_2CH_2CH_2CH_2COONa$, CH₃C(O)CH₂CH₂CH₂COONa,
CH₃C(O)CH₂CH₂CH₂CH₂CH₂CH₂CH₂CH₂CH₂CH₂CH₂CH₂COONa,
CH₃C(O)CH₂CH₂CH₂CH₂CH₂CH₂CH₂CH₂CH₂CH₂CH₂CH₂CH₂CH₂CH₂CH₂COONa,
(CH₃)₃CC(O)CH₂CH₂CH₂CH₂CH₂CH₂CH₂CH₂COONa,
(CH₃)₂CHC(O)CH₂CH₂CH₂CH₂CH₂CH₂CH₂CH₂COONa,
(CH₂)₅CHC(O)CH₂CH₂CH₂CH₂CH₂CH₂CH₂CH₂COONa,
CH₃CH₂C(O)CH₂CH₂CH₂CH₂CH₂CH₂COONa,
CH₃CH₂CH₂C(O)CH₂CH₂CH₂CH₂CH₂CH₂COONa,
CH₃CH₂CH₂CH₂C(O)CH₂CH₂CH₂CH₂CH₂COONa,
CH₃CH₂CH₂CH₂CH₂C(O)CH₂CH₂CH₂CH₂COONa,
CH₃CH₂CH₂CH₂CH₂CH₂C(O)CH₂CH₂CH₂COONa,
CH₃CH₂CH₂CH₂CH₂CH₂CH₂C(O)CH₂CH₂COONa,
CH₃CH₂CH₂CH₂CH₂CH₂CH₂CH₂C(O)CH₂COONa,
CH₃C(O)CH₂CH₂CH₂CH₂CH₂CH₂CH₂OCH₂CH₂COONa,
CH₃C(O)CH₂CH₂CH₂CH₂CH₂CH₂CH₂CH₂C(O)NHCH₂COOK,
CH₃C(O)CH₂CH₂CH₂CH₂CH₂CH₂CH₂CH₂NHC(O)CH₂COOK,
CH₃C(O)CH₂CH₂CH₂CH₂CH₂CH₂CH₂CH₂C(O)OCH₂COONa,
CH₃C(O)CH₂CH₂CH₂CH₂CH₂CH₂CH₂CH₂OC(O)CH₂COONa,
CH₃C(O)CH₂CH₂CH₂CH₂CH₂CH₂CH₂CH₂C(O)COONa,
CH₃C(O)CH₂CH₂CH₂CH₂CH₂CH₂CH₂CH₂C(O)COOH,
CH₃C(O)CH₂CH₂CH₂CH₂CH₂CH₂CH₂CH₂C(O)COOLi,
CH₃C(O)CH₂CH₂CH₂CH₂CH₂CH₂CH₂CH₂C(O)COONH₄.
CH₃C(O)CH₂CH₂CH₂CH₂CH₂CH₂CH₂CH₂C(O)COONa,
CH₃C(O)CH₂CH₂CH₂CH₂CH₂CH₂CH₂C(CH₃)₂COOK,
CH₃C(O)CH₂CH₂CH₂CH₂CH₂CH₂CH₂CH₂SO₃Na,
CH₃C(O)CH₂CH₂CH₂CH₂CH₂CH₂CH₂SO₃Na,
CH₃C(O)CH₂CH₂CH₂CH₂CH₂CH₂SO₃Na,
CH₃C(O)CH₂CH₂CH₂CH₂CH₂SO₃Na,
CH₃C(O)CH₂CH₂CH₂CH₂SO₃Na,
CH₃C(O)CH₂CH₂CH₂SO₃Na,
CH₃C(O)CH₂CH₂CH₂CH₂CH₂CH₂CH₂CH₂CH₂CH₂CH₂CH₂SO₃Na,
CH₃C(O)CH₂CH₂CH₂CH₂CH₂CH₂CH₂CH₂CH₂CH₂CH₂CH₂CH₂CH₂CH₂CH₂SO₃Na,
CH₃C(O)CH₂CH₂CH₂CH₂CH₂CH₂CH₂CH₂CH₂CH₂SO₃Na,
(CH₃)₃CC(O)CH₂CH₂CH₂CH₂CH₂CH₂CH₂CH₂CH₂SO₃Na,
(CH₃)₂CHC(O)CH₂CH₂CH₂CH₂CH₂CH₂CH₂CH₂CH₂SO₃Na,
(CH₂)₅CHC(O)CH₂CH₂CH₂CH₂CH₂CH₂CH₂CH₂CH₂SO₃Na,
CH₃C(O)CH₂CH₂CH₂CH₂CH₂CH₂CH₂CH₂SO₃Na,
CH₃C(O)CH₂CH₂CH₂CH₂CH₂CH₂CH₂SO₃Na,
CH₃C(O)CH₂CH₂CH₂CH₂CH₂CH₂SO₃Na,
CH₃C(O)CH₂CH₂CH₂CH₂CH₂SO₃Na,
CH₃C(O)CH₂CH₂CH₂CH₂SO₃Na,
CH₃C(O)CH₂CH₂CH₂SO₃Na,
CH₃C(O)CH₂CH₂SO₃Na,
CH₃C(O)CH₂SO₃Na,
CH₃C(O)CH₂CH₂CH₂CH₂CH₂CH₂CH₂CH₂CH₂OCH₂CH₂CH₂SO₃Na,
CH₃C(O)CH₂CH₂CH₂CH₂CH₂CH₂CH₂CH₂CH₂C(O)NHCH₂SO₃Na,
CH₃C(O)CH₂CH₂CH₂CH₂CH₂CH₂CH₂CH₂CH₂NHC(O)CH₂SO₃Na,
CH₃C(O)CH₂CH₂CH₂CH₂CH₂CH₂CH₂CH₂C(O)SO₃Na,
CH₃C(O)CH₂CH₂CH₂CH₂CH₂CH₂CH₂CH₂C(O)OCH₂SO₃Na,
CH₃C(O)CH₂CH₂CH₂CH₂CH₂CH₂CH₂CH₂OC(O)CH₂SO₃Na,
CH₃C(O)CH₂CH₂CH₂CH₂CH₂CH₂CH₂CH₂CH₂SO₃H,
CH₃C(O)CH₂CH₂CH₂CH₂CH₂CH₂CH₂CH₂CH₂SO₃K,
CH₃C(O)CH₂CH₂CH₂CH₂CH₂CH₂CH₂CH₂CH₂SO₃Li,
CH₃C(O)CH₂CH₂CH₂CH₂CH₂CH₂CH₂CH₂CH₂SO₃NH₄, and
CH₃C(O)CH₂CH₂CH₂CH₂CH₂CH₂CH₂C(CH₃)₂SO₃Na.

Examples of the hydrocarbon surfactant include a surfactant represented by the following general formula (1) (hereinafter also referred to as surfactant (1)):

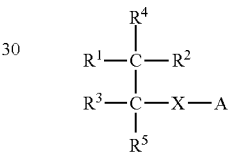

wherein $R^1$ to $R^5$ each represent H or a monovalent substituent, with the proviso that at least one of $R^1$ and $R^3$ represents a group represented by the general formula: —Y—$R^6$ and at least one of $R^2$ and $R^5$ represents a group represented by the general formula: —X-A or a group represented by the general formula: —Y—$R^6$;

X is the same or different at each occurrence and represents a divalent linking group or a bond;

A is the same or different at each occurrence and represents —COOM, —SO₃M, or —OSO₃M, wherein M is H, a metal atom, NR⁷₄, imidazolium optionally having a substituent, pyridinium optionally having a substituent, or phosphonium optionally having a substituent, wherein $R^7$ is H or an organic group; and Y is the same or different at each occurrence and represents a divalent linking group selected from the group consisting of —S(=O)₂—, —O—, —COO—, —OCO—, —CONR⁸—, and —NR⁸CO—, or a bond, wherein $R^8$ is H or an organic group;

$R^6$ is the same or different at each occurrence and represents an alkyl group having 1 or more carbon atoms optionally containing, between carbon atoms, at least one selected from the group consisting of a carbonyl group, an ester group, an amide group, and a sulfonyl group; and any two of $R^1$ to $R^5$ optionally bind to each other to form a ring.

The surfactant (1) will be described.

In the formula, $R^1$ to $R^5$ each represent H or a monovalent substituent, with the proviso that at least one of $R^1$ and $R^3$ represents a group represented by the general formula: —Y—$R^6$ and at least one of $R^2$ and $R^5$ represents a group represented by the general formula: —X-A or a group represented by the general formula: —Y—$R^6$. Any two of $R^1$ to $R^5$ optionally bind to each other to form a ring.

The substituent which may be contained in the alkyl group for $R^1$ is preferably a halogen atom, a linear or branched alkyl group having 1 to 10 carbon atoms, a cyclic alkyl group having 3 to 10 carbon atoms, or a hydroxy group, particularly preferably a methyl group or an ethyl group.

The alkyl group for $R^1$ is preferably free from a carbonyl group.

In the alkyl group, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

The alkyl group preferably contains no substituent.

$R^1$ is preferably a linear or branched alkyl group having 1 to 10 carbon atoms and optionally having a substituent or a cyclic alkyl group having 3 to 10 carbon atoms and optionally having a substituent, more preferably a linear or branched alkyl group having 1 to 10 carbon atoms and free from a carbonyl group or a cyclic alkyl group having 3 to 10 carbon atoms and free from a carbonyl group, still more preferably a linear or branched alkyl group having 1 to 10 carbon atoms and not having a substituent, further preferably a linear or branched alkyl group having 1 to 3 carbon atoms and not having a substituent, particularly preferably a methyl group (—$CH_3$) or an ethyl group (—$C_2H_5$), and most preferably a methyl group (—$CH_3$).

The monovalent substituent is preferably a group represented by the general formula: —Y—$R^6$, a group represented by the general formula: —X-A, —H, and a $C_{1-20}$ alkyl group optionally having a substituent, —$NH_2$, —$NHR^9$ (wherein $R^9$ is an organic group), —OH, —$COOR^9$ (wherein $R^9$ is an organic group) or —$OR^9$ (wherein $R^9$ is an organic group). The alkyl group preferably has 1 to 10 carbon atoms.

$R^9$ is preferably a $C_{1-10}$ alkyl group or a $C_{1-10}$ alkylcarbonyl group, more preferably a $C_{1-4}$ alkyl group or a $C_{1-4}$ alkylcarbonyl group.

In the formula, X is the same or different at each occurrence and represents a divalent linking group or a bond.

When $R^6$ does not contain any of a carbonyl group, an ester group, an amide group, and a sulfonyl group, X is preferably a divalent linking group containing at least one selected from the group consisting of a carbonyl group, an ester group, an amide group, and a sulfonyl group.

X is preferably a divalent linking group containing at least one bond selected from the group consisting of —CO—, —S(=O)$_2$—, —O—, —COO—, —OCO—, —S(=O)$_2$—O—, —O—S(=O)$_2$—, —$CONR^8$—, and —$NR^8CO$—, a $C_{1-10}$ alkylene group, or a bond. $R^8$ represents H or an organic group.

$R^8$ is preferably H or a $C_{1-10}$ organic group, more preferably H or a $C_{1-4}$ organic group, and still more preferably H.

In the formula, A is the same or different at each occurrence and represents —COOM, —$SO_3M$, or —$OSO_3M$, wherein M is H, a metal atom, $NR^7_4$, imidazolium optionally having a substituent, pyridinium optionally having a substituent, or phosphonium optionally having a substituent, wherein $R^7$ is H or an organic group; and the four $R^7$ may be the same as or different from each other.

$R^7$ is preferably H or a $C_{1-10}$ organic group, more preferably H or a $C_{1-4}$ organic group.

Examples of the metal atom include alkali metals (Group 1) and alkaline earth metals (Group 2), and preferred is Na, K, or Li.

M is preferably H, a metal atom, or $NR^7_4$, more preferably H, an alkali metal (Group 1), an alkaline earth metal (Group 2), or $NR^7_4$, still more preferably H, Na, K, Li, or $NH_4$, further preferably Na, K, or $NH_4$, particularly preferably Na or $NH_4$, and most preferably $NH_4$.

In the formula, Y is the same or different at each occurrence and represents a divalent linking group selected from the group consisting of —S(=O)$_2$—, —O—, —COO—, —OCO—, —$CONR^8$—, and —$NR^8CO$—, or a bond, wherein $R^8$ represents H or an organic group.

Y is preferably a divalent linking group selected from the group consisting of a bond, —O—, —COO—, —OCO—, —$CONR^8$—, and —$NR^8CO$—, more preferably a divalent linking group selected from the group consisting of a bond, —COO—, and —OCO—.

$R^8$ is preferably H or a $C_{1-10}$ organic group, more preferably H or a $C_{1-4}$ organic group, and still more preferably H.

In the formula, $R^6$ is the same or different at each occurrence and represents an alkyl group having 1 or more carbon atoms and optionally containing, between carbon atoms, at least one selected from the group consisting of a carbonyl group, an ester group, an amide group, and a sulfonyl group. The number of carbon atoms of the organic group in $R^6$ is preferably 2 or more, preferably 20 or less, more preferably 2 to 20, and still more preferably 2 to 10.

When the number of carbon atoms is 2 or more, the alkyl group for $R^6$ optionally contains, between carbon atoms, one or two or more of at least one selected from the group consisting of a carbonyl group, an ester group, an amide group, and a sulfonyl group, but the alkyl group contains no such groups at both ends. In the alkyl group for $R^6$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^6$ is preferably
  a group represented by the general formula: —$R^{10}$—CO—$R^{11}$,
  a group represented by the general formula: —$R^{10}$—COO—$R^{11}$,
  a group represented by the general formula: —$R^{11}$,
  a group represented by the general formula: —$R^{10}$—$NR^8CO$—$R^{11}$, or
  a group represented by the general formula: —$R^{10}$—$CONR^8$—$R^{11}$,
  wherein $R^8$ represents H or an organic group; $R^{10}$ represents an alkylene group; and $R^{11}$ represents an alkyl group optionally having a substituent.

$R^6$ is more preferably a group represented by the general formula: —$R^{10}$—CO—$R^{11}$.

$R^8$ is preferably H or a $C_{1-10}$ organic group, more preferably H or a $C_{1-4}$ organic group, and still more preferably H.

The alkylene group for $R^{10}$ preferably has 1 or more, and more preferably 3 or more carbon atoms, and preferably 20 or less, more preferably 12 or less, still more preferably 10 or less, and particularly preferably 8 or less carbon atoms. Further, the alkylene group for $R^{10}$ preferably has 1 to 20, more preferably 1 to 10, and still more preferably 3 to 10 carbon atoms.

The alkyl group for $R^{11}$ may have 1 to 20 carbon atoms, and preferably has 1 to 15, more preferably 1 to 12, still more preferably 1 to 10, further preferably 1 to 8, still further preferably 1 to 6, still much more preferably 1 to 3, particularly preferably 1 or 2, and most preferably 1 carbon atom. The alkyl group for $R^{11}$ preferably consists only of primary carbons, secondary carbons, and tertiary carbons, and particularly preferably consists only of primary carbons and secondary carbons. In other words, $R^{11}$ is preferably a methyl group, an ethyl group, an n-propyl group, or an isopropyl group, and most preferably a methyl group.

The surfactant (1) is preferably a compound represented by the general formula (1-1), a compound represented by the general formula (1-2), or a compound represented by the general formula (1-3), more preferably a compound represented by the general formula (1-1) or a compound represented by the general formula (1-2).

General Formula (1-1):

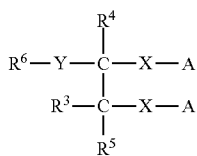

wherein $R^3$ to $R^6$, X, A, and Y are defined as described above.

General Formula (1-2):

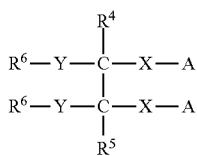

wherein $R^4$ to $R^6$, X, A, and Y are defined as described above.

General formula (1-3):

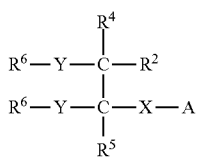

wherein $R^2$, $R^4$ to $R^6$, X, A, and Y are defined as described above.

The group represented by the general formula: —X-A is preferably
—COOM,
—$R^{12}$COOM,
—SO$_3$M,
—OSO$_3$M,
—$R^{12}$SO$_3$M,
—$R^{12}$OSO$_3$M,
—OCO—$R^{12}$—COOM,
—OCO—$R^{12}$—SO$_3$M,
—OCO—$R^{12}$—OSO$_3$M,
—COO—$R^{12}$—COOM,
—COO—$R^{12}$—SO$_3$M,
—COO—$R^{12}$—OSO$_3$M,
—CONR$^8$—$R^{12}$—COOM,
—CONR$^8$—$R^{12}$—SO$_3$M,
—CONR$^8$—$R^{12}$—OSO$_3$M,
—NR$^8$CO—$R^{12}$—COOM,
—NR$^8$CO—$R^{12}$—SO$_3$M,
—NR$^8$CO—$R^{12}$—OSO$_3$M,
—OS(=O)$_2$—$R^{12}$—COOM,
—OS(=O)$_2$—$R^{12}$—SO$_3$M, and
—OS(=O)$_2$—$R^{12}$—OSO$_3$M,
wherein $R^8$ and M are defined as described above; and $R^{12}$ is a $C_{1-10}$ alkylene group.

In the alkylene group for $R^{12}$, 75% or less of the hydrogen atoms bonded to the carbon atoms may be replaced by halogen atoms, 50% or less thereof may be replaced by halogen atoms, or 25% or less thereof may be replaced by halogen atoms. The alkylene group is preferably a non-halogenated alkylene group free from halogen atoms such as fluorine atoms and chlorine atoms.

The group represented by the general formula: —Y—$R^6$ is preferably
a group represented by the general formula: —$R^{10}$—CO—$R^{11}$,
a group represented by the general formula: —OCO—$R^{10}$—CO—$R^{11}$,
a group represented by the general formula: —COO—$R^{10}$—CO—$R^{11}$,
a group represented by the general formula: —OCO—$R^{10}$—COO—$R^{11}$,
a group represented by the general formula: —COO—$R^{11}$,
a group represented by the general formula: —NR$^8$CO—$R^{10}$—CO—$R^{11}$, or
a group represented by the general formula: —CONR$^8$—$R^{10}$—NR$^8$CO—$R^{11}$,
wherein $R^8$, $R^{10}$, and $R^{11}$ are defined as described above.

In the formula, $R^4$ and $R^5$ are each independently preferably H or a $C_{1-4}$ alkyl group.

In the alkyl groups for $R^4$ and $R^5$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^3$ in the general formula (1-1) is preferably H or a $C_{1-20}$ alkyl group optionally having a substituent, more preferably H or a $C_{1-20}$ alkyl group having no substituent, and still more preferably H.

In the alkyl group for $R^3$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

$R^2$ in the general formula (1-3) is preferably H, OH, or a $C_{1-20}$ alkyl group optionally having a substituent, more preferably H, OH, or a $C_{1-20}$ alkyl group having no substituent, and still more preferably H or OH.

In the alkyl group for $R^2$, 75% or less of the hydrogen atoms bonded to the carbon atoms may be replaced by halogen atoms, 50% or less thereof may be replaced by halogen atoms, or 25% or less thereof may be replaced by halogen atoms. The alkyl group is preferably a non-halogenated alkyl group free from halogen atoms such as fluorine atoms and chlorine atoms.

Examples of the hydrocarbon surfactant include a surfactant (1-0A) represented by the following formula (1-0A):

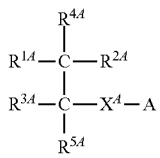

wherein $R^{1A}$ to $R^{5A}$ are H, a monovalent hydrocarbon group optionally containing, between carbon atoms, an ester group, or a group represented by general formula: —$X^A$-A, with the proviso that at least one of $R^{2A}$ and $R^{5A}$ represents a group represented by the general formula: —$X^A$-A;

$X^A$ is the same or different at each occurrence and represents a divalent hydrocarbon group or a bond;

A is the same or different at each occurrence and represents —COOM, wherein M is H, a metal atom, $NR^7_4$, imidazolium optionally having a substituent, pyridinium optionally having a substituent, or phosphonium optionally having a substituent, wherein $R^7$ is H or an organic group; and any two of $R^{1A}$ to $R^{5A}$ may be bonded to each other to form a ring.

In the general formula (1-0A), in $R^{1A}$ to $R^{5A}$, the number of carbon atoms in the monovalent hydrocarbon group optionally containing, between carbon atoms, an ester group is preferably 1 to 50 carbon atoms, and more preferably 5 to 20 carbon atoms. Any two of $R^{1A}$ to $R^{5A}$ optionally bind to each other to form a ring. The monovalent hydrocarbon group optionally containing, between carbon atoms, an ester group is preferably an alkyl group.

In the formula, in $X^A$, the number of carbon atoms in the divalent hydrocarbon group is preferably 1 to 50, and more preferably 5 to 20. Examples of the divalent hydrocarbon group include an alkylene group and an alkanediyl group, and preferred is an alkylene group.

In the general formula (1-0A), any one of $R^{2A}$ and $R^{5A}$ is preferably a group represented by the formula: —$X^A$-A, and more preferably, $R^{2A}$ is a group represented by the formula: —$X^A$-A.

In a preferred embodiment, in the general formula (1-0A), $R^{2A}$ is a group represented by the general formula: —$X^A$-A, and $R^{1A}$, $R^{3A}$, $R^{4A}$ and $R^{5A}$ are H. In this case, $X^A$ is preferably a bond or an alkylene group having 1 to 5 carbon atoms.

Another preferred embodiment is an embodiment in which in general formula (1-0A), $R^{2A}$ is a group represented by general formula: —$X^A$-A, $R^{1A}$ and $R^{3A}$ are groups represented by —$Y^A$—$R^6$, $Y^A$ is the same or different at each occurrence, and is —COO—, —OCO—, or a bond, and $R^6$ is the same or different at each occurrence, and is an alkyl group having 1 or more carbon atoms. In this case, it is preferable that $R^{4A}$ and $R^{5A}$ are H.

Examples of the hydrocarbon surfactant represented by the general formula (1-0A) include glutaric acid or a salt thereof, adipic acid or a salt thereof, pimelic acid or a salt thereof, suberic acid or a salt thereof, azelaic acid or a salt thereof, and sebacic acid or a salt thereof.

The aliphatic carboxylic acid-type hydrocarbon surfactant represented by the general formula (1-0A) may be a 2-chain 2-hydrophilic type synthetic surfactant, and examples of the gemini type surfactant include geminiserf (CHUKYO YUSHI CO., LTD.), Gemsurf α142 (carbon number: 12, lauryl group), Gemsurf α102 (carbon number: 10), and Gemsurf α182 (carbon number: 14).

The hydrocarbon surfactant in the polymerization is preferably at least one selected from the group consisting of the compound (α), the surfactant (a) represented by the formula (a), the surfactant (b) represented by the formula (b), the surfactant (c) represented by the formula (c), the surfactant (d) represented by the formula (d), and the surfactant (1) represented by the formula (1).

The hydrocarbon surfactant may be a hydrocarbon surfactant obtained by subjecting at least one surfactant selected from the group consisting of the compound (α), the surfactant (a) represented by the formula (a), the surfactant (b) represented by the formula (b), the surfactant (c) represented by the formula (c), the surfactant (d) represented by the formula (d), and the surfactant (1) represented by the formula (1) to a radical treatment or oxidation treatment. The radical treatment or oxidation treatment is as described above.

In the production method of the present disclosure, two or more of the hydrocarbon surfactants may be used at the same time.

It is also preferable that the hydrocarbon surfactant is a carboxylic acid-type hydrocarbon surfactant. The carboxylic acid-type hydrocarbon surfactant is not limited as long as it has a carboxyl group (—COOH) or a group in which the hydrogen atom of the carboxyl group is replaced by an inorganic cation (for example, metal atoms, ammonium, etc.), and for example, a hydrocarbon surfactant having a carboxyl group or a group in which the hydrogen atom of the carboxyl group is replaced by an inorganic cation can be used from among the hydrocarbon surfactants described above.

The carboxylic acid-type hydrocarbon surfactant is preferably one having a carboxyl group (—COOH) or a group in which the hydrogen atom of the carboxyl group is replaced with an inorganic cation (for example, metal atoms, ammonium, etc.), among at least one selected from the group consisting of the anionic surfactant represented by R-L-M described above, the surfactant (c) represented by the formula (c) and the surfactant (d) represented by the formula (d), or is preferably the compound (α) represented by the formula (α).

In the step C, the total amount of the hydrocarbon surfactant added is preferably 0.0001 to 10% by mass based on 100% by mass of the aqueous medium. The lower limit thereof is more preferably 0.001% by mass, while the upper limit thereof is more preferably 1% by mass. Less than 0.0001% by mass of the surfactant may cause insufficient dispersibility. More than 10% by mass of the surfactant may fail to give the effects corresponding to its amount added; on the contrary, such an amount of the surfactant may cause a reduction in the polymerization rate or even stop the reaction. The amount of the hydrocarbon surfactant added is appropriately determined depending on the type of monomer used, the molecular weight of the target fluoropolymer, and the like.

The step C preferably further includes a step of continuously adding a hydrocarbon surfactant. Adding the hydrocarbon surfactant continuously means, for example, adding the hydrocarbon surfactant not all at once, but adding over time and without interruption or adding in portions. The hydrocarbon surfactant may be added in the state of the aqueous solution prepared by preparing an aqueous solution containing the hydrocarbon surfactant and water.

In the step C, the step of continuously adding the hydrocarbon surfactant is preferably a step of starting to add the hydrocarbon surfactant to the aqueous medium when the solid content of the fluoropolymer formed in the aqueous medium is 0.5% by mass or less, and also continuously adding the polymer (I) thereafter. The hydrocarbon surfactant is more preferably started to be added when the solid content is 0.3% by mass or less, still more preferably started to be added when the solid content is 0.2% by mass or less, further preferably started to be added when the solid content is 0.1% by mass or less, and particularly preferably started to be added when the polymerization is initiated. The solid content is a concentration based on the total amount of the aqueous medium and the fluoropolymer.

In the step of continuously adding the hydrocarbon surfactant, the amount of the hydrocarbon surfactant added is preferably 0.0001 to 10% by mass based on 100% by mass of the aqueous medium. The lower limit thereof is preferably 0.001% by mass, more preferably 0.01% by mass, and still more preferably 0.1% by mass. The upper limit thereof is preferably 10% by mass, more preferably 1.0% by mass, and still more preferably 0.50% by mass. Less than 0.0001% by mass of the surfactant may cause insufficient dispersibility. More than 10% by mass of the surfactant may fail to give the effects corresponding to its amount; on the contrary, such an amount of the surfactant may cause a reduction in the polymerization rate or even stop the reaction. The amount of the compound added is appropriately determined in accordance with factors such as the types of the monomers used and the molecular weight of the target fluoropolymer.

In the step C, a fluoropolymer can be efficiently produced by using at least one of the hydrocarbon surfactants. Further, two or more of the hydrocarbon surfactants may be used as the surfactant in combination, and a compound having a surfactant function other than the hydrocarbon surfactants may be used in combination insofar as the compound is volatile or is allowed to remain in a molded body formed from the fluoropolymer or the like.

A nucleating agent may be used in the step C. The nucleating agent is preferably at least one selected from the group consisting of, for example, fluoropolyether and nonionic surfactant.

In this case, the step C is preferably a step of polymerizing a fluoromonomer in an aqueous medium in the presence of a hydrocarbon surfactant (provided that the nonionic surfactant is excluded) and the nucleating agent to obtain a fluoropolymer, and more preferably a step of polymerizing tetrafluoroethylene in an aqueous medium in the presence of a hydrocarbon surfactant (provided that the nonionic surfactant (nonionic hydrocarbon surfactant)is excluded) and the nucleating agent to obtain PTFE.

The fluoropolyether is preferably perfluoropolyether.

The fluoropolyether preferably has a repeating unit represented by the formulas (1a) to (1d):

 (1a)

 (1b)

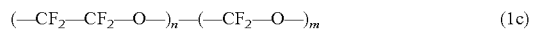 (1c)

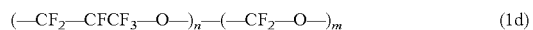 (1d)

wherein m and n are integers of 1 or more.

The fluoropolyether is preferably fluoropolyether acid or a salt thereof, and the fluoropolyether acid is preferably a carboxylic acid, a sulfonic acid, a sulfonamide, or a phosphonic acid, and more preferably a carboxylic acid. Among the fluoropolyether acid or a salt thereof, a salt of fluoropolyether acid is preferable, an ammonium salt of fluoropolyether acid is more preferable, and an ammonium salt of fluoropolyethercarboxylic acid is still more preferable.

The fluoropolyether acid or a salt thereof can have any chain structure in which oxygen atoms in the main chain of the molecule are separated by saturated fluorocarbon groups having 1 to 3 carbon atoms. Two or more types of fluorocarbon groups can be present in the molecule.

The fluoropolyether acid or its salt is preferably a compound represented by the following formula:

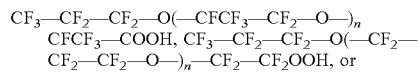

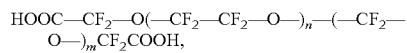

wherein m and n are the same as above
or a salt thereof.

These structures are described in J. Appl. Polymer Sci., 57, 797(1995) examined by Kasai. As disclosed herein, such fluoropolyethers can have a carboxylic acid group or a salt thereof at one end or both ends. Similarly, such fluoropolyethers may have a sulfonic acid or phosphonic acid group or a salt thereof at one end or both ends. In addition, fluoropolyethers having acid functional groups at both ends may have different groups at each end. Regarding monofunctional fluoropolyether, the other end of the molecule is usually perfluorinated, but may contain a hydrogen or chlorine atom.

Fluoropolyethers having acid groups at one or both ends have at least two ether oxygens, preferably at least four ether oxygens, and still more preferably at least six ether oxygens. Preferably, at least one fluorocarbon group separating ether oxygens, more preferably at least two of such fluorocarbon groups, has 2 or 3 carbon atoms. Still more preferably, at least 50% of the fluorocarbon groups separating ether oxygens has 2 or 3 carbon atoms. Also preferably, the fluoropolyether has at least 15 carbon atoms in total, and for example, a preferable minimum value of n or n+m in the repeating unit structure is preferably at least 5. Two or more fluoropolyethers having an acid group at one end or both ends can be used in the methods according to the present disclosure. Typically, fluoropolyethers may contain a plurality of compounds in varying proportions within the molecular weight range relative to the average molecular weight, unless special care is taken in the production of a single specific fluoropolyether compound.

The fluoropolyether preferably has a number-average molecular weight of 800 g/mol or more. The fluoropolyether acid or the salt thereof preferably has a number-average molecular weight of less than 6,000 g/mol, because the fluoropolyether acid or the salt thereof may be difficult to disperse in an aqueous medium. The fluoropolyether acid or the salt thereof more preferably has a number-average molecular weight of 800 to 3,500 g/mol, and still more preferably 1,000 to 2,500 g/mol.

The amount of the fluoropolyether is preferably 5 to 3,000 ppm, more preferably 5 to 2,000 ppm, still more preferably the lower limit is 10 ppm, and still more preferably the upper limit is 100 ppm based on the aqueous medium.

Examples of the nonionic surfactant as the nucleating agent include the nonionic surfactants exemplified as the hydrocarbon surfactant described above, and specifically include at least one selected from the group consisting of the compound represented by the general formula (i) and the compound represented by the general formula (ii).

When used as a nucleating agent, the amount of the nonionic surfactant is preferably 0.1 to 0.0000001% by mass, more preferably 0.01 to 0.000001% by mass, based on the aqueous medium.

Further, in the production method of the present disclosure, in addition to the hydrocarbon surfactant, an additive may also be used to stabilize the compounds. Examples of the additive include a buffer, a pH adjuster, a stabilizing aid, and a dispersion stabilizer.

The stabilizing aid is preferably paraffin wax, fluorine-containing oil, a fluorine-containing solvent, silicone oil, or the like. The stabilizing aids may be used alone or in combination of two or more. The stabilizing aid is more preferably paraffin wax. The paraffin wax may be in the form of liquid, semi-solid, or solid at room temperature, and is preferably a saturated hydrocarbon having 12 or more carbon atoms. The paraffin wax usually preferably has a melting point of 40 to 65° C., and more preferably 50 to 65° C.

The amount of the stabilizing aid used is preferably 0.1 to 12% by mass, and more preferably 0.1 to 8% by mass, based on the mass of the aqueous medium used. It is desirable that the stabilizing aid is sufficiently hydrophobic so that the stabilizing aid is completely separated from the pre-treatment aqueous dispersion containing the fluoropolymer such as PTFE dispersion after polymerization of the fluoropolymer such as PTFE, and does not serve as a contaminating component.

The polymerization is performed by charging a polymerization reactor with an aqueous medium, the hydrocarbon surfactant, a monomer, and optionally other additives, stirring the contents of the reactor, maintaining the reactor at a predetermined polymerization temperature, and adding a predetermined amount of a polymerization initiator to thereby initiate the polymerization reaction. After the initiation of the polymerization reaction, the components such as the monomers, the polymerization initiator, a chain transfer agent, and the surfactant may additionally be added depending on the purpose. The surfactant may be added after the polymerization reaction is initiated.

In the polymerization, the polymerization temperature is usually 5 to 120° C., and the polymerization pressure is 0.05 to 10 MPaG. The polymerization temperature and the polymerization pressure are determined as appropriate in accordance with the types of the monomers used, the molecular weight of the target fluoropolymer, and the reaction rate.

For example, the polymerization temperature is more preferably 30° C. or higher, and still more preferably 50° C. or higher. Further, the polymerization temperature is more preferably 120° C. or lower, and still more preferably 100° C. or lower.

Further, the polymerization pressure is more preferably 0.3 MPaG or higher, still more preferably 0.5 MPaG or higher, more preferably 5.0 MPaG or lower, and still more preferably 3.0 MPaG or lower. In particular, from the viewpoint of improving the yield of the fluoropolymer, the polymerization pressure is preferably 1.0 MPaG or higher, more preferably 1.2 MPaG or higher, still more preferably 1.5 MPaG or higher, and particularly preferably 2.0 MPaG or higher.

The polymerization initiator may be any polymerization initiator capable of generating radicals within the polymerization temperature range, and known oil-soluble and/or water-soluble polymerization initiators may be used. The polymerization initiator may be combined with a reducing agent, for example, to form a redox agent, which initiates the polymerization. The concentration of the polymerization initiator is appropriately determined depending on the types of the monomers, the molecular weight of the target fluoropolymer, and the reaction rate.

The polymerization initiator to be used may be an oil-soluble radical polymerization initiator or a water-soluble radical polymerization initiator.

The oil-soluble radical polymerization initiator may be a known oil-soluble peroxide, and representative examples thereof include dialkyl peroxycarbonates such as diisopropyl peroxydicarbonate and di-sec-butyl peroxydicarbonate; peroxy esters such as t-butyl peroxyisobutyrate and t-butyl peroxypivalate; and dialkyl peroxides such as di-t-butyl peroxide, as well as di[perfluoro (or fluorochloro) acyl] peroxides such as di(ω-hydro-dodecafluorohexanoyl)peroxide, di(ω-hydro-tetradecafluoroheptanoyl)peroxide, di(ω-hydro-hexadecafluorononanoyl)peroxide, di(perfluorobutyryl)peroxide, di(perfluorovaleryl)peroxide, di(perfluorohexanoyl)peroxide, di(perfluoroheptanoyl)peroxide, di(perfluorooctanoyl)peroxide, di(perfluorononanoyl)peroxide, di(ω-chloro-hexafluorobutyryl)peroxide, di(ω-chloro-decafluorohexanoyl)peroxide, di(ω-chloro-tetradecafluorooctanoyl)peroxide, ω-hydro-dodecafluoroheptanoyl-ω-hydrohexadecafluorononanoyl-peroxide, ω-chloro-hexafluorobutyryl-ω-chloro-decafluorohexanoyl-peroxide, ω-hydrododecafluoroheptanoyl-perfluorobutyryl-peroxide, di(dichloropentafluorobutanoyl)peroxide, di(trichlorooctafluorohexanoyl)peroxide, di(tetrachloroundecafluorooctanoyl)peroxide, di(pentachlorotetradecafluorodecanoyl)peroxide, and di(undecachlorodotoriacontafluorodocosanoyl)peroxide.

The water-soluble radical polymerization initiator may be a known water-soluble peroxide, and examples thereof include ammonium salts, potassium salts, and sodium salts of persulfuric acid, perboric acid, perchloric acid, perphosphoric acid and percarbonic acid; organic peroxides such as disuccinic acid peroxide and diglutaric acid peroxide; and t-butyl permaleate and t-butyl hydroperoxide. A reducing agent such as a sulfite or a sulfurous acid salt may be contained together, and the amount thereof may be 0.1 to 20 times the amount of the peroxide.

For example, in a case where the polymerization is performed at a low temperature of 30° C. or lower, the polymerization initiator used is preferably a redox initiator obtained by combining an oxidizing agent and a reducing agent. Examples of the oxidizing agent include persulfates, organic peroxides, potassium permanganate, manganese triacetate, ammonium cerium nitrate, and bromate. Examples of the reducing agent include sulfites, bisulfites, bromates, diimines, and oxalic acid. Examples of the persulfates include ammonium persulfate and potassium persulfate. Examples of the sulfite include sodium sulfite and ammonium sulfite. In order to increase the decomposition rate of the initiator, the combination of the redox initiator may preferably contain a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron sulfate (II), ammonium persulfate/sulfite/iron sulfate (II), ammonium persulfate/sulfite, ammonium persulfate/iron sulfate (II), manganese triacetate/oxalic acid, ammonium cerium nitrate/oxalic acid, bromate/sulfite, and bromate/bisulfite, and potassium permanganate/oxalic acid or ammonium persulfate/sulfite/iron sulfate (II) is preferred. In the case of using a redox initiator, either an oxidizing agent or a reducing agent may be charged into a polymerization tank in advance, followed by adding the other continuously or intermittently thereto to initiate the polymerization. For example, in the case of using potassium permanganate/oxalic acid, preferably, oxalic acid is charged into a polymerization tank and potassium permanganate is continuously added thereto.

The polymerization initiator may be added in any amount, and the initiator in an amount that does not significantly decrease the polymerization rate (e.g., several parts per million in water) or more may be added at once in the initial stage of polymerization, or may be added successively or continuously. The upper limit thereof falls within a range where the reaction temperature is allowed to increase while the polymerization reaction heat is removed through the device surfaces. The upper limit thereof is more preferably within a range where the polymerization reaction heat can be removed through the device surfaces. More specifically, the amount of the polymerization initiator added is preferably 1 ppm or more, more preferably 10 ppm or more, and still more preferably 50 ppm or more based on the aqueous medium. The amount of the polymerization initiator added is preferably 100,000 ppm or less, more preferably 10,000 ppm or less, and still more preferably 5,000 ppm or less.

The aqueous medium at the time of polymerization is a reaction medium in which the polymerization is performed, and means a liquid containing water. The aqueous medium may be any medium containing water, and it may be one containing water and, for example, any of fluorine-free organic solvents such as alcohols, ethers, and ketones, and/or fluorine-containing organic solvents having a boiling point of 40° C. or lower.

In the polymerization, a known chain transfer agent, radical scavenger, and decomposer may be further added to adjust the polymerization rate and the molecular weight depending on the purpose.

Examples of the chain transfer agent include esters such as dimethyl malonate, diethyl malonate, methyl acetate, ethyl acetate, butyl acetate, and dimethyl succinate, as well as isopentane, methane, ethane, propane, methanol, isopropanol, acetone, various mercaptans, various halogenated hydrocarbons such as carbon tetrachloride, and cyclohexane.

The chain transfer agent to be used may be a bromine compound or an iodine compound. An example of a polymerization method using a bromine compound or an iodine compound is a method of performing polymerization of a fluoromonomer in an aqueous medium substantially in the absence of oxygen and in the presence of a bromine compound or an iodine compound (iodine transfer polymerization). Representative examples of the bromine compound or the iodine compound to be used include compounds represented by the following general formula:

$$R^a I_x Br_y$$

wherein x and y are each an integer of 0 to 2 and satisfy $1 \leq x+y \leq 2$; and $R^a$ is a saturated or unsaturated fluorohydrocarbon or chlorofluorohydrocarbon group having 1 to 16 carbon atoms, or a hydrocarbon group having 1 to 3 carbon atoms, each of which optionally contains an oxygen atom. By using a bromine compound or an iodine compound, iodine or bromine is introduced into the polymer, and serves as a crosslinking point.

Examples of the bromine compound or iodine compound include 1,3-diiodoperfluoropropane, 2-iodoperfluoropropane, 1,3-diiodo-2-chloroperfluoropropane, 1,4-diiodoperfluorobutane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, 1,3-diiodo-n-propane, $CF_2Br_2$, $BrCF_2CF_2Br$, $CF_3CFBrCF_2Br$, $CFClBr_2$, $BrCF_2CFClBr$, $CFBrClCFClBr$, $BrCF_2CF_2CF_2Br$, $BrCF_2CFBrOCF_3$, 1-bromo-2-iodoperfluoroethane, 1-bromo-3-iodoperfluoropropane, 1-bromo-4-iodoperfluorobutane, 2-bromo-3-iodoperfluorobutane, 3-bromo-4-iodoperfluorobutene-1,2-bromo-4-iodoperfluorobutene-1, and a monoiodo- and monobromo-substitution product, diiodo- and monobromo-substitution product, and (2-iodoethyl)- and (2-bromoethyl)-substitution product of benzene. These compounds may be used alone or in any combination.

Of these, 1,4-diiodoperfluorobutane, 1,6-diiodoperfluorohexane, and 2-iodoperfluoropropane are preferably used from the viewpoints of polymerization reactivity, crosslinkability, availability, and the like.

The amount of the chain transfer agent is preferably 0.001 to 10,000 ppm based on the aqueous medium. The amount of the chain transfer agent is more preferably 0.01 ppm or more, still more preferably 0.05 ppm or more, and particularly preferably 0.1 ppm or more based on the aqueous medium. Further, the amount of the chain transfer agent is more preferably 1,000 ppm or less, still more preferably 500 ppm or less, and particularly preferably 100 ppm or less based on the aqueous medium.

The chain transfer agent may be added to the reaction vessel at once before initiation of the polymerization, may be added at once after initiation of the polymerization, may be added in multiple portions during the polymerization, or may be added continuously during the polymerization.

The radical scavenger used may be a compound having no reinitiation ability after addition or chain transfer to a free radical in the polymerization system. Specifically, a compound that readily undergoes a chain transfer reaction with a primary radical or propagating radical and then generates a stable radical that does not react with a monomer or a compound that readily undergoes an addition reaction with a primary radical or propagating radical to generate a stable radical is used.

The activity of what is commonly referred to as a chain transfer agent is characterized by the chain transfer constant and the reinitiation efficiency, but among the chain transfer agents, those having almost 0% reinitiation efficiency are called radical scavenger.

The radical scavenger can also be said to be, for example, a compound having a chain transfer constant to fluoromonomer at the polymerization temperature larger than the polymerization rate constant and a reinitiation efficiency of substantially 0%. "Reinitiation efficiency is substantially 0%" means that the generated radicals turn the radical scavenger into stable radicals.

Preferably, the compound has a chain transfer constant (Cs) (=chain transfer rate constant (kc)/polymerization rate constant (kp)) to fluoromonomer at the polymerization temperature of 0.1 or larger, and the compound more preferably has a chain transfer constant (Cs) of 0.5 or more, still more preferably 1.0 or more, further preferably 5.0 or more, and particularly preferably 10 or more.

The radical scavenger in the present disclosure is preferably at least one selected from the group consisting of aromatic hydroxy compounds, aromatic amines, N,N-diethylhydroxylamine, quinone compounds, terpenes, thiocyanates, and cupric chloride ($CuCl_2$).

Examples of the aromatic hydroxy compound include unsubstituted phenols, polyhydric phenols, salicylic acid, m- or p-salicylic acid, gallic acid, and naphthol.

Examples of the unsubstituted phenol include o-, m-, or p-nitrophenol, o-, m-, or p-aminophenol, and p-nitrosophenol. Examples of the polyhydric phenol include catechol, resorcin, hydroquinone, pyrogallol, phloroglucin, and naphthresorcinol.

Examples of the aromatic amines include o-, m-, or p-phenylenediamine and benzidine.

Examples of the quinone compound include o-, m- or p-benzoquinone, 1,4-naphthoquinone, and alizarin.

Examples of the thiocyanate include ammonium thiocyanate ($NH_4SCN$), potassium thiocyanate (KSCN), and sodium thiocyanate (NaSCN).

The radical scavenger is preferably an aromatic hydroxy compound, more preferably an unsubstituted phenol or a polyhydric phenol, and still more preferably a hydroquinone.

The amount of the radical scavenger added is preferably an amount corresponding to 3 to 500% (molar basis) of the polymerization initiator concentration from the viewpoint of reducing the standard specific gravity. The lower limit thereof is more preferably 5% (molar basis), still more preferably 8% (molar basis), still more preferably 10% (molar basis), further preferably 13% (molar basis) or 15% (molar basis), still further preferably 20% (molar basis), particularly preferably 25% (molar basis), particularly preferably 30% (molar basis), and particularly preferably 35% (molar basis). The upper limit thereof is preferably 400% (molar basis), still more preferably 300% (molar basis), further more preferably 200% (molar basis), and still further preferably 100% (molar basis).

The decomposer of the polymerization initiator may be any compound capable of decomposing the polymerization initiator to be used, and for example, at least one selected from the group consisting of sulfite, bisulfite, bromate, diimine, diimine salts, oxalic acid, oxalate, copper and iron salts is preferable. Examples of the sulfite include sodium sulfite and ammonium sulfite. An example of the copper salt is copper(II) sulfate and an example of the iron salt is iron(II) sulfate.

The amount of the decomposer of a polymerization initiator added is in the range of 3 to 300% by mass based on the amount of the oxidizing agent combined as a polymerization initiator (redox initiator). The amount thereof is preferably 3 to 150% by mass, and still more preferably 15 to 100% by mass.

The amount of the decomposer added to the polymerization initiator is preferably an amount corresponding to 3 to 500% (molar basis) of the polymerization initiator concentration from the viewpoint of reducing the standard specific gravity. The lower limit thereof is preferably 5% (molar basis), still more preferably 8% (molar basis), still more preferably 10% (molar basis), still more preferably 13% (molar basis), and further preferably 15% (molar basis). The upper limit thereof is preferably 400% (molar basis), still more preferably 300% (molar basis), further more preferably 200% (molar basis), and still further preferably 100% (molar basis).

During the polymerization of the fluoromonomer, the radical scavenger or the decomposer of a polymerization initiator is preferably added when the concentration of fluoropolymer formed in the aqueous medium is 5% by mass or more (concentration based on the total of the aqueous medium and fluoropolymer). More preferably, it is added when the concentration thereof is 8% by mass or more, and still more preferably 10% by mass or more.

Further, it is preferable to be added when the concentration of fluoropolymer formed in the aqueous medium is 40% by mass or less. More preferably, it is added when the concentration thereof is 35% by mass or less, and still more preferably 30% by mass or less.

During the polymerization of the fluoromonomer, the radical scavenger or the decomposer of a polymerization initiator may be continuously added. During the polymerization of the fluoromonomer, the radical scavenger or the decomposer of a polymerization initiator can be added not all at once, but added over time and without interruption or adding in portions.

The step C may include a step of producing an aqueous dispersion of fluoropolymer particles by polymerizing the fluoromonomer in an aqueous medium in the presence of a hydrocarbon surfactant, and a step of performing seed polymerization of the fluoromonomer to the fluoropolymer particles in the aqueous dispersion of the fluoropolymer particles.

In the step C, the fluoromonomer is preferably polymerized substantially in the absence of a fluorine-containing surfactant.

Although fluorine-containing surfactants have been conventionally used for polymerization of a fluoropolymer in an aqueous medium, the production method of the present disclosure can obtain a fluoropolymer aqueous dispersion with reduced coloration even when the pre-treatment aqueous dispersion containing a fluoropolymer is obtained without using a fluorine-containing surfactant.

The expression "substantially in the absence of a fluorine-containing surfactant" as used herein means that the amount of the fluorine-containing surfactant in the aqueous medium is 10 ppm or less, preferably 1 ppm or less, more preferably 100 ppb or less, still more preferably 10 ppb or less, and further preferably 1 ppb or less.

Examples of the fluorine-containing surfactant include anionic fluorine-containing surfactants.

The anionic fluorine-containing surfactant may be, for example, a fluorine atom-containing surfactant having 20 or less carbon atoms in total in the portion excluding the anionic group.

The fluorine-containing surfactant may also be a surfactant containing fluorine having a molecular weight of 800 or less in the anionic moiety.

The "anionic moiety" means the portion of the fluorine-containing surfactant excluding the cation. For example, in the case of $F(CF_2)_{n1}COOM$ represented by the formula (I) described later, the anionic moiety is the "$F(CF_2)_{n1}COO$" portion.

Examples of the fluorine-containing surfactant also include fluorine-containing surfactants having a Log POW of 3.5 or less. The Log POW is a partition coefficient between 1-octanol and water, which is represented by Log P (wherein P represents the ratio between the concentration of the fluorine-containing surfactant in octanol and the concentration of the fluorine-containing surfactant in water in a phase-separated octanol/water (1:1) liquid mixture containing the fluorine-containing surfactant).

Log POW is determined as follows. Specifically, HPLC is performed on standard substances (heptanoic acid, octanoic acid, nonanoic acid, and decanoic acid) each having a known octanol/water partition coefficient using TOSOH ODS-120T column (ϕ4.6 mm×250 mm, Tosoh Corp.) as a column and acetonitrile/0.6% by mass $HClO_4$ aqueous solution=1/1 (vol/vol %) as an eluent at a flow rate of 1.0 ml/min, a sample amount of 300 μL, and a column temperature of 40° C.; with a detection light of UV 210 nm. For each standard substance, a calibration curve is drawn with respect to the elution time and the known octanol/water partition coefficient. Based on the calibration curve, Log POW is calculated from the elution time of the sample liquid in HPLC.

Specific examples of the fluorine-containing surfactant include those disclosed in U.S. Patent Application Publication No. 2007/0015864, U.S. Patent Application Publication No. 2007/0015865, U.S. Patent Application Publication No. 2007/0015866, and U.S. Patent Application Publication No. 2007/0276103, U.S. Patent Application Publication No. 2007/0117914, U.S. Patent Application Publication No. 2007/142541, U.S. Patent Application Publication No. 2008/0015319, U.S. Pat. Nos. 3,250,808, 3,271,341, Japanese Patent Laid-Open No. 2003-119204, International Publication No. WO2005/042593, International Publication No. WO2008/060461, International Publication No. WO2007/046377, International Publication No. WO2007/119526, International Publication No. WO2007/046482, International Publication No. WO2007/046345, U.S. Patent Application Publication No. 2014/0228531, International Publication No. WO2013/189824, and International Publication No. WO2013/189826.

Examples of the anionic fluorine-containing surfactant include a compound represented by the following general formula ($N^0$):

$$X^{n0}-Rf^{n0}-Y^0 \qquad (N^0)$$

wherein $X^{n0}$ is H, Cl, or F; $Rf^{n0}$ is a linear, branched, or cyclic alkylene group having 3 to 20 carbon atoms in which some or all of H are replaced by F; the alkylene group optionally containing one or more ether bonds in which some of H are replaced by Cl; and $Y^0$ is an anionic group.

The anionic group $Y^0$ may be —COOM, —SO$_2$M, or —SO$_3$M, and may be —COOM or —SO$_3$M.

M is H, a metal atom, $NR^7_4$, imidazolium optionally having a substituent, pyridinium optionally having a substituent, or phosphonium optionally having a substituent, wherein $R^7$ is H or an organic group.

Examples of the metal atom include alkali metals (Group 1) and alkaline earth metals (Group 2), such as Na, K, or Li.

$R^7$ may be H or a $C_{1-10}$ organic group, may be H or a $C_{1-4}$ organic group, and may be H or a $C_{1-4}$ alkyl group.

M may be H, a metal atom, or $NR^7_4$, may be H, an alkali metal (Group 1), an alkaline earth metal (Group 2), or $NR^7_4$, and may be H, Na, K, Li, or NH$_4$.

$Rf^{n0}$ may be one in which 50% or more of H has been replaced by fluorine.

Examples of the compound represented by the general formula ($N^0$) include:

a compound represented by the following general formula ($N^1$):

$$X^{n0}-(CF_2)_{m1}-Y^0 \qquad (N^1)$$

wherein $X^{n0}$ is H, Cl, and F; m1 is an integer of 3 to 15; and $Y^0$ is as defined above;

a compound represented by the following general formula ($N^2$):

$$Rf^{n1}-O-(CF(CF_3)CF_2O)_{m2}CFX^{n1}-Y^0 \qquad (N^2)$$

wherein $Rf^{n1}$ is a perfluoroalkyl group having 1 to 5 carbon atoms; m2 is an integer of 0 to 3; $X^{n1}$ is F or CF$_3$; and $Y^0$ is as defined above;

a compound represented by the following general formula ($N^3$):

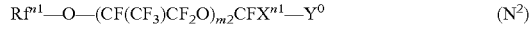

$$Rf^{n2}(CH_2)_{m3}-(Rf^{n3})_q-Y^0 \qquad (N^3)$$

wherein $Rf^{n2}$ is a partially or fully fluorinated alkyl group having 1 to 13 carbon atoms and optionally containing an ether bond; m3 is an integer of 1 to 3; $Rf^{n3}$ is a linear or branched perfluoroalkylene group having 1 to 3 carbon atoms; q is 0 or 1; and $Y^0$ is as defined above;

a compound represented by the following general formula ($N^4$):

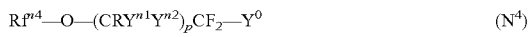

$$Rf^{n4}-O-(CRY^{n1}Y^{n2})_pCF_2-Y^0 \qquad (N^4)$$

wherein $Rf^{n4}$ is a linear or branched partially or fully fluorinated alkyl group having 1 to 12 carbon atoms and optionally containing an ether bond; and $Y^{n1}$ and $Y^{n2}$ are the same or different and are each H or F; p is 0 or 1; and $Y^0$ is as defined above; and a compound represented by the general formula ($N^5$):

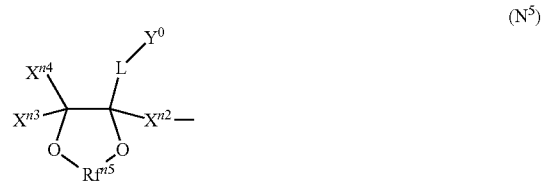

wherein $X^{n2}$, $X^{n3}$, and $X^{n4}$ may be the same or different and are each H, F, or a linear or branched partially or fully fluorinated alkyl group having 1 to 6 carbon atoms and optionally containing an ether bond; $Rf^{n5}$ is a linear or branched partially or fully fluorinated alkylene group having 1 to 3 carbon atoms and optionally containing an ether bond; L is a linking group; and $Y^0$ is as defined above, with the proviso that the total carbon number of $X^{n2}$, $X^{n3}$, $X^{n4}$, and $Rf^{n5}$ is 18 or less.

More specific examples of the compound represented by the above general formula ($N^0$) include a perfluorocarboxylic acid (I) represented by the following general formula (I), an ω-H perfluorocarboxylic acid (II) represented by the following general formula (II), a perfluoropolyethercarboxylic acid (III) represented by the following general formula (III), a perfluoroalkylalkylenecarboxylic acid (IV) represented by the following general formula (IV), a perfluoroalkoxyfluorocarboxylic acid (V) represented by the following general formula (V), a perfluoroalkylsulfonic acid (VI) represented by the following general formula (VI), an ω-H perfluorosulfonic acid (VII) represented by the following general formula (VII), a perfluoroalkylalkylene sulfonic acid (VIII) represented by the following general formula (VIII), an alkylalkylene carboxylic acid (IX) represented by the following general formula (IX), a fluorocarboxylic acid (X) represented by the following general formula (X), an alkoxyfluorosulfonic acid (XI) represented by the following general formula (XI), a compound (XII) represented by the following general formula (XII), and a compound (XIII) represented by the following general formula (XIII).

The perfluorocarboxylic acid (I) is represented by the following general formula (I):

$$F(CF_2)_{n1}COOM \qquad (I)$$

wherein n1 is an integer of 3 to 14; and M is H, a metal atom, $NR^7_4$, imidazolium optionally having a substituent, pyridinium optionally having a substituent, or phosphonium optionally having a substituent, wherein $R^7$ is H or an organic group.

The ω-H perfluorocarboxylic acid (II) is represented by the following general formula (II):

$$H(CF_2)_{n2}COOM \quad (II)$$

wherein n2 is an integer of 4 to 15; and M is as defined above.

The perfluoropolyethercarboxylic acid (III) is represented by the following general formula (III):

$$Rf^1\text{—}O\text{—}(CF(CF_3)CF_2O)_{n3}CF(CF_3)COOM \quad (III)$$

wherein $Rf^1$ is a perfluoroalkyl group having 1 to 5 carbon atoms; n3 is an integer of 0 to 3; and M is as defined above.

The perfluoroalkylalkylenecarboxylic acid (IV) is represented by the following general formula (IV):

$$Rf^2(CH_2)_{n4}Rf^3COOM \quad (IV)$$

wherein $Rf^2$ is a perfluoroalkyl group having 1 to 5 carbon atoms; $Rf^3$ is a linear or branched perfluoroalkylene group having 1 to 3 carbon atoms; n4 is an integer of 1 to 3; and M is as defined above.

The alkoxyfluorocarboxylic acid (V) is represented by the following general formula (V):

$$Rf^4\text{—}O\text{—}CY^1Y^2CF_2\text{—}COOM \quad (V)$$

wherein $Rf^4$ is a linear or branched partially or fully fluorinated alkyl group having 1 to 12 carbon atoms and optionally containing an ether bond; $Y^1$ and $Y^2$ are the same or different and are each H or F; and M is as defined above.

The perfluoroalkylsulfonic acid (VI) is represented by the following general formula (VI):

$$F(CF_2)_{n5}SO_3M \quad (VI)$$

wherein n5 is an integer of 3 to 14; and M is as defined above.

The ω-H perfluorosulfonic acid (VII) is represented by the following general formula (VII):

$$H(CF_2)_{n6}SO_3M \quad (VII)$$

wherein n6 is an integer of 4 to 14; and M is as defined above.

The perfluoroalkylalkylenesulfonic acid (VIII) is represented by the following general formula (VIII):

$$Rf^5(CH_2)_{n7}SO_3M \quad (VIII)$$

wherein $Rf^5$ is a perfluoroalkyl group having 1 to 13 carbon atoms; n7 is an integer of 1 to 3; and M is as defined above.

The alkylalkylenecarboxylic acid (IX) is represented by the following general formula (IX):

$$Rf^6(CH_2)_{n8}COOM \quad (IX)$$

wherein $Rf^6$ is a linear or branched partially or fully fluorinated alkyl group having 1 to 13 carbon atoms and optionally containing an ether bond; n8 is an integer of 1 to 3; and M is as defined above.

The fluorocarboxylic acid (X) is represented by the following general formula (X):

$$Rf^7\text{—}O\text{—}Rf^8\text{—}O\text{—}CF_2\text{—}COOM \quad (X)$$

wherein $Rf^7$ is a linear or branched partially or fully fluorinated alkyl group having 1 to 6 carbon atoms and optionally containing an ether bond; $Rf^8$ is a linear or branched partially or fully fluorinated alkyl group having 1 to 6 carbon atoms; and M is as defined above.

The alkoxyfluorosulfonic acid (XI) is represented by the following general formula (XI):

$$Rf^9\text{—}O\text{—}CY^1Y^2CF_2\text{—}SO_3M \quad (XI)$$

wherein $Rf^9$ is a linear or branched partially or fully fluorinated alkyl group having 1 to 12 carbon atoms and optionally containing an ether bond and optionally containing chlorine; $Y^1$ and $Y^2$ are the same or different and are each H or F; and M is as defined above.

The compound (XII) is represented by the following general formula (XII):

wherein $X^1$, $X^2$, and $X^3$ may be the same or different and are H, F, and a linear or branched partially or fully fluorinated alkyl group having 1 to 6 carbon atoms and optionally containing an ether bond; $Rf^{10}$ is a perfluoroalkylene group having 1 to 3 carbon atoms; L is a linking group; and $Y^0$ is an anionic group.

$Y^0$ may be —COOM, —SO$_2$M, or —SO$_3$M, and may be —SO$_3$M or COOM, where M is as defined above.

Examples of L include a single bond, a partially or fully fluorinated alkylene group having 1 to 10 carbon atoms and optionally containing an ether bond.

The compound (XIII) is represented by the following general formula (XIII):

$$Rf^{11}\text{—}O\text{—}(CF_2CF(CF_3)O)_{n9}(CF_2O)_{n10}CF_2COOM \quad (XIII)$$

wherein $Rf^{11}$ is a fluoroalkyl group having 1 to 5 carbon atoms containing chlorine, n9 is an integer of 0 to 3, n10 is an integer of 0 to 3, and M is as defined above. Examples of the compound (XIII) include CF$_2$ClO(CF$_2$CF(CF$_3$)O)$_{n9}$(CF$_2$O)$_{n10}$CF$_2$COONH$_4$ (mixture having an average molecular weight of 750, in the formula, n9 and n10 are as defined above).

As described above, examples of the anionic fluorine-containing surfactant include a carboxylic acid-based surfactant and a sulfonic acid-based surfactant.

By the polymerization, a pre-treatment aqueous dispersion containing the fluoropolymer can be obtained. The concentration of the fluoropolymer is usually 8 to 50% by mass of the aqueous dispersion obtained by the polymerization. In the aqueous dispersion, the lower limit of the concentration of the fluoropolymer is preferably 10% by mass, more preferably 15% by mass, and the upper limit thereof is preferably 40% by mass, more preferably 35% by mass.

The production method of the present disclosure preferably includes a step B of adding a hydrocarbon surfactant to the pre-treatment aqueous dispersion before the step A. An aqueous dispersion containing a fluoropolymer obtained by polymerization in the presence of a hydrocarbon surfactant usually contains the hydrocarbon surfactant used in the polymerization, but ultrafiltration, microfiltration, or dialysis membrane treatment may reduce the amount of the hydrocarbon surfactant used in the polymerization and reduce the stability of the aqueous dispersion. Therefore, by adding the hydrocarbon surfactant before the step A, the stability of the aqueous dispersion during ultrafiltration, microfiltration, or dialysis membrane treatment is improved, and the coloring component can be efficiently reduced. Further, the stability of the aqueous dispersion obtained through the step A can be improved.

The step B may be performed, for example, by adding water containing a hydrocarbon surfactant. When the production method of the present disclosure includes the step C described above, the step B is performed after the step C and before the step A.

The hydrocarbon surfactant added in the step B is not limited, and the hydrocarbon surfactant described above can be used, but among them, a nonionic surfactant is preferable.

The nonionic surfactant is not limited, but is preferably at least one selected from the group consisting of the compound represented by the general formula (i) and the compound represented by the general formula (ii).

Examples of the fluoropolymer include TFE polymer in which the monomer with the highest mole fraction of monomers in the polymer (hereinafter referred to as "most monomer") is TFE, VDF polymer in which the most monomer is VDF, and a CTFE polymer in which the most monomer is CTFE.

Examples of the fluoropolymer include (I) non melt-processible fluororesins, including tetrafluoroethylene polymers (TFE polymers (PTFE)); (II) melt-fabricable fluororesins, including ethylene/TFE copolymers (ETFE), TFE/HFP copolymers (FEP), TFE/perfluoro(alkyl vinyl ether) copolymers (e.g., PFA, MFA), TFE/perfluoroallyl ether copolymer, TFE/VDF copolymer, and electrolyte polymer precursor; and (III) fluoroelastomer, including TFE/propylene copolymers, TFE/propylene/third monomer copolymers (the third monomer is VDF, HFP, CTFE, fluoroalkyl vinyl ethers, or the like), copolymers of TFE and fluoroalkyl vinyl ethers; HFP/ethylene copolymers, HFP/ethylene/TFE copolymers; PVDF; thermoplastic elastomers such as VDF/HFP copolymers, HFP/ethylene copolymers, and VDF/TFE/HFP copolymers; and fluorine-containing segmented polymers described in Japanese Patent Publication No. 61-49327.

The TFE polymer may suitably be a TFE homopolymer, or may be a copolymer containing (1) TFE, (2) one or two or more fluorine-containing monomers each of which is different from TFE and has 2 to 8 carbon atoms, in particular VDF, HFP, or CTFE, and (3) another monomer. Examples of (3) the another monomer include fluoro(alkyl vinyl ethers) having an alkyl group having 1 to 5 carbon atoms, particularly 1 to 3 carbon atoms; fluorodioxoles; perfluoroalkyl ethylenes; and ω-hydroperfluoroolefins.

The TFE polymer may also be a copolymer of TFE and one or two or more fluorine-free monomers. Examples of the fluorine-free monomers include alkenes such as ethylene and propylene; vinyl esters; and vinyl ethers. The TFE polymer may also be a copolymer of TFE, one or two or more fluorine-containing monomers having 2 to 8 carbon atoms, and one or two or more fluorine-free monomers.

The VDF polymer may suitably be a VDF homopolymer (PVDF), or may be a copolymer containing (1) VDF, (2) one or two or more fluoroolefins each of which is different from VDF and has 2 to 8 carbon atoms, in particular TFE, HFP, or CTFE, and (3) a perfluoro(alkyl vinyl ether) having an alkyl group having 1 to 5 carbon atoms, particularly 1 to 3 carbon atoms, or the like.

The CTFE polymer may suitably be a CTFE homopolymer, or may be a copolymer containing (1) CTFE, (2) one or two or more fluoroolefins each of which is different from CTFE and has 2 to 8 carbon atoms, in particular TFE or HFP, and (3) a perfluoro(alkyl vinyl ether) having an alkyl group having 1 to 5 carbon atoms, particularly 1 to 3 carbon atoms.

The CTFE polymer may also be a copolymer of CTFE and one or two or more fluorine-free monomers, and examples of the fluorine-free monomers include alkenes such as ethylene and propylene; vinyl esters; and vinyl ethers.

The fluoropolymer may be vitreous, plastic, or elastomeric. The fluoropolymer is amorphous or partially crystallized, and may be subjected to compression firing, melt fabrication, or non-melt fabrication.

In the step C, the pre-treatment aqueous dispersion containing a fluoropolymer, for example, (I) non melt-processible fluororesins, including tetrafluoroethylene polymers (TFE polymers (PTFE)); (II) melt-fabricable fluororesins, including ethylene/TFE copolymers (ETFE), TFE/HFP copolymers (FEP), TFE/perfluoro(alkyl vinyl ether) copolymers (e.g., PFA, MFA), TFE/perfluoroallyl ether copolymer, TFE/VDF copolymer, and electrolyte polymer precursor; and (III) fluoroelastomer, including TFE/propylene copolymers, TFE/propylene/third monomer copolymers (the third monomer is VDF, HFP, CTFE, fluoroalkyl vinyl ethers, or the like), copolymers of TFE and fluoroalkyl vinyl ethers; HFP/ethylene copolymers, HFP/ethylene/TFE copolymers; PVDF; thermoplastic elastomers such as VDF/HFP copolymers, HFP/ethylene copolymers, and VDF/TFE/HFP copolymers; and fluorine-containing segmented polymers described in Japanese Patent Publication No. 61-49327.

The fluoropolymer is preferably a fluororesin, more preferably a fluororesin having a fluorine substitution percentage, calculated by the following formula, of 50% or higher, still more preferably a fluororesin having the fluorine substitution percentage of higher than 50%, further preferably a fluororesin having the fluorine substitution percentage of 55% or higher, further preferably a fluororesin having the fluorine substitution percentage of 60% or higher, further preferably a fluororesin having the fluorine substitution percentage of 75% or higher, particularly preferably a fluororesin having the fluorine substitution percentage of 80% or higher, and most preferably a fluororesin having the fluorine substitution percentage of 90 to 100%, i.e., a perfluororesin.

Fluorine substitution percentage (%)=(number of fluorine atoms bonded to carbon atoms constituting fluoropolymer)/((number of hydrogen atoms bonded to carbon atoms constituting fluoropolymer)+(number of fluorine atoms and chlorine atoms bonded to carbon atoms constituting fluoropolymer))×100  (Formula)

The perfluororesin is more preferably a fluororesin having a fluorine substitution percentage of 95 to 100%, still more preferably PTFE, FEP, or PFA, particularly preferably PTFE.

The fluoropolymer may have a core-shell structure. An example of the fluoropolymer having a core-shell structure is a PTFE including a core of high-molecular-weight PTFE and a shell of a lower-molecular-weight PTFE or a modified PTFE in the particle. An example of such a PTFE is PTFE disclosed in National Publication of International Patent Application No. 2005-527652.

The core-shell structure may have the following structures, for example.
Core: TFE homopolymer Shell: TFE homopolymer
Core: Modified PTFE Shell: TFE homopolymer
Core: Modified PTFE Shell: Modified PTFE
Core: TFE homopolymer Shell: Modified PTFE
Core: Low-molecular-weight PTFE Shell: High-molecular-weight PTFE
Core: High-molecular-weight PTFE Shell: Low-molecular-weight PTFE In the fluoropolymer having a core-shell structure, the lower limit of the core ratio is preferably 0.5% by mass, more preferably 1.0% by mass, still more preferably 3.0% by mass, particularly preferably 5.0% by mass, and most preferably 10.0% by mass. The upper limit of the core ratio is preferably 99.5% by mass, more preferably 99.0% by mass, still more preferably 98.0% by mass, further preferably 97.0% by mass, particularly preferably 95.0% by mass, and most preferably 90.0% by mass.

In the fluoropolymer having a core-shell structure, the lower limit of the shell ratio is preferably 0.5% by mass, more preferably 1.0% by mass, still more preferably 3.0% by mass, particularly preferably 5.0% by mass, and most preferably 10.0% by mass. The upper limit of the shell ratio is preferably 99.5% by mass, more preferably 99.0% by mass, still more preferably 98.0% by mass, further preferably 97.0% by mass, particularly preferably 95.0% by mass, and most preferably 90.0% by mass.

In the fluoropolymer having a core-shell structure, the core or the shell may have two or more layers. For example, the fluoropolymer may be a fluoropolymer having a trilayer structure having a core central portion of modified PTFE, a core outer layer portion of TFE homopolymer, and a shell of modified PTFE.

Examples of the fluoropolymer having the core-shell structure also include those in which one particle of the fluoropolymer has a plurality of cores.

The above-mentioned (I) non melt-processible fluororesin, (II) melt-fabricable fluororesin, and (III) fluoroelastomer suitably produced by the production method of the present disclosure are preferably produced by the following embodiments.

(I) Non Melt-Processible Fluororesins

In the step C, the polymerization of TFE is usually performed at a polymerization temperature of 10 to 150° C. and a polymerization pressure of 0.05 to 5 MPaG. For example, the polymerization temperature is more preferably 30° C. or higher, and still more preferably 50° C. or higher. Further, the polymerization temperature is more preferably 120° C. or lower, and still more preferably 100° C. or lower. Further, the polymerization pressure is more preferably 0.3 MPaG or higher, still more preferably 0.5 MPaG or higher, and more preferably 5.0 MPaG or lower, still more preferably 3.0 MPaG or lower. In particular, from the viewpoint of improving the yield of fluoropolymer, the polymerization pressure is preferably 1.0 MPaG or more, more preferably 1.2 MPaG or more, still more preferably 1.5 MPaG or more, and more preferably 2.0 MPaG or more.

In one embodiment, in the polymerization, pure water is charged into a pressure-resistant reaction vessel equipped with a stirrer, after deoxidation, TFE is charged, the temperature is set to a predetermined temperature, and a polymerization initiator is added to initiate the reaction. When the pressure decreases as the reaction progresses, additional TFE is continuously or intermittently fed to maintain the initial pressure. When the amount of TFE fed reaches a predetermined level, feeding is stopped, and then TFE in the reaction vessel is purged and the temperature is returned to room temperature, whereby the reaction is completed. Additional TFE may be added continuously or intermittently to prevent pressure drop.

In the production of TFE polymer (PTFE), various known modifying monomers can also be used in combination. In the present specification, the TFE polymer is a concept including not only a TFE homopolymer but also a copolymer of TFE and a modifying monomer, which is non melt-processible (hereinafter referred to as "modified PTFE").

Examples of the modifying monomer include perhaloolefins such as HFP and CTFE; fluoro(alkyl vinyl ether) having an alkyl group having 1 to 5 carbon atoms, particularly 1 to 3 carbon atoms; cyclic fluorinated monomers such as fluorodioxol; perhaloalkylethylene; and ω-hydroperhaloolefins. The modifying monomer can be supplied by initial batch addition or continuous or intermittent divided addition depending on the purpose and the supply of TFE.

When the TFE polymer is polytetrafluoroethylene (PTFE), various conventionally known modifying monomers can be used in combination with TFE. In the present specification, the PTFE is a concept including not only a TFE homopolymer but also a copolymer of TFE and a modifying monomer, which is non melt-processible (hereinafter referred to as "modified PTFE").

The total amount of the modifying monomer unit is preferably in the range of 0.00001 to 1.0% by mass based on the total polymerization units of PTFE. The lower limit of the total amount is more preferably 0.0001% by mass, still more preferably 0.001% by mass, and further preferably 0.005% by mass. The upper limit thereof is 0.90% by mass, 0.50% by mass, 0.40% by mass, 0.30% by mass, 0.20% by mass, 0.15% by mass, 0.10% by mass, and 0.05% by mass in the order of preference.

The term "modifying monomer unit" as used herein means a portion of the molecular structure of the TFE polymer as a part derived from the modifying monomer.

Examples of the modifying monomer include perhaloolefins such as HFP, CTFE, and perfluorovinyl ether; fluoro (alkyl vinyl ether) having an alkyl group having 1 to 5 carbon atoms, particularly 1 to 3 carbon atoms; cyclic fluorinated monomers such as fluorodioxol; perhaloalkylethylenes such as (perfluoroalkyl)ethylene; and ω-hydroperhaloolefins. The modifying monomer can be supplied by initial batch addition or continuous or intermittent divided addition depending on the purpose and the supply of TFE.

The modifying monomer is not limited as long as it can be copolymerized with TFE, and examples thereof include fluoromonomers and non-fluoromonomers. The modifying monomer to be used may be one kind or a plurality of kinds.

Examples of the non-fluoromonomer include, but not limited to, a monomer represented by the general formula:

wherein $R^{Q1}$ represents a hydrogen atom or an alkyl group; L represents a single bond, —CO—O—*, —O—CO—* or —O—; * represents a bonding position with the $R^{Q2}$; and $R^{Q2}$ represents a hydrogen atom, an alkyl group, or a nitrile group.

Examples of the non-fluoromonomer include methyl acrylate, methyl methacrylate, ethyl acrylate, ethyl methacrylate, propyl acrylate, propyl methacrylate butyl acrylate, butyl methacrylate, hexyl methacrylate, cyclohexyl methacrylate, vinyl methacrylate, vinyl acetate, acrylic acid, methacrylic acid, acrylonitrile, methacrylonitrile, ethyl vinyl ether, and cyclohexyl vinyl ether. Among these, the non-fluoromonomer is preferably butyl methacrylate, vinyl acetate, or acrylic acid.

Examples of the fluoromonomer include perfluoroolefins such as hexafluoropropylene (HFP); hydrogen-containing fluoroolefins such as trifluoroethylene and vinylidene fluoride (VDF); perhaloolefins such as chlorotrifluoroethylene; perfluorovinyl ethers; (perfluoroalkyl)ethylenes; and perfluoroallyl ethers.

Examples of the perfluorovinyl ether include, but are not limited to, a perfluoro unsaturated compound represented by the following general formula (A):

$$CF_2=CF-ORf \qquad (A)$$

wherein Rf represents a perfluoroorganic group. The "perfluoroorganic group" as used herein means an organic group in which all hydrogen atoms bonded to the carbon atoms are replaced by fluorine atoms. The perfluoroorganic group optionally has ether oxygen.

Examples of the perfluorovinyl ether include perfluoro (alkyl vinyl ether) (PAVE) in which Rf is a perfluoroalkyl group having 1 to 10 carbon atoms in the general formula (A). The perfluoroalkyl group preferably has 1 to 5 carbon atoms.

Examples of the perfluoroalkyl group in PAVE include a perfluoromethyl group, a perfluoroethyl group, a perfluoropropyl group, a perfluorobutyl group, a perfluoropentyl group, and a perfluorohexyl group.

Examples of the perfluorovinyl ether further include those represented by the general formula (A) in which Rf is a perfluoro(alkoxyalkyl) group having 4 to 9 carbon atoms; those in which Rf is a group represented by the following formula:

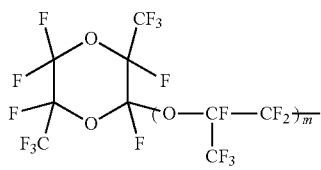

wherein m represents 0 or an integer of 1 to 4; and those in which Rf is a group represented by the following formula:

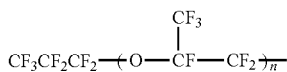

wherein n is an integer of 1 to 4.

Examples of hydrogen-containing fluoroolefins include $CH_2=CF_2$, $CFH=CH_2$, $CFH=CF_2$, $CF_2=CFCF_3$, $CH_2=CFCF_3$, $CH_2=CHCF_3$, $CHF=CHCF_3$ (E-form), and $CHF=CHCF_3$ (Z-form).

Examples of the (perfluoroalkyl)ethylene (PFAE) include, but are not limited to, (perfluorobutyl)ethylene (PFBE), and (perfluorohexyl)ethylene (PFHE).

Examples of perfluoroallyl ether include a fluoromonomer represented by the general formula: $CF_2=CF-CF_2-ORf$ wherein Rf represents a perfluoroorganic group.

Rf of the general formula is the same as Rf of the general formula (A). Rf is preferably a perfluoroalkyl group having 1 to 10 carbon atoms or a perfluoroalkoxyalkyl group having 1 to 10 carbon atoms. The perfluoroallyl ether is preferably at least one selected from the group consisting of $CF_2=CF-CF_2-O-CF_3$, $CF_2=CF-CF_2-O-C_2F_5$, $CF_2=CF-CF_2-O-C_3F_7$, and $CF_2=CF-CF_2-O-C_4F_9$, more preferably at least one selected from the group consisting of $CF_2=CF-CF_2-O-C_2F_5$, $CF_2=CF-CF_2-O-C_3F_7$, and $CF_2=CF-CF_2-O-C_4F_9$, and still more preferably $CF_2=CF-CF_2-O-CF_2CF_2CF_3$.

In the case of using TFE as a fluoromonomer to produce PTFE as a fluoropolymer, (polyfluoroalkyl)ethylene and/or a comonomer (3) having a monomer reactivity ratio rTFE in copolymerization with TFE of 0.1 to 8 may be mixed in the polymerization system in an amount of 0.001 to 0.01% by mass relative to the final PTFE yield at the initiation of polymerization of TFE, so that a PTFE aqueous dispersion can be produced which has high stability enough to maintain properties such as processibility and moldability in the following steps and which is capable of providing a molded article having high heat resistance.

The monomer reactivity ratio in the copolymerization with TFE is a value obtained by dividing a rate constant when the propagating radical reacts with TFE when the propagating radical is less than a repeating unit based on TFE by a rate constant when the propagating radical reacts with a comonomer. The lower this value is, the more reactive the comonomer is with TFE. The reactivity ratio can be determined by copolymerizing the comonomer with TFE varying the charging compositional features, determining the compositional features in the polymer formed immediately after initiation, and calculating the reactivity ratio by Fineman-Ross equation based on the compositional features.

The copolymerization is performed using 3,600 g of deionized degassed water, 1,000 ppm of ammonium perfluorooctanoate based on the water, and 100 g of paraffin wax contained in an autoclave made of stainless steel with an internal volume of 6.0 L at a pressure of 0.78 MPaG and a temperature of 70° C. A comonomer in an amount of 0.05 g, 0.1 g, 0.2 g, 0.5 g, or 1.0 g is added into the reactor, and then 0.072 g of ammonium persulfate (20 ppm based on the water) is added thereto. To maintain the polymerization pressure at 0.78 MPaG, TFE is continuously fed thereinto. When the charged amount of TFE reaches 1,000 g, stirring is stopped and the pressure is released until the pressure in the reactor decreases to the atmospheric pressure. After cooling, the paraffin wax is separated to obtain an aqueous dispersion containing the resulting polymer. The aqueous dispersion is stirred so that the resulting polymer coagulates, and the polymer is dried at 150° C. The compositional features in the resulting polymer are calculated by appropriate combination of NMR, FT-IR, elemental analysis, and X-ray fluorescence analysis depending on the types of the monomers.

The modifying monomer is also preferably exemplified by a comonomer (3) having a monomer reactivity ratio of 0.1 to 8. The presence of the comonomer (3) makes it possible to obtain PTFE particles having a small particle size, and to thereby obtain an aqueous dispersion having high dispersion stability.

The comonomer (3) having a monomer reactivity ratio of 0.1 to 8 is preferably at least one selected from the group consisting of comonomers represented by the formulas (3a) to (3d):

$$CH_2=CH-Rf^1 \qquad (3a)$$

wherein $Rf^1$ is a perfluoroalkyl group having 1 to 10 carbon atoms;

$$CF_2=CF-O-Rf^2 \qquad (3b)$$

wherein $Rf^2$ is a perfluoroalkyl group having 1 to 2 carbon atoms;

$$CF_2=CF-O-(CF_2)_nCF=CF_2 \qquad (3c)$$

wherein n is 1 or 2; and

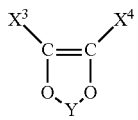 (3d)

wherein $X^3$ and $X^4$ are each F, Cl, or a methoxy group; and Y is represented by the formula Y1 or Y2;

—CF=CF— (Y1)

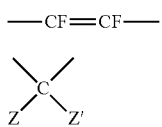 (Y2)

in the formula Y2, Z and Z' are each F or a fluorinated alkyl group having 1 to 3 carbon atoms.

The content of the comonomer (3) unit is preferably in the range of 0.0001 to 1.0% by mass based on the total polymerization units of PTFE. The lower limit thereof is more preferably 0.0001% by mass, still more preferably 0.0005% by mass, further preferably 0.001% by mass, and still further preferably 0.005% by mass. The upper limit thereof is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

The modifying monomer is preferably at least one selected from the group consisting of hexafluoropropylene, chlorotrifluoroethylene, vinylidene fluoride, perfluoro(alkyl vinyl ether), (perfluoroalkyl)ethylene, ethylene, and modifying monomers having a functional group capable of reacting by radical polymerization and a hydrophilic group, in view of obtaining an aqueous dispersion having a small average primary particle size, a small aspect ratio of primary particles, and excellent stability. The use of the modifying monomer allows for obtaining an aqueous dispersion of PTFE having a smaller average primary particle size, a smaller aspect ratio of the primary particles, and excellent dispersion stability. By using the aqueous dispersion of PTFE thus obtained as the pre-treatment aqueous dispersion, it is possible to produce a fluoropolymer aqueous dispersion having a small average primary particle size, a small aspect ratio of primary particles, and excellent dispersion stability.

From the viewpoint of reactivity with TFE, the modifying monomer preferably contains at least one selected from the group consisting of hexafluoropropylene, perfluoro(alkyl vinyl ether), and (perfluoroalkyl)ethylene.

More preferably, the modifying monomer contains at least one selected from the group consisting of hexafluoropropylene, perfluoro(methyl vinyl ether), perfluoro(propyl vinyl ether), (perfluorobutyl)ethylene, (perfluorohexyl)ethylene, and (perfluorooctyl)ethylene.

The total amount of the hexafluoropropylene unit, the perfluoro(alkyl vinyl ether) unit and the (perfluoroalkyl) ethylene unit is preferably in the range of 0.00001 to 1.0% by mass based on total polymerization units of PTFE. The lower limit of the total amount is more preferably 0.0001% by mass, still more preferably 0.0005% by mass, further preferably 0.001% by mass, still further preferably 0.005% by mass, and particularly preferably 0.009% by mass. The upper limit thereof is 0.9% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

It is also preferable that the modifying monomer contains a modifying monomer having a functional group capable of reacting by radical polymerization and a hydrophilic group (hereinafter, referred to as "modifying monomer (A)").

The presence of the modifying monomer (A) makes it possible to obtain PTFE particles having a small primary particle size, and to thereby obtain an aqueous dispersion having high dispersion stability. Further, the aspect ratio of the primary particles can be made small. That is, by using the modifying monomer (A) in the step C, the fluoropolymer aqueous dispersion finally obtained has high dispersion stability. Further, the PTFE contained in the fluoropolymer aqueous dispersion can have a small primary particle size and a small aspect ratio of the primary particles.

The amount of the modifying monomer (A) used is preferably an amount exceeding 0.1 ppm of the aqueous medium, more preferably an amount exceeding 0.5 ppm, still more preferably an amount exceeding 1.0 ppm, further preferably 5 ppm or more, and particularly preferably 10 ppm or more. When the amount of the modifying monomer (A) is too small, the particle size of the obtained PTFE may not be reduced.

The amount of the modifying monomer (A) used may be in the above range, but the upper limit may be, for example, 5,000 ppm. Further, in the production method, the modifying monomer (A) may be added to the system during the reaction in order to improve the stability of the aqueous dispersion during or after the reaction.

Since the modifying monomer (A) is highly water-soluble, even if the unreacted modifying monomer (A) remains in the aqueous dispersion, it can be easily removed in the concentration step or the coagulation/washing step.

The modifying monomer (A) is incorporated into the resulting polymer in the process of polymerization, but the concentration of the modifying monomer (A) in the polymerization system itself is low and the amount incorporated into the polymer is small, so that there is no problem that the heat resistance of PTFE is lowered or PTFE is colored after sintering.

Examples of the hydrophilic group in the modifying monomer (A) include —$NH_2$, —$PO_3M$, —$P(O)(OM)_2$, —$OPO_3M$, —$OP(O)(OM)_2$, —$SO_3M$, —$OSO_3M$, and —COOM, wherein M represents H, a metal atom, $NR^7_4$, imidazolium optionally having a substituent, pyridinium optionally having a substituent, or phosphonium optionally having a substituent, wherein $R^7$ is H or an organic group, and may be the same or different, and any two thereof may be bonded to each other to form a ring. Of these, the hydrophilic group is preferably —$SO_3M$ or —COOM.

The alkyl group is preferable as the organic group in $R^7$. $R^7$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, alkali metals (Group 1) and alkaline earth metals (Group 2), and preferred is Na, K, or Li.

Examples of the "functional group capable of reacting by radical polymerization" in the modifying monomer (A) include a group having an ethylenically unsaturated bond such as a vinyl group and an allyl group. The group having an ethylenically unsaturated bond may be represented by the following formula:

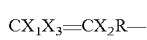

wherein $X_1$, $X_2$, and $X_3$ are each independently F, Cl, H, $CF_3$, $CF_2H$, $CFH_2$ or $CH_3$; and R is a linking group.

Examples of the linking group R include linking groups as $R^a$ which will be described later.

Preferred are groups having an unsaturated bond, such as —CH=CH₂, —CF=CH₂, —CH=CF₂, —CF=CF₂, —CH₂—CH=CH₂, —CF₂—CF=CH₂, —CF₂—CF=CF₂, —(C=O)—CH=CH₂, —(C=O)—CF=CH₂, —(C=O)—CH=CF₂, —(C=O)—CF=CF₂, —(C=O)—C(CH₃)=CH₂, —(C=O)—C(CF₃)=CH₂, —(C=O)—C(CH₃)=CF₂, —(C=O)—C(CF₃)=CF₂, —O—CH₂—CH=CH₂, —O—CF₂—CF=CH₂, —O—CH₂—CH=CF₂, and —O—CF₂—CF=CF₂.

Since the modifying monomer (A) has a functional group capable of reacting by radical polymerization, it is presumed that when used in the polymerization, it reacts with a fluorine-containing monomer at the initial stage of the polymerization reaction and forms particles with high stability having a hydrophilic group derived from the modifying monomer (A). Therefore, it is considered that the number of particles increases when the polymerization is performed in the presence of the modifying monomer (A).

The polymerization may be performed in the presence of one of the modifying monomers (A), or two or more thereof.

In the polymerization, a compound having an unsaturated bond may be used as the modifying monomer (A).

The modifying monomer (A) is preferably at least one selected from the group consisting of the compounds represented by the general formula (4):

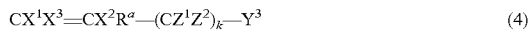

$$CX^1X^3=CX^2R^a-(CZ^1Z^2)_k-Y^3 \quad (4)$$

wherein $X^1$, $X^2$, and $X^3$ are each independently F, Cl, H, or CF₃; $Y^3$ is a hydrophilic group; $R^a$ is a linking group; $Z^1$ and $Z^2$ are each independently H, F, or CF₃; and k is 0 or 1.

Examples of the hydrophilic group include —NH₂, —PO₃M, —P(O)(OM)₂, —OPO₃M, —OP(O)(OM)₂, —SO₃M, —OSO₃M, and —COOM, wherein M represents H, a metal atom, NR⁷₄, imidazolium optionally having a substituent, pyridinium optionally having a substituent, or phosphonium optionally having a substituent, wherein $R^7$ is H or an organic group, and may be the same or different, and any two thereof may be bonded to each other to form a ring. Of these, the hydrophilic group is preferably —SO₃M or —COOM. $R^7$ is preferably H or a $C_{1-10}$ organic group, more preferably H or a $C_{1-4}$ organic group, and still more preferably H or a $C_{1-4}$ alkyl group.

Examples of the metal atom include monovalent and divalent metal atoms, alkali metals (Group 1) and alkaline earth metals (Group 2), and preferred is Na, K, or Li.

The use of the modifying monomer (A) allows for obtaining an aqueous dispersion having a smaller average primary particle size and superior stability. Also, the aspect ratio of the primary particles can be made smaller.

$R^a$ is a linking group. The "linking group" as used herein refers to a divalent linking group. The linking group may be a single bond and preferably contains at least one carbon atom, and the number of carbon atoms may be 2 or more, 4 or more, 8 or more, 10 or more, or 20 or more. The upper limit thereof is not limited, but may be 100 or less, and may be 50 or less, for example.

The linking group may be linear or branched, cyclic or acyclic, saturated or unsaturated, substituted or unsubstituted, and optionally contains one or more heteroatoms selected from the group consisting of sulfur, oxygen, and nitrogen, and optionally contains one or more functional groups selected from the group consisting of esters, amides, sulfonamides, carbonyls, carbonates, urethanes, ureas and carbamates. The linking group may be free from carbon atoms and may be a catenary heteroatom such as oxygen, sulfur, or nitrogen.

$R^a$ is preferably a catenary heteroatom such as oxygen, sulfur, or nitrogen, or a divalent organic group.

When $R^a$ is a divalent organic group, the hydrogen atom bonded to the carbon atom may be replaced by a halogen other than fluorine, such as chlorine, and may or may not contain a double bond. Further, $R^a$ may be linear or branched, and may be cyclic or acyclic. $R^a$ may also contain a functional group (e.g., ester, ether, ketone, amine, halide, etc.).

$R^a$ may also be a fluorine-free divalent organic group or a partially fluorinated or perfluorinated divalent organic group.

$R^a$ may be, for example, a hydrocarbon group in which a fluorine atom is not bonded to a carbon atom, a hydrocarbon group in which some of the hydrogen atoms bonded to a carbon atom are replaced by fluorine atoms, a hydrocarbon group in which all of the hydrogen atoms bonded to the carbon atoms are replaced by fluorine atoms, —(C=O)—, —(C=O)—O—, or a hydrocarbon group containing —(C=O)—, and these groups optionally contain an oxygen atom, optionally contain a double bond, and optionally contain a functional group.

$R^a$ is preferably —(C=O)—, —(C=O)—O—, or a hydrocarbon group having 1 to 100 carbon atoms that optionally contains an ether bond and optionally contains —(C=O)—, wherein some or all of the hydrogen atoms bonded to the carbon atoms in the hydrocarbon group may be replaced by fluorine.

$R^a$ is preferably at least one selected from —(CH₂)ₐ—, —(CF₂)ₐ—, —O—(CF₂)ₐ—, —(CF₂)ₐ—O—(CF₂)ᵦ—, —O(CF₂)ₐ—O—(CF₂)ᵦ—, —(CF₂)ₐ—[O—(CF₂)ᵦ]ᵤ—, —O(CF₂)ₐ—[O—(CF₂)ᵦ]ᵤ—, —[(CF₂)ₐ—O]ᵦ—[(CF₂)ᵤ—O]ᵈ—, —O[(CF₂)ₐ—O]ᵦ—[(CF₂)ᵤ—O]ᵈ—, —O—[CF₂CF(CF₃)O]ₐ—(CF₂)ᵦ—, —(C=O)—, —(C=O)—O—, —(C=O)—(CH₂)ₐ—, —(C=O)—(CF₂)ₐ—, —(C=O)—O—(CH₂)ₐ—, —(C=O)—O—(CF₂)ₐ—, —(C=O)—[(CH₂)ₐ—O]ᵦ—, —(C=O)—[(CF₂)ₐ—O]ᵦ—, —(C=O)—O[(CH₂)ₐ—O]ᵦ—, —(C=O)—O[(CF₂)ₐ—O]ᵦ—, —(C=O)—O[(CH₂)ₐ—O]ᵦ—(CH₂)ᵤ—, —(C=O)—O[(CF₂)ₐ—O]ᵦ—(CF₂)ᵤ—, —(C=O)—(CH₂)ₐ—O—(CH₂)ᵦ—, —(C=O)—(CF₂)ₐ—O—(CF₂)ᵦ—, —(C=O)—O—(CH₂)ₐ—O—(CH₂)ᵦ—, —(C=O)—O—(CF₂)ₐ—O—(CF₂)ᵦ—, —(C=O)—O—C₆H₄—, and combinations thereof.

In the formula, a, b, c, and d are independently at least 1 or more. a, b, c and d may independently be 2 or more, 3 or more, 4 or more, 10 or more, or 20 or more. The upper limits of a, b, c, and d are 100, for example.

Specific examples suitable for $R^a$ include —CF₂—O—, —CF₂—O—CF₂—, —CF₂—O—CH₂—, —CF₂—O—CH₂CF₂—, —CF₂—O—CF₂CF₂—, —CF₂—O—CF₂CH₂—, —CF₂—O—CF₂CF₂CH₂—, —CF₂—O—CF(CF₃)—, —CF₂—O—CF(CF₃) CF₂—, —CF₂—O—CF(CF₃)CF₂—O—, —CF₂—O—CF(CF₃)CH₂—, —(C=O)—, —(C=O)—O—, —(C=O)—(CH₂)—, —(C=O)—(CF₂)—, —(C=O)—O—(CH₂)—, —(C=O)—O—(CF₂)—, —(C=O)—[(CH₂)₂—O]ₙ—, —(C=O)—[(CF₂)₂—O]ₙ—, —(C=O)—O[(CH₂)₂—O]ₙ—, —(C=O)—O[(CF₂)₂—O]ₙ—, —(C=O)—O[(CH₂)₂O]ₙ—(CH₂)—, —(C=O)—O[(CF₂)₂—O]ₙ—(CF₂)—, —(C=O)—(CH₂)₂—O—(CH₂)—, —(C=O)—(CF₂)₂—O—(CF₂)—, —(C=O)—O—(CH₂)₂—O—(CH₂)—, —(C=O)—O—(CF₂)₂—O—(CF₂)—, and —(C=O)—O—C₆H₄—. In particular, preferred for $R^a$ among these is $-CF_2-O-$, $-CF_2-O-CF_2-$, $-CF_2-O-CF_2CF_2-$, $-CF_2-O-CF(CF_3)-$, $-CF_2-O-CF(CF_3)CF_2-$, $-CF_2-O-CF(CF_3)CF_2-O-$, $-(C=O)-$, $-(C=O)-O-$, $-(C=O)-(CH_2)-$, $-(C=O)-O-(CH_2)-$, $-(C=O)-O[(CH_2)_2-O]_n-$, $-(C=O)-O[(CH_2)_2-O]_n-(CH_2)-$, $-(C=O)-(CH_2)_2-O-(CH_2)-$, or $-(C=O)-O-C_6H_4-$.

In the formula, n is an integer of 1 to 10.

$-R^a-(CZ^1Z^2)_k$ in the general formula (4) is preferably $-CF_2-O-CF_2-$, $-CF_2-O-CF(CF_3)-$, $-CF_2-O-C(CF_3)_2-$, $-CF_2-O-CF_2-CF_2-$, $-CF_2-O-CF_2-CF(CF_3)-$, $-CF_2-O-CF_2-C(CF_3)_2-$, $-CF_2-O-CF_2CF_2-CF_2-$, $-CF_2-O-CF_2CF_2-CF(CF_3)-$, $-CF_2-O-CF_2CF_2-C(CF_3)_2-$, $-CF_2-O-CF(CF_3)-CF_2-$, $-CF_2-O-CF(CF_3)-CF(CF_3)-$, $-CF_2-O-CF(CF_3)-C(CF_3)_2-$, $-CF_2-O-CF(CF_3)-CF_2-$, $-CF_2-O-CF(CF_3)-CF(CF_3)-$, $-CF_2-O-CF(CF_3)-C(CF_3)_2-$, $-CF_2-O-CF(CF_3)CF_2-CF_2-$, $-CF_2-O-CF(CF_3)CF_2-CF(CF_3)-$, $-CF_2-O-CF(CF_3)CF_2-C(CF_3)_2-$, $-CF_2-O-CF(CF_3)CF_2-O-CF_2-$, $-CF_2-O-CF(CF_3)CF_2-O-CF(CF_3)-$, $-CF_2-O-CF(CF_3)CF_2-O-C(CF_3)_2-$, $-(C=O)-$, $-(C=O)-O-$, $-(C=O)-(CH_2)-$, $-(C=O)-(CF_2)-$, $-(C=O)-O-(CH_2)-$, $-(C=O)-O-(CF_2)-$, $-(C=O)-[(CH_2)_2-O]_n-(CH_2)-$, $-(C=O)-[(CF_2)_2-O]_n-(CF_2)-$, $-(C=O)-[(CH_2)_2-O]_n-(CH_2)-(CH_2)-$, $-(C=O)-[(CF_2)_2-O]_n-(CF_2)-(CF_2)-$, $-(C=O)-O[(CH_2)_2-O]_n-(CF_2)-$, $-(C=O)-O[(CH_2)_2-O]_n-(CH_2)-(CH_2)-$, $-(C=O)-O[(CF_2)_2-O]_n-(CF_2)-$, $-(C=O)-O[(CF_2)_2-O]_n-(CF_2)-(CF_2)-$, $-(C=O)-(CH_2)_2-O-(CH_2)-(CH_2)-$, $-(C=O)-(CF_2)_2-O-(CF_2)-(CF_2)-$, $-(C=O)-O-(CH_2)_2-O-(CH_2)-(CH_2)-$, $-(C=O)-O-(CF_2)_2-O-(CF_2)-(CF_2)-$, $-(C=O)-O-(CH_2)_2-O-(CH_2)-C(CF_3)_2-$, $-(C=O)-O-(CF_2)_2-O-(CF_2)-C(CF_3)_2-$, or $-(C=O)-O-C_6H_4-C(CF_3)_2-$, and is more preferably $-CF_2-O-CF(CF_3)-$, $-CF_2-O-CF_2-CF(CF_3)-$, $-CF_2-O-CF_2CF_2-CF(CF_3)-$, $-CF_2-O-CF(CF_3)-CF(CF_3)-$, $-CF_2-O-CF(CF_3)CF_2-CF(CF_3)-$, $-CF_2-O-CF(CF_3CF_2-O-CF(CF_3)-$, $-(C=O)-$, $-(C=O)-O-(CH_2)-$, $-(C=O)-O-(CH_2)-(CH_2)-$, $-(C=O)-O[(CH_2)_2-O]_n-(CH_2)-(CH_2)-$, $-(C=O)-O-(CH_2)_2-(CH_2)-C(CF_3)_2-$, or $-(C=O)-O-C_6H_4-C(CF_3)_2-$.

In the formula, n is an integer of 1 to 10.

Specific examples of the compound represented by the general formula (4) include compounds represented by the following formulas:

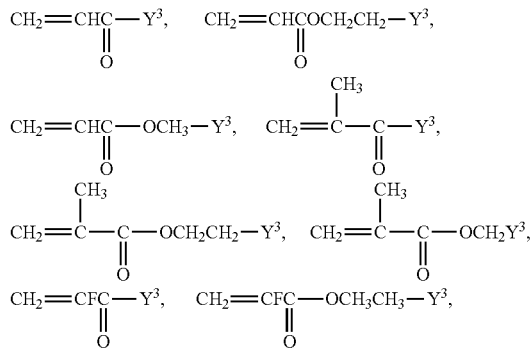

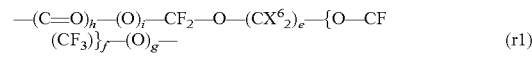

wherein $X^j$ and $Y^3$ are as described above; and n is an integer of 1 to 10.

$R^a$ is preferably a divalent group represented by the following general formula (r1):

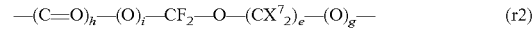
(r1)

wherein $X^6$ is each independently H, F, or $CF_3$; e is an integer of 0 to 3; f is an integer of 0 to 3; g is 0 or 1; h is 0 or 1; and i is 0 or 1, and is also preferably a divalent group represented by the following general formula (r2):

$$-(C=O)_h-(O)_i-CF_2-O-(CX^7_2)_e-(O)_g-$$ (r2)

wherein $X^7$ is each independently H, F, or $CF_3$; e is an integer of 0 to 3; g is 0 or 1; h is 0 or 1; and i is 0 or 1.

$-R^a-(CZ^1Z^2)_k-$ in the general formula (4) is also preferably a divalent group represented by the following formula (t1):

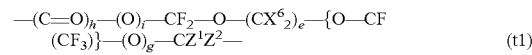
(t1)

wherein $X^6$ is each independently H, F, or $CF_3$; e is an integer of 0 to 3; f is an integer of 0 to 3; g is 0 or 1; h is 0 or 1; i is 0 or 1; and $Z^1$ and $Z^2$ are each independently F or $CF_3$, and is more preferably a group in which one of $Z^1$ and $Z^2$ is F and the other is $CF_3$ in the formula (t1).

Also, in the general formula (4), $-R^a-(CZ^1Z^2)_k-$ is preferably a divalent group represented by the following formula (t2):

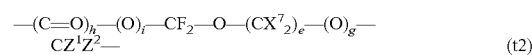
(t2)

wherein $X^7$ is each independently H, F, or $CF_3$; e is an integer of 0 to 3; g is 0 or 1; h is 0 or 1; i is 0 or 1; and $Z^1$ and $Z^2$ are each independently H, F, or $CF_3$, and is more preferably a group in which one of $Z^1$ and $Z^2$ is F and the other is $CF_3$ in the formula (t2).

The compound represented by the general formula (4) also preferably has a C—F bond and does not have a C—H bond, in the portion excluding the hydrophilic group ($Y^3$). In other words, in the general formula (4), $X^i$, $X^j$, and $X^k$ are all F, and $R^a$ is preferably a perfluoroalkylene group having 1 or more carbon atoms; the perfluoroalkylene group may be either linear or branched, may be either cyclic or acyclic, and may contain at least one catenary heteroatom. The perfluoroalkylene group may have 2 to 20 carbon atoms or 4 to 18 carbon atoms.

The compound represented by the general formula (4) may be partially fluorinated. In other words, the compound represented by the general formula (4) also preferably has at least one hydrogen atom bonded to a carbon atom and at least one fluorine atom bonded to a carbon atom, in the portion excluding the hydrophilic group ($Y^3$).

The compound represented by the general formula (4) is also preferably a compound represented by the following formula (4a):

$$CF_2=CF-O-Rf^o-Y^3 \quad (4a)$$

wherein $Y^3$ is a hydrophilic group; and $Rf^o$ is a perfluorinated divalent linking group which is perfluorinated and may be a linear or branched, cyclic or acyclic, saturated or unsaturated, substituted or unsubstituted, and optionally contains one or more heteroatoms selected from the group consisting of sulfur, oxygen, and nitrogen.

The compound represented by the general formula (4) is also preferably a compound represented by the following formula (4b):

$$CH_2=CH-O-Rf^o-Y^3 \quad (4b)$$

wherein $Y^3$ is a hydrophilic group; and $Rf^o$ is a perfluorinated divalent linking group as defined in the formula (4a).

In a preferred embodiment, in the general formula (4), $Y^3$ is $-OSO_3M$. Examples of the compound represented by the general formula (4) when $Y^3$ is $-OSO_3M$ include $CF_2=CF(OCF_2CF_2CH_2OSO_3M)$, $CH_2=CH((CF_2)_4CH_2OSO_3M)$, $CF_2=CF(O(CF_2)_4CH_2OSO_3M)$, $CF_2=CF(OCF_2CF(CF_3)CH_2OSO_3M)$, $CF_2=CF(OCF_2CF(CF_3)OCF_2CF_2CH_2OSO_3M)$, $CH_2=CF(OCF_2cF(CF_3)CH_2OSO_3M)$, $CF_2=CF(OCF_2CF_2SO_2N(CH_3)CH_2CH_2OSO_3M)$, $CH_2=CH(CF_2CF_2CH_2OSO_3M)$, $CF_2=CF(OCF_2CF_2CF_2CF_2SO_2N(CH_3)CH_2CH_2OSO_3M)$, and $CH_2=CH(CF_2CF_2CH_2OSO_3M)$. In the formula, M is as described above.

In the general formula (4), $Y^3$ is preferably $-SO_3M$. Examples of the compound represented by the general formula (4) when $Y^3$ is $-SO_3M$ include $CF_2=CF(OCF_2CF_2SO_3M)$, $CF_2=CF(O(CF_2)_4SO_3M)$, $CF_2=CF(OCF_2CF(CF_3)SO_3M)$, $CF_2=CF(OCF_2CF(CF_3)OCF_2CF_2SO_3M)$, $CH_2=CH(CF_2CF_2SO_3M)$, $CF_2=CF(OCF_2CF(CF_3)OCF_2CF_2CF_2CF_2SO_3M)$, $CH_2=CH((CF_2)_4SO_3M)$, and $CH_2=CH(CF_2CF_2SO_3M)$, $CH_2=CH((CF_2)_3SO_3M)$. In the formula, M is as described above.

In the general formula (4), $Y^3$ is preferably $-COOM$. Examples of the compound represented by the general formula (4) when $Y^3$ is $-COOM$ include $CF_2=CF(OCF_2CF_2COOM)$, $CF_2=CF(OCF_2CF_2CF_2COOM)$, $CF_2=CF(O(CF_2)_5COOM)$, $CF_2=CF(OCF_2CF(CF_3)COOM)$, $CF_2=CF(OCF_2CF(CF_3)O(CF_2)_nCOOM)$ (n is greater than 1), $CH_2=CH(CF_2CF_2COOM)$, $CH_2=CH((CF_2)_4COOM)$, $CH_2=CH(CF_2CF_2COOM)$, $CH_2=CH((CF_2)_3COOM)$, $CF_2=CF(OCF_2CF_2SO_2NR'CH_2COOM)$, $CF_2=CF(O(CF_2)_4SO_2NR'CH_2COOM)$, $CF_2=CF(OCF_2CF(CF_3)SO_2NR'CH_2COOM)$, $CF_2=CF(OCF_2CF(CF_3)OCF_2CF_2SO_2NR'CH_2COOM)$, $CH_2=CH(CF_2CF_2SO_2NR'CH_2COOM)$, $CF_2=CF(OCF_2CF(CF_3)OCF_2CF_2CF_2SO_2NR'CH_2COOM)$, $CH_2=CH((CF_2)_4SO_2NR'CH_2COOM)$, $CH_2=CH(CF_2CF_2SO_2NR'CH_2COOM)$, and $CH_2=CH((CF_2)_3SO_2NR'CH_2COOM)$. In the formula, R' is H or a $C_{1-4}$ alkyl group, and M is as described above.

In a preferred embodiment, in the general formula (4), $Y^3$ is $-OPO_3M$ or $-OP(O)(OM)_2$. Examples of the compound represented by the general formula (4) when $Y^3$ is $-OPO_3M$ or $-OP(O)(OM)_2$ include $CF_2=CF(OCF_2CF_2CH_2OP(O)(OM)_2)$, $CF_2=CF(O(CF_2)_4CH_2OP(O)(OM)_2)$, $CF_2=CF(OCF_2CF(CF_3)CH_2CP(O)(OM)_2)$, $CF_2=CF(OCF_2CF(CF_3)OCF_2CF_2CH_2OP(O)(OM)_2)$, $CF_2=CF(OCF_2CF_2SO_2N(CH_3)CH_2CH_2OP(O)(OM)_2)$, $CF_2=CF(OCF_2CF_2CF_2CF_2SO_2N(CH_3)CH_2CH_2OP(O)(OM)_2)$, $CH_2=CH(CF_2CF_2CH_2OP(O)(OM)_2)$, $CH_2=CH((CF_2)_4CH_2OP(O)(OM)_2)$, $CH_2=CH(CF_2CF_2CH_2OP(O)(OM)_2)$, and $CH_2=CH((CF_2)_3CH_2OP(O)(OM)_2)$. In the formula, M is as described above.

In a preferred embodiment, in the general formula (4), $Y^3$ is $-PO_3M$ or $-P(O)(OM)_2$. Examples of the compound represented by the general formula (4) when $Y^3$ is $-PO_3M$ or $-P(O)(OM)_2$ include $CF_2=CF(OCF_2CF_2P(O)(OM)_2)$, $CF_2=CF(O(CF_2)_4P(O)(OM)_2)$, $CF_2=CF(OCF_2CF(CF_3)P(O)(OM)_2)$, $CF_2=CF(OCF_2CF(CF_3)OCF_2CF_2P(O)(OM)_2)$, $CH_2=CH(CF_2CF_2P(O)(OM)_2)$, $CH_2=CH((CF_2)_4P(O)(OM)_2)$, $CH_2=CH(CF_2CF_2P(O)(OM)_2)$, and $CH_2=CH((CF_2)_3P(O)(OM)_2)$.

The compound represented by the general formula (4) is preferably at least one selected from the group consisting of: a monomer represented by the following general formula (5):

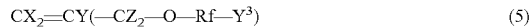

$$CX_2=CY(-CZ_2-O-Rf-Y^3) \quad (5)$$

wherein X is the same or different and is $-H$ or $-F$; Y is $-H$, $-F$, an alkyl group, or a fluorine-containing alkyl group; Z is the same or different and $-H$, $-F$, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above;

a monomer represented by the following general formula (6):

$$CX_2=CY(-O-Rf-Y^3) \quad (6)$$

wherein X is the same or different and is $-H$ or $-F$; Y is $-H$, $-F$, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above; and a monomer represented by the following general formula (7):

$$CX_2=CY(-Rf-Y^3) \quad (7)$$

wherein X is the same or different and is $-H$ or $-F$; Y is $-H$, $-F$, an alkyl group, or a fluorine-containing alkyl group; Rf is a fluorine-containing alkylene group having 1 to 40 carbon atoms or a fluorine-containing alkylene group having 2 to 100 carbon atoms and having an ether bond; and $Y^3$ is as described above.

The fluorine-containing alkylene group having 2 to 100 carbon atoms and having an ether bond is an alkylene group which does not include a structure in which an oxygen atom is an end and contains an ether bond between carbon atoms.

In the general formula (5), each X is $-H$ or $-F$. X may be both $-H$, may be both $-F$, or at least one thereof may be $-H$. For example, one thereof may be $-F$ and the other may be $-H$, or both may be $-H$.

In the general formula (5), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —CF$_3$, and more preferably —F.

In the general formula (5), Z is the same or different and is —H, —F, an alkyl group, or a fluoroalkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Z is preferably —H, —F, or —CF$_3$, and more preferably —F.

In the general formula (5), at least one of X, Y, and Z preferably contains a fluorine atom. For example, X, Y, and Z may be —H, —F, and —F, respectively.

In the general formula (5), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. The fluorine-containing alkylene group also preferably has 30 or less carbon atoms, more preferably 20 or less carbon atoms, and still more preferably 10 or less carbon atoms. Examples of the fluorine-containing alkylene group include —CF$_2$—, —CH$_2$CF$_2$—, —CF$_2$CF$_2$—, —CF$_2$CH$_2$—, —CF$_2$CF$_2$CH$_2$—, —CF(CF$_3$)—, —CF(CF$_3$)CF$_2$—, and —CF(CF$_3$)CH$_2$—. The fluorine-containing alkylene group is preferably a perfluoroalkylene group.

The fluorine-containing alkylene group having an ether bond preferably has 3 or more carbon atoms. Further, the fluorine-containing alkylene group having an ether bond preferably has 60 or less, more preferably 30 or less, and still more preferably 12 or less carbon atoms.

The fluorine-containing alkylene group having an ether bond is also preferably a divalent group represented by the following formula:

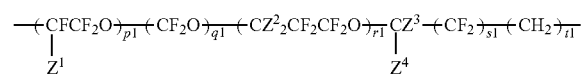

wherein Z$^1$ is F or CF$_3$; Z$^2$ and Z$^3$ are each H or F; Z$^4$ is H, F, or CF$_3$; p1+q1+r1 is an integer of 0 to 10; s1 is 0 or 1; and t1 is an integer of 0 to 5.

Specific examples of the fluorine-containing alkylene group having an ether bond include —CF(CF$_3$)CF$_2$—O—CF(CF$_3$)—, —(CF(CF$_3$)CF$_2$—O)$_n$—CF(CF$_3$)— (wherein n is an integer of 1 to 10), —CF(CF$_3$)CF$_2$—O—CF(CF$_3$)CH$_2$—, —(CF(CF$_3$)CF$_2$—O)$_n$—CF(CF$_2$)CH$_2$— (wherein n is an integer of 1 to 10), —CH$_2$CF$_2$CF$_2$O—CH$_2$CF$_2$CH$_2$—, —CF$_2$CF$_2$CF$_2$O—CF$_2$CF$_2$—, —CF$_2$CF$_2$CF$_2$O—CF$_2$CF$_2$CH$_2$—, —CF$_2$CF$_2$O—CF$_2$—, and —CF$_2$CF$_2$O—CF$_2$CH$_2$—. The fluorine-containing alkylene group having an ether bond is preferably a perfluoroalkylene group.

In the general formula (5), Y$^3$ is —COOM, —SO$_3$M, or —OSO$_3$M, wherein M is H, a metal atom, NR$^7_4$, imidazolium optionally having a substituent, pyridinium optionally having a substituent, or phosphonium optionally having a substituent, wherein R$^7$ is H or an organic group, and may be the same or different, any two of thereof optionally bind to each other to form a ring.

The alkyl group is preferable as the organic group in R$^7$.

R$^7$ is preferably H or a C$_{1-10}$ organic group, more preferably H or a C$_{1-4}$ organic group, and still more preferably H or a C$_{1-4}$ alkyl group.

Examples of the metal atom include alkali metals (Group 1) and alkaline earth metals (Group 2), and preferred is Na, K, or Li.

M is preferably —H, a metal atom, or —NR$^7_4$, more preferably —H, an alkali metal (Group 1), an alkaline earth metal (Group 2), or —NR$^7_4$, still more preferably —H, —Na, —K, —Li, or —NH$_4$, further preferably —Na, —K, or —NH$_4$, particularly preferably —Na or —NH$_4$, and most preferably —NH$_4$.

Y$^3$ is preferably —COOM or —SO$_3$M, and more preferably —COOM.

The monomer represented by the general formula (5) is preferably a monomer (5a) represented by the general formula (5a):

$$CH_2=CF(-CF_2-O-Rf-Y^3) \quad (5a)$$

wherein Rf and Y$^3$ are as described above.

Specific examples of the monomer represented by the general formula (5a) include a monomer represented by the following formula:

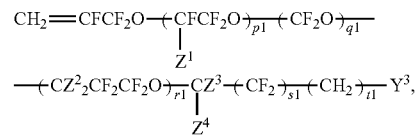

wherein Z$^1$ is F or CF$_3$; Z$^2$ and Z$^3$ are each H or F; Z$^4$ is H, F, or CF$_3$; p1+q1+r1 is an integer of 0 to 10; s1 is 0 or 1; t1 is an integer of 0 to 5; and Y$^3$ is as described above, with the proviso that when Z$^3$ and Z$^4$ are both H, p1+q1+r1+s1 is not 0. More specifically, preferred examples thereof include:

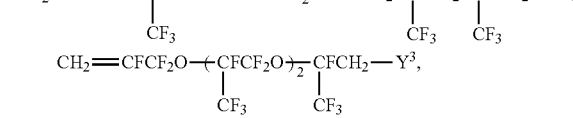

$CH_2$=$CFCF_2OCH_2CF_2$—$Y^3$, $CH_2$=$CFCF_2O$($CH_2CF_2CF_2O$)$CH_2CF_2$—$Y^3$,
$CH_2$=$CFCF_2OCH_2CF_2CH_2$—$Y^3$,
$CH_2$=$CFCF_2O$($CH_2CF_2CF_2O$)$CH_2CF_2CH_2$—$Y^3$,
$CH_2$=$CFCF_2OCF_2CF_2$—$Y^3$, $CH_2$=$CFCF_2O$($CF_2CF_2CF_2O$)$CF_2CF_2$—$Y^3$,
$CH_2$=$CFCF_2OCF_2CF_2CH_2$—$Y^3$,
$CH_2$=$CFCF_2O$($CF_2CF_2CF_2O$)$CF_2CF_2CH_2$—$Y^3$,
$CH_2$=$CFCF_2OCF_2$—$Y^3$, $CH_2$=$CFCF_2O$($CF_2CF_2O$)$CF_2$—$Y^3$,
$CH_2$=$CFCF_2OCF_2CH_2$—$Y^3$,
$CH_2$=$CFCF_2O$($CF_2CF_2O$)$CF_2CH_2$—$Y^3$,

Of these, preferred are:

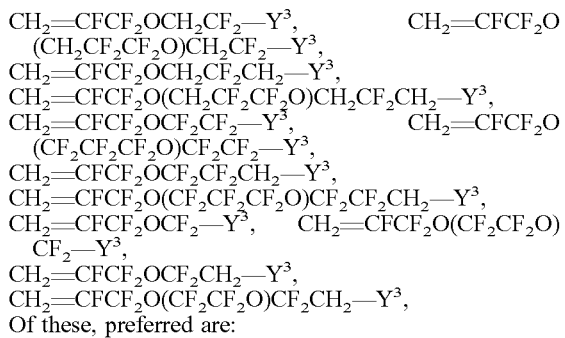

In the monomer represented by the general formula (5a), $Y^3$ in the formula (5a) is preferably —COOM. Specifically, the monomer represented by the general formula (5a) is preferably at least one selected from the group consisting of $CH_2$=$CFCF_2OCF(CF_3)COOM$ and $CH_2$=$CFCF_2OCF(CF_3)CF_2OCF(CF_3)COOM$ (wherein M is as defined above), and more preferably $CH_2$=$CFCF_2OCF(CF_3)COOM$.

The monomer represented by the general formula (5) is preferably a monomer (5b) represented by the general formula (5b):

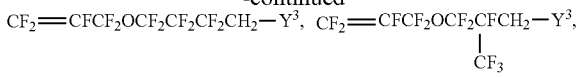

wherein each $X^2$ is the same, and each represent F or H; n5 represents 0 or an integer of 1 to 10; and $Y^3$ is as defined above.

In the formula (5b), n5 is preferably 0 or an integer of 1 to 5, more preferably 0, 1, or 2, and still more preferably 0 or 1 from the viewpoint of stability of the resulting aqueous dispersion. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the perfluorovinylalkyl compound represented by the formula (5b) include $CH_2$=$CFCF_2OCF(CF_3)COOM$ and $CH_2$=$CFCF_2OCF(CF_3)CF_2OCF(CF_3)COOM$, wherein M is as defined above.

Examples of the monomer represented by the general formula (5) further include a monomer represented by the general formula (5c):

$CF_2$=$CFCF_2$—O—Rf—$Y^3$ (5c)

wherein Rf and $Y^3$ are as described above.
More specific examples thereof include:

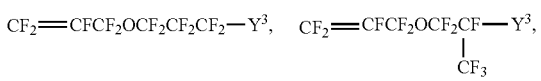

In the general formula (6), each X is —H or —F. X may be both —F, or at least one thereof may be —H. For example, one thereof may be —F and the other may be —H, or both may be —H.

In the general formula (6), Y is —H, —F, an alkyl group, or a fluorine-containing alkyl group.

The alkyl group is an alkyl group free from fluorine atoms and may have one or more carbon atoms. The alkyl group preferably has 6 or less carbon atoms, more preferably 4 or less carbon atoms, and still more preferably 3 or less carbon atoms.

The fluorine-containing alkyl group is an alkyl group containing at least one fluorine atom, and may have one or more carbon atoms. The fluorine-containing alkyl group preferably has 6 or less carbon atoms, more preferably 4 or less carbon atoms, and still more preferably 3 or less carbon atoms.

Y is preferably —H, —F, or —$CF_3$, and more preferably —F.

In the general formula (6), at least one of X and Y preferably contains a fluorine atom. For example, X, Y, and Z may be —H, —F, and —F, respectively.

In the general formula (6), Rf is a fluorine-containing alkylene group having 1 to 40 carbon atoms or a fluorine-containing alkylene group having 2 to 100 carbon atoms and having an ether bond.

The fluorine-containing alkylene group preferably has 2 or more carbon atoms. Further, the fluorine-containing alkylene group preferably has 30 or less, more preferably 20 or less, and still more preferably 10 or less carbon atoms. Examples of the fluorine-containing alkylene group include —$CF_2$—, —$CH_2CF_2$—, —$CF_2CF_2$—, —$CF_2CH_2$—, —$CF_2CF_2CH_2$—, —$CF(CF_3)$—, —$CF(CF_3)CF_2$—, and —$CF(CF_3)CH_2$—. The fluorine-containing alkylene group is preferably a perfluoroalkylene group.

In the general formula (6), $Y^3$ is preferably —COOM, —$SO_3M$, or —$OSO_3M$, wherein M is H, a metal atom, $NR^7_4$, imidazolium optionally having a substituent, pyridinium optionally having a substituent, or phosphonium optionally having a substituent, wherein $R^7$ is H or an organic group and may be the same or different; and any two of thereof optionally bind to each other to form a ring.

The organic group for $R^7$ is preferably an alkyl group. $R^7$ is preferably H or a $C_{1-10}$ organic group, more preferably H or a $C_{1-4}$ organic group, and still more preferably H or a $C_{1-4}$ alkyl group.

Examples of the metal atom include alkali metals (Group 1) and alkaline earth metals (Group 2), and preferred is Na, K, or Li.

M is preferably —H, a metal atom, or —$NR^7_4$, more preferably —H, an alkali metal (Group 1), an alkaline earth metal (Group 2), or —$NR^7_4$, still more preferably —H, —Na, —K, —Li, or —$NH_4$, further preferably —Na, —K, or —$NH_4$, particularly preferably —Na or —$NH_4$, and most preferably —$NH_4$.

$Y^3$ is preferably —COOM or —$SO_3M$, and more preferably —COOM.

The monomer represented by the general formula (6) is preferably at least one selected from the group consisting of monomers represented by the following general formulas (6a), (6b), (6c), (6d), and (6e):

$$CF_2=CF-O-(CF_2)_{n1}-Y^3 \qquad (6a)$$

wherein n1 represents an integer of 1 to 10; and $Y^3$ is as defined above.

$$CF_2=CF-O-(CF_2C(CF_3)F)_{n2}-Y^3 \qquad (6b)$$

wherein n2 represents an integer of 1 to 5, and $Y^3$ is as defined above;

$$CF_2=CF-O-(CFX^1)_{n3}-Y^3 \qquad (6c)$$

wherein $X^1$ represents F or $CF_3$; n3 represents an integer of 1 to 10; and $Y^3$ is as defined above; and $$CF_2=CF-O-(CF_2CFX^1O)_{n4}-(CF_2)_{n6}-Y^3 \qquad (6d)$$

wherein n4 represents an integer of 1 to 10; n6 represents an integer of 1 to 3; and $Y^3$ and $X^1$ are as defined above; and $$CF_2=CF-O-(CF_2CF_2CFX^1O)_{n5}-CF_2CF_2CF_2-Y^3 \qquad (6e)$$

wherein n5 represents an integer of 0 to 10; and $Y^3$ and $X^1$ are as defined above.

In the formula (6a), n1 is preferably an integer of 5 or less, and more preferably an integer of 2 or less. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the monomer represented by the formula (6a) include $CF_2=CF-O-CF_2COOM$, $CF_2=CF(OCF_2CF_2COOM)$, and $CF_2=CF(OCF_2CF_2CF_2COOM)$ (wherein M is as defined above).

In the formula (6b), n2 is preferably an integer of 3 or less from the viewpoint of stability of the resulting aqueous dispersion, $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

In the formula (6c), n3 is preferably an integer of 5 or less from the viewpoint of water-solubility, $Y^3$ is preferably —COOM from the viewpoint of obtaining appropriate water-solubility and stability of the aqueous dispersion, and M is preferably H or $NH_4$ from the viewpoint of improving dispersion stability.

In the formula (6d), $X^1$ is preferably —$CF_3$ from the viewpoint of stability of the aqueous dispersion, n4 is preferably an integer of 5 or less from the viewpoint of water-solubility, $Y^3$ is preferably —COOM from the viewpoint of obtaining appropriate water-solubility and stability of the aqueous dispersion, and M is preferably H or $NH_4$.

Examples of the monomer represented by the formula (6d) include $CF_2=CFOCF_2CF(CF_3)OCF_2CF_2COOM$, $CF_2=CFOCF_2CF(CF_3)OCF_2COOM$, and $CF_2=CFOCF_2CF(CF_3)OCF_2CF_2CF_2OOM$ (wherein M represents H, $NH_4$ or an alkali metal).

In the general formula (6e), the n5 is preferably an integer of 5 or less in terms of water solubility, $Y^3$ is preferably —COOM in terms of obtaining moderate water solubility and excellent sedimentation stability of the composition, and M is preferably H or $NH_4$.

Examples of the monomer represented by the general formula (6e) include $CF_2=CFOCF_2CF_2CF_2COOM$ (wherein M represents H, $NH_4$, or an alkali metal).

In the general formula (7), Rf is preferably a fluorine-containing alkylene group having 1 to 40 carbon atoms. In the general formula (7), at least one of X and Y preferably contains a fluorine atom.

The monomer represented by the general formula (7) is preferably at least one selected from the group consisting of:
a monomer represented by the following general formula (7a):

$$CF_2=CF-(CF_2)_{n1}-Y^3 \qquad (7a)$$

wherein n1 represents an integer of 1 to 10; and $Y^3$ is as defined above; and a monomer represented by the following general formula (7b):

$$CF_2=CF-(CF_2C(CF_3)F)_{n2}-Y^3 \qquad (7b)$$

wherein n2 represents an integer of 1 to 5; and $Y^3$ is as defined above.

$Y^3$ is preferably —$SO_3M$ or —COOM, and M is preferably H, a metal atom, $NR^7_4$, imidazolium optionally having a substituent, pyridinium optionally having a substituent, or phosphonium optionally having a substituent. $R^7$ represents H or an organic group.

In the formula (7a), n1 is preferably an integer of 5 or less, and more preferably an integer of 2 or less. $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

Examples of the perfluorovinylalkyl compound represented by the formula (7a) include $CF_2=CFCF_2COOM$, wherein M is as defined above.

In the formula (7b), n2 is preferably an integer of 3 or less from the viewpoint of stability of the resulting aqueous dispersion, $Y^3$ is preferably —COOM from the viewpoint of obtaining appropriate water-solubility and stability of the aqueous dispersion, and M is preferably H or $NH_4$ from the viewpoint of being less likely to remain as impurities and improving the heat resistance of the resulting molded body.

The modifying monomer preferably contains a modifying monomer (A), and preferably contains at least one selected from the group consisting of compounds represented by the general formulas (5a), (5b), (6a), (6b), (6c), and (6d), and more preferably contains a compound represented by the general formula (5a) or the general formula (5b).

The content of the modifying monomer (A) is preferably in the range of 0.00001 to 1.0% by mass. The lower limit thereof is more preferably 0.0001% by mass, still more preferably 0.001% by mass, and further preferably 0.005% by mass. The upper limit thereof is 0.90% by mass, 0.50% by mass, 0.40% by mass, 0.30% by mass, 0.20% by mass, 0.15% by mass, 0.10% by mass, 0.08% by mass, 0.05% by mass, and 0.01% by mass in the order of preference.

In production of the TFE polymer, the hydrocarbon surfactant can be used within the use range described for the production method of the present disclosure. The concentration of the hydrocarbon surfactant is not limited as long as it is within the above ranges, but is usually added at a critical micelle concentration (CMC) or less at the initiation of polymerization. When the amount added is large, needle-like particles having a large aspect ratio are generated, and the aqueous dispersion becomes gel-like and the stability is impaired. The lower limit of the amount of the hydrocarbon surfactant used is preferably 0.0001% by mass, more preferably 0.001% by mass, still more preferably 0.01% by mass, and particularly preferably 0.1% by mass, based on the aqueous medium. The upper limit of the amount of the hydrocarbon surfactant used is preferably 10% by mass, more preferably 5% by mass, still more preferably 3% by mass, and particularly preferably 2% by mass, based on the aqueous medium.

The hydrocarbon surfactant may be added to the reaction vessel at once before initiation of the polymerization, may be added at once after initiation of the polymerization, may be added in multiple portions during the polymerization, or may be added continuously during the polymerization.

In the production of the TFE polymer, a persulfate (for example, ammonium persulfate), an organic peroxide such as disuccinic acid peroxide or diglutaric acid peroxide can be used alone or in a mixture thereof as the polymerization initiator. Further, the polymerization initiator may be used in combination with a reducing agent such as sodium sulfite or the like and used as redox systems. Further, during the polymerization, a radical scavenger such as hydroquinone or catechol may be added, or a peroxide decomposer such as ammonium sulfite may be added to adjust the radical concentration in the system.

The redox polymerization initiator is preferably a redox initiator obtained by combining an oxidizing agent and a reducing agent. Examples of the oxidizing agent include persulfates, organic peroxides, potassium permanganate, manganese triacetate, and ammonium cerium nitrate. Examples of the reducing agent include sulfites, bisulfites, bromates, diimines, and oxalic acid. Examples of the persulfates include ammonium persulfate and potassium persulfate. Examples of the sulfite include sodium sulfite and ammonium sulfite. In order to increase the decomposition rate of the initiator, the combination of the redox initiator may preferably contain a copper salt or an iron salt. An example of the copper salt is copper(II) sulfate and an example of the iron salt is iron(II) sulfate.

Examples of the redox initiator include potassium permanganate/oxalic acid, ammonium persulfate/bisulfite/iron sulfate, manganese triacetate/oxalic acid, cerium ammonium nitrate/oxalic acid, and bromate/bisulfite, and potassium permanganate/oxalic acid is preferred. In the case of using a redox initiator, either an oxidizing agent or a reducing agent may be charged into a polymerization tank in advance, followed by adding the other continuously or intermittently thereto to initiate the polymerization. For example, in the case of potassium permanganate/oxalic acid, preferably, oxalic acid is charged into a polymerization tank and potassium permanganate is continuously added thereto.

In production of the TFE polymer, a known chain transfer agent may be used. Examples thereof include saturated hydrocarbons such as methane, ethane, propane, and butane, halogenated hydrocarbons such as chloromethane, dichloromethane, and difluoroethane, alcohols such as methanol ethanol, and isopropanol, and hydrogen. The chain transfer agent is preferably one in a gas state at a normal temperature and normal pressure.

The amount of the chain transfer agent used is usually 1 to 10,000 ppm, preferably 1 to 5,000 ppm, based on the total amount of TFE fed.

In production of the TFE polymer, a saturated hydrocarbon that is substantially inert to the reaction, that is in a liquid state under the reaction conditions, and that has 12 or more carbon atoms may be used as a dispersion stabilizer for the reaction system in an amount of 2 to 10 parts by mass based on 100 parts by mass of the aqueous medium. Ammonium carbonate, ammonium phosphate, or the like may be added as a buffer to adjust the pH during the reaction.

When the polymerization of the TFE polymer is completed, a pre-treatment aqueous dispersion containing a TFE polymer having a solid concentration of 1.0 to 70% by mass and an average primary particle size of 50 to 500 nm can be obtained. The pre-treatment aqueous dispersion contains the hydrocarbon surfactant and the fluoropolymer. Further, by using the hydrocarbon surfactant, a pre-treatment aqueous dispersion having particles made of a TFE polymer having a fine particle size of 0.5 μm or less can be obtained.

The lower limit of the solid concentration in the pre-treatment aqueous dispersion is preferably 5% by mass, and more preferably 8% by mass. The upper limit thereof is not limited, and may be 40% by mass or 35% by mass.

The lower limit of the average primary particle size of the TFE polymer is preferably 100 nm, and more preferably 150 nm. The upper limit thereof is preferably 400 nm, and more preferably 350 nm.

The average primary particle size can be determined by dynamic light scattering. The average primary particle size may be determined by preparing a PTFE aqueous dispersion with a solid concentration adjusted to about 1.0% by mass and using a dynamic light scattering at 25° C. with 70 measurement processes, wherein the solvent (water) has a refractive index of 1.3328 and the solvent (water) has a viscosity of 0.8878 mPa·s. The dynamic light scattering may be performed by, for example, ELSZ-1000S (manufactured by Otsuka Electronics Co., Ltd.).

An aqueous dispersion of a TFE polymer (fluoropolymer aqueous dispersion) is obtained by performing the step A on the pre-treatment aqueous dispersion containing the TFE polymer. A TFE polymer fine powder can be produced by coagulating (aggregating) an aqueous dispersion of a TFE polymer and recovering an agglomerate containing the TFE polymer. The aqueous dispersion of the TFE polymer can be formed into fine powder through coagulation, washing, and drying. The resulting fine powder may be used for various applications. Coagulation of the aqueous dispersion of the TFE polymer is usually performed by diluting the aqueous dispersion obtained by polymerization of polymer latex, for example, with water to a polymer concentration of 5 to 20% by mass, optionally adjusting the pH to a neutral or alkaline, and stirring the polymer more vigorously than during the reaction in a vessel equipped with a stirrer. The coagulation may be performed under stirring while adding a water-soluble organic compound such as methanol or acetone, an inorganic salt such as potassium nitrate or ammonium carbonate, or an inorganic acid such as hydrochloric acid, sulfuric acid, or nitric acid as a coagulating agent. The coagulation may be continuously performed using a device such as an inline mixer.

From the viewpoint of productivity, the concentration of the non-agglomerated TFE polymer in the discharge water generated by the agglomeration is preferably low, more preferably less than 0.4% by mass, and particularly preferably less than 0.3% by mass.

Pigment-containing or filler-containing TFE polymer fine powder in which pigments and fillers are uniformly mixed can be obtained by adding pigments for coloring and various fillers for improving mechanical properties before or during the coagulation.

The wet powder obtained by coagulating the TFE polymer in the aqueous dispersion is usually dried by means of vacuum, high-frequency waves, hot air, or the like while keeping the wet powder in a state in which the wet powder is less fluidized, preferably in a stationary state. Friction between the powder particles especially at high temperature usually has unfavorable effects on the TFE polymer in the form of fine powder. This is because the particles made of such a TFE polymer are easily formed into fibrils even with a small shearing force and lose its original, stable particulate structure.

The drying is performed at a drying temperature of 10 to 300° C. (10 to 250° C.), preferably 100 to 300° C. (100 to 200° C.)

The resulting fine powder of the TFE polymer is preferred for molding, and suitable applications thereof include tubes for hydraulic systems or fuel systems of aircraft or automobiles, flexible hoses for chemicals or vapors, and electric wire coating.

The aqueous dispersion of the TFE polymer obtained by the polymerization is preferably mixed with a nonionic surfactant to stabilize and further concentrate the aqueous dispersion, and then further mixed with, depending on its purpose, an organic or inorganic filler to form a composition and used in a variety of applications. The composition, when applied to a metal or ceramic substrate, can provide a coating surface having non-stickiness, a low coefficient of friction, and excellent gloss, smoothness, abrasion resistance, weather resistance, and heat resistance, which is suitable for coating of rolls and cooking utensils and impregnation of glass cloth.

The aqueous dispersion of the TFE polymer may also be used to prepare an organosol of TFE polymer. The organosol may contain the TFE polymer and an organic solvent, and examples of the organic solvent include ether-based solvents, ketone-based solvents, alcohol-based solvents, amide-based solvents, ester-based solvents, aliphatic hydrocarbon-based solvents, aromatic hydrocarbon-based solvents, and halogenated hydrocarbon-based solvents. Preferably used are N-methyl-2-pyrrolidone and dimethylacetamide. The organosol may be prepared by the method disclosed in International Publication No. WO2012/002038, for example.

The aqueous dispersion of the TFE polymer or the fine powder of the TFE polymer is also preferably used as a processing aid. When used as a processing aid, the aqueous dispersion or the fine powder is mixed with a host polymer, for example, to improve the melt strength of the host polymer in melt fabrication and to improve the mechanical strength, electric properties, incombustibility, anti-drop performance during combustion, and slidability of the resulting polymer.

The aqueous dispersion of the TFE polymer or the fine powder of the TFE polymer is also preferably used as a binder for batteries or used for dustproof applications.

The aqueous dispersion of the TFE polymer or the fine powder of the TFE polymer is also preferably combined with a resin other than the TFE polymer to form a processing aid before use. The aqueous dispersion of the TFE polymer or the fine powder is suitable as a material of the PTFEs disclosed in, for example, Japanese Patent Laid-Open No. 11-49912, U.S. Pat. No. 5,804,654, Japanese Patent Laid-Open No. 11-29679, and Japanese Patent Laid-Open No. 2003-2980. Processing aids containing the aqueous dispersion or the fine powder are not inferior in any way to the processing aids disclosed in the publications.

The aqueous dispersion of the TFE polymer is also preferably mixed with an aqueous dispersion of a melt-fabricable fluororesin so that the components coagulate to form co-coagulated powder. The co-coagulated powder is suitable as a processing aid.

Examples of the melt-fabricable fluororesin include FEP, PFA, TFE/perfluoroallyl ether copolymers, ETFE, and ethylene/TFE/HFP copolymers (EFEPs), of which FEP is preferred.

The aqueous dispersion also preferably contains a melt-fabricable fluororesin. Examples of the melt-fabricable fluororesin include FEP, PFA, TFE/perfluoroallyl ether copolymer, ETFE, and EFEP. The aqueous dispersion of the TFE polymer containing the melt-fabricable fluororesin may be used as a coating material. The melt-fabricable fluororesin enables sufficient fusion of the TFE polymer particles, improving the film-formability and providing the resulting film with gloss.

The fluorine-free resin to which the co-coagulated powder is added may be in the form of powder, pellets, or emulsion. In order to achieve sufficient mixing of the resins, the addition is preferably performed by a known method such as extrusion kneading or roll kneading under a shearing force.

The aqueous dispersion of the TFE polymer is also preferably used as a dust suppression treatment agent. The dust suppression treatment agent may be used in a method for suppressing dust from a dust-generating substance by mixing the dust suppression treatment agent with the dust-generating substance and subjecting the mixture to a compression-shear action at a temperature of 20 to 200° C. to fibrillate the TFE polymer, for example, methods disclosed in Japanese Patent No. 2,827,152 and Japanese Patent No. 2,538,783.

The aqueous dispersion of the TFE polymer can suitably be used for the dust suppression treatment agent composition disclosed in International Publication No. WO2007/004250, and can also suitably be used for the method of dust suppression treatment disclosed in International Publication No. WO2007/000812.

The dust suppression treatment agent is suitably used in the fields of building-products, soil stabilizers, solidifying materials, fertilizers, landfill of incineration ash and harmful substance, explosion proof equipment, cosmetics, sands for pet excretion represented by cat sand, and the like.

The aqueous dispersion of the TFE polymer is also preferably used as a material for producing TFE polymer fibers by a dispersion spinning method. The dispersion spinning method is a method in which the aqueous dispersion of the TFE polymer and an aqueous dispersion of a matrix polymer are mixed and the mixture is extruded to form an intermediate fiber structure, and then the intermediate fiber structure is fired to decompose the matrix polymer and sinter the TFE polymer particles, thereby providing TFE polymer fibers.

The surfactant described above may be used to produce a high-molecular-weight PTFE. In other words, even without using a conventional fluorine-containing surfactant, the production method of the present disclosure using the surfactant can surprisingly produce PTFE having a molecular weight equivalent to that of PTFE obtained by a production method using such a conventional fluorine-containing surfactant.

The high-molecular-weight PTFE powder obtained by polymerization has stretchability and non melt processability, and is also useful as a material for a stretched body (porous body). When the stretched body is in the form of a film (PTFE stretched film or PTFE porous film), the stretched body can be formed by stretching by a known PTFE stretching method. Stretching allows easy formation of fibrils of PTFE, resulting in a high-molecular-weight PTFE porous body (film) including nodes and fibers.

Preferably, roll-stretching a sheet-shaped or rod-shaped paste extrudate in an extruding direction can provide a uniaxially stretched film.

Further stretching in a transverse direction using a tenter, for example, can provide a biaxially stretched film.

Prebaking treatment is also preferably performed before stretching.

This PTFE stretched body is a porous body having a high porosity, and can suitably be used as a filter material for a variety of microfiltration filters such as air filters and chemical filters and a support member for polymer electrolyte films.

The PTFE stretched body is also useful as a material of products used in the fields of textiles, of medical treatment, of electrochemistry, of sealants, of air filters, of ventilation/internal pressure adjustment, of liquid filters, and of consumer goods.

The following provides examples of specific applications.

Electrochemical Field

Examples of the applications in this field include prepregs for dielectric materials, EMI-shielding materials, and heat conductive materials. More specifically, examples thereof include printed circuit boards, electromagnetic interference shielding materials, insulating heat conductive materials, and insulating materials.

Sealant Field

Examples of the applications in this field include gaskets, packings, pump diaphragms, pump tubes, and sealants for aircraft.

Air Filter Field

Examples of the applications in this field include ULPA filters (for production of semiconductors), HEPA filters (for hospitals and for production of semiconductors), cylindrical cartridge filters (for industries), bag filters (for industries), heat-resistant bag filters (for exhaust gas treatment), heat-resistant pleated filters (for exhaust gas treatment), SINBRAN filters (for industries), catalyst filters (for exhaust gas treatment), adsorbent-attached filters (for HDD embedment), adsorbent-attached vent filters (for HDD embedment), vent filters (for HDD embedment, for example), filters for cleaners (for cleaners), general-purpose multilayer felt materials, cartridge filters for GT (for interchangeable items for GT), and cooling filters (for housings of electronic devices).

Ventilation/Internal Pressure Adjustment Field

Examples of the applications in this field include materials for freeze drying such as vessels for freeze drying, ventilation materials for automobiles for electronic circuits and lamps, applications relating to vessels such as vessel caps, protective ventilation for electronic devices, including small devices such as tablet terminals and mobile phone terminals, and ventilation for medical treatment.

Liquid Filter Field

Examples of the applications in this field include liquid filters for semiconductors (for production of semiconductors), hydrophilic PTFE filters (for production of semiconductors), filters for chemicals (for chemical treatment), filters for pure water production lines (for production of pure water), and back-washing liquid filters (for treatment of industrial discharge water).

Consumer Goods Field

Examples of the applications in this field include clothes, cable guides (movable wires for motorcycles), clothes for motor cyclists, cast liners (medical supporters), filters for cleaners, bagpipes (musical instrument), cables (signal cables for guitars, etc.), and strings (for string instrument).

Textile Field

Examples of the applications in this field include PTFE fibers (fiber materials), machine threads (textiles), weaving yarns (textiles), and ropes.

Medical Treatment Field

Examples of the applications in this field include implants (stretched articles), artificial blood vessels, catheters, general surgical operations (tissue reinforcing materials), products for head and neck (dura mater alternatives), oral health (tissue regenerative medicine), and orthopedics (bandages).

The surfactant described above may also be used to produce a low-molecular-weight PTFE.

The low-molecular-weight PTFE may be produced by polymerization, or may be produced by reducing the molecular weight of a high-molecular-weight PTFE obtained by polymerization by a known method (e.g., thermolysis, radiolysis).

A low-molecular-weight PTFE having a molecular weight of 600,000 or less (also referred to as PTFE micropowder) has excellent chemical stability and a very low surface energy, and is less likely to generate fibrils, and is therefore suitably used as an additive for improving the lubricity and the texture of the coating surface in production of plastics, inks, cosmetics, coating materials, greases, parts of office automation equipment, and toners (e.g., see Japanese Patent Laid-Open No. 10-147617).

A low-molecular-weight PTFE may be obtained by dispersing a polymerization initiator and the surfactant in an aqueous medium in the presence of a chain transfer agent, and then polymerizing TFE alone or TFE and a monomer copolymerizable with TFE.

In the case of using the low-molecular-weight PTFE obtained by the polymerization in the form of powder, the powder particles may be obtained by coagulating the aqueous dispersion.

The high-molecular-weight PTFE as used herein means a non melt-processible and fibrillatable PTFE. The low-molecular-weight PTFE as used herein means a melt-fabricable and non-fibrillatable PTFE.

The non-melt processability means a property that the melt flow rate cannot be measured at a temperature higher than the crystal melting point in conformity with ASTM D 1238 and D 2116.

The presence or absence of the fibrillation ability can be determined by "paste extrusion", a representative method of molding a "high-molecular-weight PTFE powder" which is a powder of a TFE polymer. Usually, the high-molecular-weight PTFE can be paste-extruded when it is fibrillatable. When a non-fired molded product obtained by paste extrusion shows substantially no strength or elongation (for example, when it shows an elongation of 0% and is broken when stretched), it can be regarded as non-fibrillatable.

The high-molecular-weight PTFE preferably has a standard specific gravity (SSG) of 2.130 to 2.280. The standard specific gravity is determined by the water replacement method in conformity with ASTM D 792 using a sample molded in conformity with ASTM D4895-89. The "high-molecular-weight" as used herein means that the standard specific gravity is within the above range.

The low-molecular-weight PTFE has a complex viscosity at 380° C. of $1 \times 10^2$ to $7 \times 10^5$ Pa·s. The "low-molecular-weight" in the present disclosure means that the complex viscosity is within the above range.

The high-molecular-weight PTFE has a complex viscosity significantly higher than that of the low-molecular-weight PTFE, and the complex viscosity thereof is difficult to measure accurately. The complex viscosity of the lowmolecular-weight PTFE is measurable, but the low-molecular-weight PTFE has difficulty in providing a molded article to be used in measurement of the standard specific gravity. Thus, it is difficult to measure its accurate standard specific gravity. Accordingly, in the present disclosure, the standard specific gravity is used as an index of the molecular weight of the high-molecular-weight PTFE, while the complex viscosity is used as an index of the molecular weight of the low-molecular-weight PTFE. It should be noted that there is no known measuring method for directly specifying the molecular weight of either the high-molecular-weight PTFE or the low-molecular-weight PTFE.

The high-molecular-weight PTFE preferably has a peak temperature of 333 to 347° C., more preferably 335 to 345° C. The low-molecular-weight PTFE preferably has a peak temperature of 322 to 333° C., more preferably 324 to 332° C. The peak temperature is the temperature corresponding to the maximum value on a heat-of-fusion curve with a temperature-increasing rate of 10° C./min using a differential scanning calorimeter (DSC) for a PTFE which has never been heated up to 300° C. or higher. The peak temperature can be specified as a temperature corresponding to a maximum value appearing in a differential thermal analysis (DTA) curve obtained by raising the temperature of PTFE, which has no history of heating to a temperature of 300° C. or higher, under a condition of 10° C./min using TG/DTA (thermogravimetric-differential thermal analyzer).

Preferably, the high-molecular-weight PTFE has at least one endothermic peak in a range of 333 to 347° C. on a heat-of-fusion curve with a temperature-increasing rate of 10° C./min using a differential scanning calorimeter (DSC) for a PTFE which has never been heated up to 300° C. or higher, and has an enthalpy of fusion of 62 mJ/mg or higher at 290 to 350° C. calculated from the heat-of-fusion curve.

The PTFE fine powder obtained by using the surfactant described above may also be used to produce unfired tape (green tape).

The surfactant, decomposition products and by-products of the surfactant by-produced from the surfactant, residual monomers, and the like may be collected from discharge water generated in the coagulation or the washing and/or from off gas generated in the drying, and then purified to reuse the surfactant, the decomposition products and by-products of the surfactant by-produced by the surfactant, and the residual monomers. The collection and the purification may be performed by known methods, although not limited thereto. For example, they may be performed by the methods disclosed in National Publication of International Patent Application No. 2011-520020.

(II) Melt-Fabricable Fluororesins (1) In the step C, the polymerization for FEP is preferably performed at a polymerization temperature of 10 to 150° C. and a polymerization pressure of 0.3 to 6.0 MPaG.

FEP preferably has a monomer composition ratio (% by mass) of TFE:HFP=(60 to 95):(5 to 40), more preferably (85 to 92):(8 to 15). The FEP may be modified with a perfluoro (alkyl vinyl ether) as a third component within a range of 0.1 to 2% by mass of all monomers.

In the polymerization for FEP, the hydrocarbon surfactant may be used within the use range of the production method of the present disclosure, and is usually added in an amount of 0.0001 to 10% by mass based on 100% by mass of the aqueous medium.

In the polymerization for FEP, the chain transfer agent used is preferably cyclohexane, methanol, ethanol, propanol, ethane, propane, butane, pentane, hexane, carbon tetrachloride, chloroform, methylene chloride, methyl chloride, or the like, and the pH buffer used is preferably ammonium carbonate, disodium hydrogen phosphate, or the like.

The aqueous dispersion of FEP obtained by the production method of the present disclosure may optionally be subjected to post-treatment such as concentration, and then the concentrate may be dried and powdered, and the powder may be melt-extruded into pellets. The aqueous medium in the aqueous dispersion of FEP may contain an additive such as a nonionic surfactant as necessary, but may contain a water-soluble organic solvent such as a water-soluble alcohol, or may contain no water-soluble organic solvent.

The melt extrusion may be performed under any appropriately set extrusion conditions usually capable of providing pellets.

In the production method of the present disclosure, although the resulting FEP may contain an end group such as —$CF_3$ or —$CF_2H$ on at least one of the polymer main chain and a polymer side chain, it is preferred that the content of thermally unstable groups such as —COOH, —$CH_2OH$, —COF, —CF=CF—, —$CONH_2$, or —$COOCH_3$ (hereinafter, referred to as an "unstable end group") is low or absent.

The unstable end group is chemically unstable, and thus not only reduces the heat resistance of the resin but also causes increase in the attenuation of the resulting electric wire.

The production method of the present disclosure is preferably performed in such a way that a polymer in which the total number of unstable end groups and —$CF_2H$ end groups at the completion of the polymerization is 50 or less per $1 \times 10^6$ carbon atoms is produced. The number of such groups is more preferably less than 20, still more preferably 5 or less, per $1 \times 10^6$ carbon atoms. There may also be neither unstable end groups nor —$CF_2H$ end groups, i.e. all end groups may be —$CF_3$ end groups.

The unstable end groups and the —$CF_2H$ end groups may be fluorinated and converted into the —$CF_3$ end groups and thereby stabilized. Examples of the fluorination method include, but not limited to, methods of exposing the polymer to a fluorine radical source that generates fluorine radicals under fluorination conditions. Examples of the fluorine radical source include fluorine gas, $CoF_3$, $AgF_2$, $UF_6$, $OF_2$, $N_2F_2$, $CF_3OF$, and halogen fluorides such as $IF_5$ and $ClF_3$. Of these, preferred is a method of bringing a fluorination gas and the FEP obtained by the production method of the present disclosure into direct contact with each other. In order to control the reaction, the contact is preferably performed using a diluted fluorine gas having a fluorine gas concentration of 10 to 50% by mass. The diluted fluorine gas is obtainable by diluting fluorine gas with an inert gas such as nitrogen gas or argon gas. The fluorine gas treatment may be performed at a temperature of 100 to 250° C. The treatment temperature is not limited to this range and may be appropriately set in accordance with the situation. The fluorine gas treatment is preferably performed by feeding a diluted fluorine gas into the reactor continuously or intermittently. This fluorination may be performed on dry powder after the polymerization or on melt-extruded pellets.

The FEP obtained by the production method of the present disclosure has good moldability and is less likely to cause molding defects, as well as has properties such as heat resistance, chemical resistance, solvent resistance, insulation, and electric properties.

The method for producing a powder of FEP is a method for obtaining a powder by drying and pulverizing the fluoropolymer aqueous dispersion containing FEP obtained by the production method of the present disclosure described above.

The powder may be fluorinated. The fluorinated powder may be produced by a method of feeding a fluorine gas to the powder obtained by the above-described method for producing a powder to fluorinate the powder to obtain a fluorinated powder.

The FEP pellets may be produced by a method of pelletizing the FEP obtained by the above-described production method of the present disclosure.

The pellets may be fluorinated. The fluorinated pellets may be produced by a method of feeding a fluorine gas to the pellets obtained by the above-described method for producing pellets to fluorinate the pellets to obtain fluorinated pellets.

Thus, this FEP may be used in production of a variety of molded articles such as coating materials for electric wires, foamed electric wires, cables, and wires, tubes, films, sheets, and filaments.

(2) In the step C, the polymerization for a TFE/perfluoro (alkyl vinyl ether) copolymer such as PFA or MFA and TFE/perfluoroallyl ether copolymer is usually preferably performed at a polymerization temperature of 10 to 100° C. and a polymerization pressure of 0.3 to 6.0 MPaG.

The TFE/perfluoro(alkyl vinyl ether) copolymer preferably has a monomer composition ratio (mol %) of TFE: perfluoro(alkyl vinyl ether)=(90 to 99.7):(0.3 to 10), more preferably (97 to 99):(1 to 3). The perfluoro(alkyl vinyl ether) used is preferably one represented by the formula: $CF_2=CFORf^4$, wherein $Rf^4$ is a perfluoroalkyl group having 1 to 6 carbon atoms.

The TFE/perfluoroallyl ether copolymer preferably has a monomer composition ratio (mol %) of TFE: perfluoroallyl ether=(90 to 99.7):(0.3 to 10), more preferably (97 to 99):(1 to 3). The perfluoroallyl ether used is preferably one represented by the formula: $CF_2=CFCF_2ORf^4$, wherein $Rf^4$ is a perfluoroalkyl group having 1 to 6 carbon atoms.

In the polymerization for the TFE/perfluoro(alkyl vinyl ether) copolymer and the TFE/perfluoroallyl ether copolymer, the surfactant may be used within the use range of the production method of the present disclosure, but is usually preferably added in an amount of 0.0001 to 10% by mass based on 100% by mass of the aqueous medium.

In the polymerization for the TFE/perfluoro(alkyl vinyl ether) copolymer and the TFE/perfluoroallyl ether copolymer, the chain transfer agent used is preferably cyclohexane, methanol, ethanol, propanol, propane, butane, pentane, hexane, carbon tetrachloride, chloroform, methylene chloride, methyl chloride, methane, ethane, or the like, and the pH buffer used is preferably ammonium carbonate, disodium hydrogen phosphate, or the like.

The aqueous dispersion of the TFE/perfluoro(alkyl vinyl ether) copolymer and the TFE/perfluoroallyl ether copolymer such as PFA or MFA obtained by the production method of the present disclosure may be subjected to post-treatment such as concentration as necessary, dried, powdered, and then melt-extruded into pellets. The aqueous medium in the aqueous dispersion described above may contain an additive such as a nonionic surfactant as necessary, but may contain a water-soluble organic solvent such as a water-soluble alcohol, or may contain no water-soluble organic solvent.

The melt extrusion may be performed under any appropriately set extrusion conditions usually capable of providing pellets.

In order to improve the heat resistance of the copolymer and to reinforce a chemical permeation suppression effect of a molded article, the copolymer is preferably subjected to a fluorine gas treatment.

The fluorine gas treatment is performed by bringing fluorine gas into contact with a chemical permeation suppressant. However, since the reaction with fluorine is extremely exothermic, it is preferable to dilute fluorine with an inert gas such as nitrogen. The amount of fluorine in the fluorine gas/inert gas mixture is 1 to 100% by mass, preferably 10 to 25% by mass. The treatment temperature is 150 to 250° C., preferably 200 to 250° C. and the fluorine gas treatment duration is 3 to 16 hours, preferably 4 to 12 hours. The fluorine gas treatment is performed at a gas pressure in the range of 1 to 10 atm, preferably atmospheric pressure. In the case of using a reactor at atmospheric pressure, the fluorine gas/inert gas mixture may be continuously passed through the reactor. This results in conversion of unstable ends of the copolymer into —$CF_3$ ends, thermally stabilizing the copolymer.

The copolymer and the composition thereof may be molded by compression molding, transfer molding, extrusion molding, injection molding, blow molding, or the like as in the case of conventional PFA.

Such a molding technique can provide a desired molded article. Examples of the molded article include sheets, films, packings, round bars, square bars, pipes, tubes, round tanks, square tanks, tanks, wafer carriers, wafer boxes, beakers, filter housings, flowmeters, pumps, valves, cocks, connectors, nuts, electric wires, and heat-resistant electric wires.

Preferred among these are tubes, pipes, tanks, connectors, and the like to be used for a variety of chemical reaction devices, semiconductor manufacturing devices, and acidic or alkaline chemical feeding devices each requiring chemical impermeability.

The aqueous dispersion of the TFE/perfluoro(alkyl vinyl ether) copolymer and the TFE/perfluoroallyl ether copolymer such as PFA or MFA may also be appropriately mixed with a nonionic surfactant, and optionally polyethersulfone, polyamide-imide, and/or polyimide and metal powder are dissolved or dispersed in an organic solvent. Thereby, a primer composition can be obtained. This primer composition may be used for a method of applying a fluororesin to a metal surface. The method includes applying the primer composition to a metal surface, applying a melt-fabricable fluororesin composition to the resulting primer layer, and firing the melt-fabricable fluororesin composition layer together with the primer layer.

(3) In the step C, the polymerization for ETFE is preferably performed at a polymerization temperature of 10 to 100° C. and a polymerization pressure of 0.3 to 2.0 MPaG.

The ETFE preferably has a monomer composition ratio (mol %) of TFE:ethylene=(50 to 99):(50 to 1). The ETFE may be modified with a third monomer within a range of 0 to 20% by mass of all monomers. The composition ratio thereof is preferably TFE:ethylene:third monomer=(63 to 94):(27 to 2):(1 to 10). The third monomer is preferably perfluorobutyl ethylene, perfluorohexyl ethylene, 3,3,4,4,5,5,6,6,7,7,8,8,8-tridecafluorooct-1-ene, 2,3,3,4,4,5,5-heptafluoro-1-pentene ($CH_2=CFCF_2CF_2CF_2H$), or 2-trifluoromethyl-3,3,3-trifluoropropene (($CF_3)_2C=CH_2$).

In the polymerization for ETFE, the surfactant may be used within the use range of the production method of the present disclosure, and is usually added in an amount of 0.0001 to 10% by mass based on 100% by mass of the aqueous medium.

In the polymerization for ETFE, the chain transfer agent used is preferably cyclohexane, methanol, ethanol, propanol, ethane, propane, butane, pentane, hexane, carbon tetrachloride, chloroform, methylene chloride, methyl chloride, or the like.

The aqueous dispersion of ETFE obtained by the production method of the present disclosure may optionally be subjected to post-treatment such as concentration, and then the concentrate may be dried and powdered, and the powder may be melt-extruded into pellets. The aqueous medium in the aqueous dispersion described above may contain an additive such as a nonionic surfactant as necessary, but may contain a water-soluble organic solvent such as a water-soluble alcohol, or may contain no water-soluble organic solvent.

The melt extrusion may be performed under any appropriately set extrusion conditions usually capable of providing pellets.

The ETFE may be extrusion-molded into a sheet. In other words, powder or pellets of ETFE in a molten state may be continuously extruded through a die and then cooled to provide a sheet-shaped molded article. The ETFE may be mixed with an additive.

Known additives may be incorporated as appropriate. Specific examples thereof include ultraviolet absorbers, photostabilizers, antioxidants, infrared absorbers, flame retarders, flame-retardant fillers, organic pigments, inorganic pigments, and dyes. From the viewpoint of excellent weather resistance, inorganic additives are preferred.

The content of the additive in the ETFE sheet is preferably 20% by mass or less, and particularly preferably 10% by mass or less, based on the total mass of the ETFE sheet.

The ETFE sheet has excellent mechanical strength and appearance, and thus can suitably be used for film materials (e.g., roof materials, ceiling materials, outer wall materials, inner wall materials, and coating materials) of film-structured buildings (e.g., sports facilities, gardening facilities, and atriums).

In addition to the film materials of film-structured buildings, the ETFE sheet is also useful for, for example, outdoor boards (e.g., noise-blocking walls, windbreak fences, breakwater fences, roof panels of carports, shopping arcades, footpath walls, and roof materials), shatter-resistant window films, heat-resistant waterproof sheets, building materials (e.g., tent materials of warehouse tents, film materials for shading, partial roof materials for skylights, window materials alternative to glass, film materials for flame-retardant partitions, curtains, outer wall reinforcement, waterproof films, anti-smoke films, non-flammable transparent partitions, road reinforcement, interiors (e.g., lighting, wall surfaces, and blinds), exteriors (e.g., tents and signboards)), living and leisure goods (e.g., fishing rods, rackets, golf clubs, and screens), automobile materials (e.g., hoods, damping materials, and bodies), aircraft materials, shipment materials, exteriors of home appliances, tanks, vessel inner walls, filters, film materials for construction works, electronic materials (e.g., printed circuit boards, circuit boards, insulating films, and release films), surface materials for solar cell modules, mirror protection materials for solar thermal energy, and surface materials for solar water heaters.

(4) The production method of the present disclosure may be used to produce a fluoropolymer aqueous dispersion containing an electrolyte polymer precursor. In the step C, the polymerization for the electrolyte polymer precursor is preferably performed at a polymerization temperature of 10 to 100° C. and a polymerization pressure of 0.1 to 2.0 MPaG. The electrolyte polymer precursor contains a vinyl ether monomer as described below and can be converted into an ion-exchangeable polymer through a hydrolysis treatment.

An example of the vinyl ether monomer to be used for the electrolyte polymer precursor is a fluoromonomer represented by the general formula (150):

$$CF_2=CF-O-(CF_2CFY^{151}-O)_n-(CFY^{152})_m-A^{151}$$

wherein $Y^{151}$ represents a fluorine atom, a chlorine atom, a $-SO_2F$ group, or a perfluoroalkyl group; the perfluoroalkyl group optionally containing ether oxygen and a $-SO_2F$ group; n represents an integer of 0 to 3; n $Y^{151}$s are the same as or different from each other; $Y^{152}$ represents a fluorine atom, a chlorine atom, or a $-SO_2F$ group; m represents an integer of 1 to 5; m $Y^{152}$s are the same as or different from each other; $A^{151}$ represents $-SO_2X^{151}$, $-COZ^{151}$, or $-POZ^{152}Z^{153}$; $X^{151}$ represents F, Cl, Br, I, $-OR^{151}$, or $-NR^{152}R^{153}$; $Z^{151}$, $Z^{152}$, and $Z^{153}$ are the same as or different from each other, and each represent $-NR^{154}R^{155}$ or $-OR^{156}$; and $R^{151}$, $R^{152}$, $R^{153}$, $R^{154}$, $R^{155}$, and $R^{156}$ are the same as or different from each other, and each represent H, ammonium, an alkali metal, or an alkyl group, aryl group, or sulfonyl-containing group optionally containing a fluorine atom. The electrolyte polymer precursor preferably has a monomer composition ratio (mol %) of TFE:vinyl ether=(50 to 99):(50 to 1), more preferably TFE:vinyl ether=(50 to 93):(50 to 7).

The electrolyte polymer precursor may be modified with a third monomer within a range of 0 to 20% by mass of all monomers. Examples of the third monomer include multifunctional monomers such as CTFE, vinylidene fluoride, perfluoroalkyl vinyl ether, and divinylbenzene.

The electrolyte polymer precursor thereby obtained may be molded into a film, followed by hydrolysis using an alkali solution and a treatment using a mineral acid, and thereby used as a polymer electrolyte film for fuel cells, electrolysis devices, redox flow batteries, and the like.

The electrolyte polymer precursor may be hydrolyzed using an alkali solution while the dispersed state thereof is maintained, thereby providing an electrolyte polymer dispersion.

This dispersion may be then heated up to 120° C. or higher in a pressurized vessel and thereby dissolved in, for example, a solvent mixture of water and an alcohol, i.e., converted into a solution state.

The solution thereby obtained may be used as a binder for electrodes. Also, the solution may be combined with a variety of additives and cast to form a film, and the film may be used for antifouling films, organic actuators, or the like.

(5) TFE/VDF Copolymer

In the step C, the polymerization temperature of the TFE/VDF copolymer is not limited and may be 0 to 100° C. The polymerization pressure is appropriately determined according to other polymerization conditions such as the polymerization temperature, but is usually 0 to 9.8 MPaG.

The TFE/VDF copolymer preferably has a monomer composition ratio (mol %) of TFE:VDF=(5 to 90):(95 to 10). The TFE/VDF copolymer may be modified with a third monomer within a range of 0 to 50 mol % of all monomers. The composition ratio thereof is preferably TFE:ethylene:third monomer=(30 to 85):(10 to 69.9):(0.1 to 10).

The third monomer is preferably a monomer represented by the formula:

$$CX^{11}X^{12}=CX^{13}(CX^{14}X^{15})_{n11}X^{16}$$

wherein $X^{11}$ to $X^{16}$ are the same as or different from each other, and each represent H, F, or Cl; n11 represents an integer of 0 to 8, with the proviso that the third monomer is other than TFE and VDF; or a monomer represented by the formula:

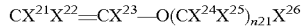

$$CX^{21}X^{22}=CX^{23}-O(CX^{24}X^{25})_{n21}X^{26}$$

wherein $X^{21}$ to $X^{26}$ are the same as or different from each other, and each represent H, F, or Cl; and n21 represents an integer of 0 to 8.

The third monomer may be a fluorine-free ethylenic monomer. From the viewpoint of maintaining the heat resistance and the chemical resistance, the fluorine-free ethylenic monomer is preferably selected from ethylenic monomers having 6 or less carbon atoms. Examples thereof include ethylene, propylene, 1-butene, 2-butene, vinyl chloride, vinylidene chloride, alkyl vinyl ethers (e.g., methyl vinyl ether, ethyl vinyl ether, and propyl vinyl ether), maleic acid, itaconic acid, 3-butenoic acid, 4-pentenoic acid, vinylsulfonic acid, acrylic acid, and methacrylic acid.

In the polymerization for the TFE/VDF copolymer, the surfactant described above may be used within the use range of the production method of the present disclosure, and is usually added in an amount of 0.0001 to 5% by mass based on 100% by mass of the aqueous medium.

The TFE/VDF copolymer obtained by the polymerization may be amidated by bringing it into contact with a nitrogen compound capable of generating ammonia water, ammonia gas, or ammonia.

The TFE/VDF copolymer obtained by the above-described method may also preferably be used as a material for providing TFE/VDF copolymer fibers by a spinning-drawing method. The spinning-drawing method is a method for obtaining a TFE/VDF copolymer fiber by melt spinning a TFE/VDF copolymer, cooling and solidifying it to obtain an undrawn yarn, and then running the undrawn yarn in a heating cylinder to draw the undrawn yarn.

The TFE/VDF copolymer may be dissolved in an organic solvent to provide a solution of the TFE/VDF copolymer. Examples of the organic solvent include nitrogen-containing organic solvents such as N-methyl-2-pyrrolidone, N,N-dimethyl acetamide, and dimethyl formamide; ketone-based solvents such as acetone, methyl ethyl ketone, cyclohexanone, and methyl isobutyl ketone; ester-based solvents such as ethyl acetate and butyl acetate; ether-based solvents such as tetrahydrofuran and dioxane; and general-purpose organic solvents having a low boiling point such as solvent mixtures thereof. The solution may be used as a binder for batteries.

The aqueous dispersion of the TFE/VDF copolymer may preferably be used to coat a porous substrate formed from a polyolefin resin to provide a composite porous film. The aqueous dispersion may also preferably contain inorganic particles and/or organic particles dispersed therein and be used to coat a porous substrate to provide a composite porous film. The composite porous film thereby obtained may be used as a separator for lithium secondary batteries.

The powder of the melt-fabricable fluororesin is suitably used as a powdery coating material. When applied to a substrate, the powdery coating material made of the melt-fabricable fluororesin powder can provide a film having a smooth surface. The melt-fabricable fluororesin powder having an average particle size of 1 μm or greater and smaller than 100 μm is particularly suitable as a powdery coating material used for electrostatic coating. The melt-fabricable fluororesin powder having an average particle size of 100 μm or greater and 1,000 μm or smaller is particularly suitable as a powdery coating material used for rotational coating or rotational molding.

The melt-fabricable fluororesin powder can be produced by a method of drying the aqueous dispersion of the melt-fabricable fluororesin obtained by the production method of the present disclosure described above to powder the melt-fabricable fluororesin. The production method for producing the melt-fabricable fluororesin powder is also one aspect of the present disclosure.

(III) Fluoroelastomers

In the step C, the polymerization reaction for the fluoroelastomer is initiated by charging pure water and the surfactant into a pressure-resistant reaction vessel equipped with a stirrer, deoxidizing the system, charging the monomers, increasing the temperature to a predetermined level, and adding a polymerization initiator. The pressure decreases as the reaction progresses, and additional monomers are fed continuously or intermittently to maintain the initial pressure. When the amount of the monomers fed reaches a predetermined level, feeding is stopped, and the monomers in the reaction vessel are purged and the temperature is returned to room temperature, whereby the reaction is completed. In this case, polymer latex can be continuously taken out of the reaction vessel.

In particular, in the case of producing a thermoplastic elastomer as the fluoroelastomer, it is also possible to use a method in which fluoropolymer fine particles are synthesized at a high concentration defined as described above and then diluted for further polymerization as disclosed in International Publication No. WO00/01741, whereby the final polymerization rate can be increased as compared with ordinary polymerization.

The polymerization of the fluoroelastomer is performed at a polymerization temperature of usually −20 to 200° C., preferably 5 to 150° C. and at a polymerization pressure of usually 0.5 to 10MPaG, preferably 1 to 7MPaG, although conditions are appropriately selected from the viewpoint of the physical properties of the target polymer and the control of the polymerization rate. Further, the pH in the polymerization medium is usually preferably maintained at 2.5 to 13 by a known method or the like, using a pH adjuster or the like described later.

Examples of the monomer used in the polymerization for the fluoroelastomer include vinylidene fluoride, as well as fluorine-containing ethylenically unsaturated monomers having fluorine atoms at least as much as the carbon atoms therein and copolymerizable with vinylidene fluoride. Examples of the fluorine-containing ethylenically unsaturated monomers include trifluoropropene, pentafluoropropene, hexafluorobutene, and octafluorobutene. Of these, hexafluoropropene is particularly preferred because of the properties of the elastomer obtained when hexafluoropropene blocks the crystal growth of the polymer. Examples of the fluorine-containing ethylenically unsaturated monomers also include trifluoroethylene, TFE, and CTFE. Fluorine-containing monomers containing one or two or more chlorine and/or bromine substituents may also be used. Perfluoro (alkyl vinyl ethers) such as perfluoro(methyl vinyl ether) may also be used. TFE and HFP are preferred for producing fluoroelastomer.

The fluoroelastomer preferably has a monomer composition ratio (% by mass) of vinylidene fluoride:HFP:TFE=(20 to 70):(30 to 48):(0 to 32). The fluoroelastomer having this composition ratio exhibits good elastomeric characteristics, chemical resistance, and thermal stability.

In the polymerization for the fluoroelastomer, the surfactant may be used within the use range of the production method of the present disclosure, and is usually added in an amount of 0.0001 to 20% by mass, preferably 10% by mass or less, and more preferably 2% by mass or less, based on 100% by mass of the aqueous medium.

In the polymerization for the fluoroelastomer, the polymerization initiator used may be a known inorganic radical polymerization initiator. Examples of particularly useful inorganic radical polymerization initiators include conventionally known water-soluble inorganic peroxides, such as persulfates, perphosphates, perborates, percarbonates or permanganates of sodium, potassium, and ammonium. The radical polymerization initiators may further be activated with a reducing agent, for example, sulfites, bisulfites, metabisulfites, hyposulfites, thiosulfates, phosphites or hypophosphites of sodium, potassium or ammonium, or with readily oxidizable metal compounds, for example an iron(I) salt, a copper(I) salt, or a silver salt. The suitable inorganic radical polymerization initiator is ammonium persulfate, which is more preferably used in redox systems together with ammonium persulfate and sodium bisulfite.

The concentration of the polymerization initiator added is appropriately determined by the molecular weight of the target fluoropolymer and the polymerization reaction rate, but is set to an amount of 0.0001 to 10% by mass, preferably 0.01 to 5% by mass, based on the total amount of the monomer of 100% by mass.

In the polymerization for the fluoroelastomer, a known chain transfer agent may be used, and examples thereof include hydrocarbons, esters, ethers, alcohols, ketones, chlorine compounds, and carbonates. A hydrocarbon, an ester, an ether, an alcohol, a chlorine compound, an iodine compound, or the like may be used as the thermoplastic elastomer, for example. Of these, preferred are acetone and isopropyl alcohol. From the viewpoint of reducing a reaction rate drop in polymerization for a thermoplastic elastomer, isopentane, diethyl malonate, and ethyl acetate are preferred. Diiodine compounds such as $I(CF_2)_4I$, $I(CF_2)_6I$, and $ICH_2I$ are preferred because they can iodize ends of the polymer and allow the resulting polymer to serve as a reactive polymer.

The amount of the chain transfer agent used is usually $0.5 \times 10^{-3}$ to $5 \times 10^{-3}$ mol %, preferably $1.0 \times 10^{-3}$ to $3.5 \times 10^{-3}$ mol %, based on the total amount of the monomers fed.

Paraffin wax may preferably be used as an emulsification stabilizer on the polymerization for the fluoroelastomer, for example. A phosphate, sodium hydroxide, potassium hydroxide, or the like may preferably be used as a pH adjuster in the polymerization for a thermoplastic elastomer, for example.

The pre-treatment aqueous dispersion containing a fluoroelastomer obtained in the step C has a solid concentration of 1.0 to 40% by mass, an average particle size of 0.03 to 1 μm, preferably 0.05 to 0.5 μm, and a number-average molecular weight of 1,000 to 2,000,000 at the end of polymerization.

The aqueous dispersion of the fluoroelastomer obtained by the production method of the present disclosure may optionally be mixed with a dispersion stabilizer such as a hydrocarbon surfactant or be concentrated, for example, to form a dispersion suitable for rubber molding. The dispersion is subjected to treatments such as pH adjustment, solidification, and heating. The treatments are performed as follows.

The pH adjustment is performed such that a mineral acid such as nitric acid, sulfuric acid, hydrochloric acid, or phosphoric acid and/or a carboxylic acid or the like having 5 or less carbon atoms and having pK=4.2 or lower is added to adjust the pH to 2 or lower.

The solidification is performed by adding an alkaline earth metal salt. Examples of the alkaline earth metal salt include nitrates, chlorates, and acetates of calcium or magnesium.

Although the pH adjustment and the solidification may be performed in any order, the pH adjustment is preferably performed prior to performing the solidification.

These operations are followed by washing with the same volume of water as the fluoroelastomer to remove a small amount of impurities such as buffer solution and salts present in the fluoroelastomer and drying of the fluoroelastomer. Drying is usually performed in a drying furnace at a high temperature of about 70 to 200° C. while circulating air.

The fluoroelastomer may be either a partially fluorinated elastomer or a perfluoroelastomer.

Examples of the partially fluorinated elastomer include vinylidene fluoride (VdF)-based fluoroelastomers, tetrafluoroethylene (TFE)/propylene (Pr)-based fluoroelastomers, tetrafluoroethylene (TFE)/propylene/vinylidene fluoride (VdF)-based fluoroelastomers, ethylene/hexafluoropropylene (HFP)-based fluoroelastomers, ethylene/hexafluoropropylene (HFP)/vinylidene fluoride (VdF)-based fluoroelastomers, and ethylene/hexafluoropropylene (HFP)/tetrafluoroethylene (TFE)-based fluoroelastomers. Of these, the partially fluorinated elastomer is preferably at least one selected from the group consisting of vinylidene fluoride-based fluoroelastomers and tetrafluoroethylene/propylene-based fluoroelastomers.

The vinylidene fluoride-based fluoroelastomer is preferably a copolymer containing 45 to 85 mol % of vinylidene fluoride and 55 to 15 mol % of at least one monomer copolymerizable with and different from vinylidene fluoride. The vinylidene fluoride-based fluoroelastomer is more preferably a copolymer containing 50 to 80 mol % of vinylidene fluoride and 50 to 20 mol % of at least one monomer copolymerizable with and different from vinylidene fluoride.

Examples of the at least one monomer copolymerizable with and different from vinylidene fluoride include monomers such as tetrafluoroethylene (TFE), hexafluoropropylene (HFP), fluoroalkyl vinyl ethers, chlorotrifluoroethylene (CTFE), trifluoroethylene, trifluoropropylene, pentafluoropropylene, trifluorobutene, tetrafluoroisobutene, hexafluoroisobutene, vinyl fluoride, a fluoromonomer represented by the general formula (100): $CH_2=CFRf^{101}$ (wherein $Rf^{101}$ is a linear or branched fluoroalkyl group having 1 to 12 carbon atoms), a fluoromonomer represented by the general formula (170): $CH_2=CH-(CF_2)_n-X^{171}$ (wherein $X^{171}$ is H or F; and n is an integer of 3 to 10), and a monomer that provides a crosslinking site; and non-fluorinated monomers such as ethylene, propylene, and alkyl vinyl ethers. These may be used alone or in any combination thereof. Of these, preferred is at least one selected from the group consisting of TFE, HFP, fluoroalkyl vinyl ether, and CTFE. The fluoroalkyl vinyl ether is preferably a fluoromonomer represented by the general formula (160).

Specific examples of the vinylidene fluoride-based fluoroelastomers include VdF/HFP-based rubber, VdF/HFP/TFE-based rubber, VdF/CTFE-based rubber, VdF/CTFE/TFE-based rubber, rubber based on VDF and a fluoromonomer represented by the general formula (100), rubber based on VDF, a fluoromonomer represented by the general formula (100), and TFE, rubber based on VDF and perfluoro(methyl vinyl ether) (PMVE), VDF/PMVE/TFE-based rubber, and VDF/PMVE/TFE/HFP-based rubber. The rubber based on VDF and a fluoromonomer represented by the general formula (100) is preferably VDF/CH$_2$=CFCF$_3$-based rubber. The rubber based on VDF, a fluoromonomer represented by the formula (100), and TFE is preferably VDF/TFE/CH$_2$=CFCF$_3$-based rubber.

The VDF/CH$_2$=CFCF$_3$-based rubber is preferably a copolymer containing 40 to 99.5 mol % of VDF and 0.5 to 60 mol % of CH$_2$=CFCF$_3$, more preferably a copolymer containing 50 to 85 mol % of VDF and 20 to 50 mol % of CH$_2$=CFCF$_3$.

The tetrafluoroethylene/propylene-based fluoroelastomer is preferably a copolymer containing 45 to 70 mol % of tetrafluoroethylene, 55 to 30 mol % of propylene, and 0 to 5 mol % of a fluoromonomer that provides a crosslinking site.

The fluoroelastomer may be a perfluoroelastomer. The perfluoroelastomer is preferably at least one selected from the group consisting of perfluoroelastomers containing TFE, such as a copolymer containing TFE and a fluoromonomer represented by the general formula (160), (130), or (140) and a copolymer containing TFE, a fluoromonomer represented by the general formula (160), (130), or (140), and a monomer that provides a crosslinking site.

In the case of the TFE/PMVE copolymer, the composition ratio thereof is preferably 45 to 90/10 to 55 (mol %), more preferably 55 to 80/20 to 45, and still more preferably 55 to 70/30 to 45.

In the case of the copolymer of TFE, PMVE, and a monomer that provides a crosslinking site, the composition ratio thereof is preferably 45 to 89.9/10 to 54.9/0.01 to 4 (mol %), more preferably 55 to 77.9/20 to 49.9/0.1 to 3.5, and still more preferably 55 to 69.8/30 to 44.8/0.2 to 3.

In the case of the copolymer of TFE and a fluoromonomer represented by the general formula (160), (130), or (140) having 4 to 12 carbon atoms, the composition ratio thereof is preferably 50 to 90/10 to 50 (mol %), more preferably 60 to 88/12 to 40, and still more preferably 65 to 85/15 to 35.

In the case of the copolymer of TFE, a fluoromonomer represented by the general formula (160), (130), or (140) having 4 to 12 carbon atoms, and a monomer that provides a crosslinking site, the composition ratio thereof is preferably 50 to 89.9/10 to 49.9/0.01 to 4 (mol %), more preferably 60 to 87.9/12 to 39.9/0.1 to 3.5, and still more preferably 65 to 84.8/15 to 34.8/0.2 to 3.

When these copolymers have compositional features outside these ranges, the properties as a rubber elastic body are lost, and the properties tend to be close to those of a resin.

The perfluoroelastomer is preferably at least one selected from the group consisting of copolymers of TFE, a fluoromonomer represented by the general formula (140), and a fluoromonomer that provides a crosslinking site, copolymers of TFE and a perfluorovinyl ether represented by the general formula (140), copolymers of TFE and a fluoromonomer represented by the general formula (160), and copolymers of TFE, a fluoromonomer represented by the general formula (160), and a monomer that provides a crosslinking site.

Examples of the perfluoroelastomer further include the perfluoroelastomers disclosed in documents such as International Publication No. WO97/24381, Japanese Patent Publication No. 61-57324, Japanese Patent Publication No. 04-81608, and Japanese Patent Publication No. 05-13961.

From the viewpoint of achieving an excellent compression set at high temperature, the fluoroelastomer preferably has a glass transition temperature of −70° C. or higher, more preferably −60° C. or higher, and still more preferably −50° C. or higher. From the viewpoint of achieving good cold resistance, the glass transition temperature is preferably 5° C. or lower, more preferably 0° C. or lower, and still more preferably −3° C. or lower.

The glass transition temperature can be determined as follows. Specifically, using a differential scanning calorimeter (DSC822e, manufactured by Mettler-Toledo International Inc.), 10 mg of a sample is heated at a rate of 10° C./min to give a DSC curve, and the temperature is read at the midpoint of two intersections between each of the extension lines of the base lines before and after the secondary transition of the DSC curve and the tangent line at the inflection point of the DSC curve.

From the viewpoint of achieving good heat resistance, the fluoroelastomer preferably has a Mooney viscosity ML(1+20) at 170° C. of 30 or higher, more preferably 40 or higher, and still more preferably 50 or higher. From the viewpoint of achieving good processability, the Mooney viscosity is preferably 150 or lower, more preferably 120 or lower, and still more preferably 110 or lower.

From the viewpoint of achieving good heat resistance, the fluoroelastomer preferably has a Mooney viscosity ML(1+20) at 140° C. of 30 or higher, more preferably 40 or higher, and still more preferably 50 or higher. From the viewpoint of achieving good processability, the Mooney viscosity is preferably 180 or lower, more preferably 150 or lower, and still more preferably 110 or lower.

From the viewpoint of achieving good heat resistance, the fluoroelastomer preferably has a Mooney viscosity ML(1+10) at 100° C. of 10 or higher, more preferably 20 or higher, and still more preferably 30 or higher. From the viewpoint of achieving good processability, the Mooney viscosity is preferably 120 or lower, more preferably 100 or lower, and still more preferably 80 or lower.

The Mooney viscosity can be determined using a Mooney viscometer MV2000E manufactured by Alpha Technologies Inc. at 170° C., 140° C., or 100° C. in conformity with JIS K 6300.

The pre-treatment aqueous dispersion containing fluoroelastomer used in the production method of the present disclosure may be in any form as long as it is obtained from the above polymerization, may be an aqueous dispersion as polymerized, may be a diluted or concentrated product of an aqueous dispersion as polymerized, or may be a dispersion stabilized product thereof. Further, the fluoropolymer aqueous dispersion containing fluoroelastomer obtained by the production method of the present disclosure can also be used as a gum or crumb obtained by coagulation, drying, and the like by a conventionally known method. The surfactant used in the step C can improve the stability of the aqueous dispersion, and is more preferably used in a polymerization method in which substances insoluble in water such as an initiator, including an organic peroxide, and a chain transfer agent, including an iodine or bromine compound, are added during the polymerization defined as described above.

The gum is a small particulate mass of the fluoroelastomer. The crumb is an amorphous mass of the fluoroelastomer resulting from fusion of particles that cannot maintain the form of small particles as gum at room temperature.

The fluoroelastomer may be mixed with an additive such as a curing agent and a filler to be processed into a fluoroelastomer composition.

Examples of the curing agent include polyols, polyamines, organic peroxides, organotins, bis(aminophenol)tetraamine, and bis(thioaminophenol).

The fluoroelastomer composition is made of the above fluoroelastomer, and thus is substantially free from an emulsifier and is excellent in that it is easily crosslinked during molding.

The fluoroelastomer may be molded to form a fluoroelastomer molded body. The molding may be performed by any method such as a known method using the above-mentioned curing agent.

The fluoroelastomer molded body is suitable for seals, gaskets, electric wire coatings, hoses, tubes, laminated products, and accessories, particularly parts for semiconductor manufacturing devices and automobile parts.

A fluoropolymer aqueous dispersion is obtained by the production method of the present disclosure.

The fluoropolymer aqueous dispersion may contain a hydrocarbon surfactant. Examples of the hydrocarbon surfactant include the hydrocarbon surfactants described above.

The hydrocarbon surfactant can be suitably used as a dispersant for dispersing the fluoropolymer obtained by polymerization in an aqueous medium.

The present disclosure further provides a fluoropolymer aqueous dispersion containing a hydrocarbon surfactant, an aqueous medium, and a fluoropolymer, wherein the difference ΔL* between the lightness L* of the fluoropolymer aqueous dispersion and the lightness L* of a post-microfiltration fluoropolymer aqueous dispersion obtained by microfiltration of the fluoropolymer aqueous dispersion (the fluoropolymer aqueous dispersion after purification under conditions using a microfiltration membrane) is less than 27.

A specific method of the purification (microfiltration) is microfiltration under the condition that 1.13 g of a nonionic surfactant is added to 130 g of a fluoropolymer aqueous dispersion, 7.12 g of a nonionic surfactant is added to 1040 g of pure water to make additional water, and the aqueous dispersion is brought into contact with a microfiltration membrane (made of polyethylene, inner diameter 0.7 mm, length 130 mm, average pore diameter 0.1 μm, effective membrane area 150 cm$^2$) at a water pressure of 0.1 MPa and a temperature of 25° C.

The ΔL* is a value represented by the following formula, and is an absolute value of a value obtained by subtracting the lightness L* before purification from the lightness L* after purification.

$$\Delta L^* = |\text{Lightness after purification } L^* - \text{Lightness before purification } L^*|$$

The ΔL* is preferably 25 or less, more preferably 20 or less, still more preferably 15 or less, further preferably 10 or less, and still further preferably 5 or less, particularly preferably 3 or less, and most preferably 1 or less.

The fluoropolymer aqueous dispersion of the present disclosure can be obtained by the production method of the present disclosure described above.

The fluoropolymer in the fluoropolymer aqueous dispersion obtained by the production method of the present disclosure and the fluoropolymer aqueous dispersion of the present disclosure is more preferably a fluororesin, still more preferably a fluororesin having a fluorine substitution percentage described above of 50% or more, further preferably a fluororesin having a fluorine substitution percentage of more than 50%, further preferably a fluororesin having a fluorine substitution percentage of 55% or more, further preferably a fluororesin having a fluorine substitution percentage of 60% or more, further preferably a fluororesin having a fluorine substitution percentage of 75% or more, particularly preferably a fluororesin having a fluorine substitution percentage of 80% or more, and most preferably a fluororesin having a fluorine substitution percentage of 90 to 100%, that is, a perfluororesin. The perfluororesin is more preferably a fluororesin having a fluorine substitution percentage of 95 to 100%, still more preferably PTFE, FEP, or PFA, and particularly preferably PTFE. As the PTFE, any of the embodiments described in the production method of the present disclosure can be employed.

The fluoropolymer in the fluoropolymer aqueous dispersion obtained by the production method of the present disclosure and the fluoropolymer aqueous dispersion of the present disclosure is preferably PTFE, FEP, TFE/perfluoro (alkyl vinyl ether) copolymer, and still more preferably PTFE.

The fluoropolymer aqueous dispersion obtained by the production method of the present disclosure and the fluoropolymer aqueous dispersion of the present disclosure preferably contain an anionic hydrocarbon surfactant of 0.0001 to 15% by mass. When the amount of the dispersion stabilizer is less than 0.0001% by mass, the dispersion stability may deteriorate, and when the amount thereof is more than 15% by mass, dispersion effects commensurate with the amount thereof may not be obtained, which is impractical. The lower limit of the hydrocarbon surfactant is more preferably 0.001% by mass, while the upper limit thereof is more preferably 10% by mass, still more preferably 2% by mass.

The fluoropolymer aqueous dispersion obtained by the production method of the present disclosure and the fluoropolymer aqueous dispersion of the present disclosure preferably contain an anionic hydrocarbon surfactant of 0.00001 to 10% by mass. The lower limit of the content of the anionic hydrocarbon surfactant is more preferably 0.00005% by mass, 0.0001% by mass, 0.0002% by mass, and 0.0005% by mass in the order of preference, and the upper limit thereof is preferably 5% by mass, 3% by mass, 1% by mass, 0.1% by mass, 0.0250% by mass, 0.0200% by mass, 0.0150% by mass, 0.0100% by mass, 0.0050% by mass, 0.0025% by mass, and 0.0010% by mass in the order of preference.

The content of the anionic hydrocarbon surfactant is determined by an analytical method such as LCMS.

Examples of the anionic hydrocarbon surfactant include the anionic hydrocarbon surfactant used in the polymerization described in the production method of the present disclosure described above. For example, at least one selected from the group consisting of the surfactant represented by R-L-M, the compound (a), the surfactant (a), the surfactant (b), the surfactant (c), the surfactant (d), and the surfactant (1) is preferable.

The anionic hydrocarbon surfactant may be a hydrocarbon surfactant obtained by subjecting at least one surfactant selected from the group consisting of the compound (α), the surfactant (a) represented by the formula (a), the surfactant (b) represented by the formula (b), the surfactant (c) represented by the formula (c), the surfactant (d) represented by the formula (d), and the surfactant (1) represented by the formula (1) to a radical treatment or oxidation treatment. The radical treatment or oxidation treatment is as described above.

The fluoropolymer aqueous dispersion of the present disclosure preferably contains a nonionic surfactant. Those listed as the hydrocarbon surfactants described above can be adopted as the nonionic surfactant. In particular, the nonionic surfactant is preferably at least one selected from the group consisting of the compound represented by the general formula (i) and the compound represented by the general formula (ii).

In the fluoropolymer aqueous dispersion obtained by the production method of the present disclosure and the fluoropolymer aqueous dispersion of the present disclosure, the content of the fluoropolymer is not limited, but may be, for example, 0.01 to 80% by mass. The content thereof is more preferably 0.02% by mass or more, still more preferably 0.05% by mass or more, and more preferably 75% by mass or less, still more preferably 70% by mass or less.

The fluoropolymer aqueous dispersion preferably has a lightness L* of 70 or more. The lightness is more preferably 80 or more, and still more preferably 90 or more. The lightness L* may be more than 70, more than 80, and more than 90.

The lightness L* is measured by an X-rite colorimeter.

Conventionally known additives such as pigments and fillers can be added to the fluoropolymer aqueous dispersion obtained by the production method of the present disclosure and the fluoropolymer aqueous dispersion of the present disclosure. The additives may be used within a range that does not impair the effects of the present disclosure.

The fluoropolymer aqueous dispersion obtained by the production method of the present disclosure and the fluoropolymer aqueous dispersion of the present disclosure is preferably substantially free from a fluorine-containing surfactant. The term "substantially free of fluorine-containing surfactant" in the fluoropolymer aqueous dispersion of the present disclosure means that the fluorine-containing surfactant is 10 ppm or less based on the fluoropolymer. The content of the fluorine-containing surfactant is preferably 1 ppm or less, more preferably 100 ppb or less, still more preferably 10 ppb or less, further preferably 1 ppb or less, and particularly preferably the fluorine-containing surfactant is equal or below the detection limit as measured by liquid chromatography-mass spectrometry (LC/MS/MS).

The amount of the fluorine-containing surfactant can be determined by a known method. For example, it can be determined by LC/MS/MS analysis. First, the resulting aqueous dispersion is extracted into an organic solvent of methanol, and the extracted liquid is subjected to LC/MS/MS analysis. Then, the molecular weight information is extracted from the LC/MS/MS spectrum to confirm agreement with the structural formula of the candidate surfactant.

Thereafter, aqueous solutions having five or more different concentration levels of the confirmed surfactant are prepared, and LC/MS/MS analysis is performed for each concentration level to prepare a calibration curve with the area.

The resulting aqueous dispersion is subjected to Soxhlet extraction with methanol, and the extracted liquid is subjected to LC/MS/MS analysis for quantitative measurement.

That is, the content of the fluorine-containing surfactant can be quantified by, for example, LC/MS/MS analysis. First, extraction is performed by adding methanol to the aqueous dispersion, and the obtained extracted liquid is subjected to LC/MS/MS analysis. In order to further improve the extraction efficiency, treatment by Soxhlet extraction, ultrasonic treatment or the like may be performed. The molecular weight information is extracted from the LC/MS/MS spectrum to confirm agreement with the structural formula of the candidate fluorine-containing surfactant. Thereafter, aqueous solutions having five or more different concentration levels of the confirmed fluorine-containing surfactant are prepared, LC/MS/MS analysis is performed for each concentration level, and the relationship between the content and the area for the content is plotted to draw a calibration curve. Then, using the calibration curve, the area of the LC/MS/MS chromatogram of the fluorine-containing surfactant in the extracted liquid can be converted into the content of the fluorine-containing surfactant.

The fluorine-containing surfactant is the same as those exemplified in the production method of the present disclosure. For example, the surfactant may be a fluorine atom-containing surfactant having, in the portion excluding the anionic group, 20 or less carbon atoms in total, may be a fluorine-containing surfactant having an anionic moiety having a molecular weight of 800 or less, and may be a fluorine-containing surfactant having a Log POW of 3.5 or less.

Examples of the anionic fluorine-containing surfactant include compounds represented by the general formula ($N^0$), and specific examples thereof include compounds represented by the general formula ($N^1$), compounds represented by the general formula ($N^2$), compounds represented by the general formula ($N^3$), compounds represented by the general formula ($N^4$), and compounds represented by the general formula ($N^5$). More specific examples thereof include a perfluorocarboxylic acid (I) represented by the general formula (I), an ω-H perfluorocarboxylic acid (II) represented by the general formula (II), a perfluoropolyethercarboxylic acid (III) represented by the general formula (III), a perfluoroalkylalkylenecarboxylic acid (IV) represented by the general formula (IV), a perfluoroalkoxyfluorocarboxylic acid (V) represented by the general formula (V), a perfluoroalkylsulfonic acid (VI) represented by the general formula (VI), an ω-H perfluorosulfonic acid (VII) represented by the general formula (VII), a perfluoroalkylalkylene sulfonic acid (VIII) represented by the general formula (VIII), an alkylalkylene carboxylic acid (IX) represented by the general formula (IX), a fluorocarboxylic acid (X) represented by the general formula (X), an alkoxyfluorosulfonic acid (XI) represented by the general formula (XI), a compound (XII) represented by the general formula (XII), and a compound (XIII) represented by the general formula (XIII).

The fluoropolymer aqueous dispersion obtained by the production method of the present disclosure and the fluoropolymer aqueous dispersion of the present disclosure may be concentrated or subjected to dispersion stabilization treatment to form a dispersion, or may be subjected to coagulation or aggregation, recovered, and dried to form a powder or other solid.

In the production method of the present disclosure, an aqueous dispersion containing the particles made of the fluoropolymer, the hydrocarbon surfactant, and the aqueous medium is usually obtained. In the aqueous dispersion, the particles made of the fluoropolymer are dispersed in an aqueous medium in the presence of the hydrocarbon surfactant.

The fluoropolymer aqueous dispersion may be any of a dispersion obtained by performing the step A on the aqueous dispersion obtained by the polymerization, a dispersion obtained by concentrating this aqueous dispersion or subjecting the aqueous dispersion to dispersion stabilization treatment, and an aqueous dispersion obtained by dispersing powder made of the fluoropolymer obtained through the step A into an aqueous medium in the presence of the hydrocarbon surfactant.

The hydrocarbon surfactant may be removed by the concentration operation.

The aqueous dispersion obtained by the production method of the present disclosure may also be subjected to a dispersion stabilization treatment without concentration depending on the application, to prepare an aqueous dispersion having a long pot life. Examples of the dispersion stabilizer used include the same as those described above.

Examples of the applications of the aqueous dispersion include, but are not limited to, those in which the aqueous dispersion is directly used, such as coating achieved by applying the aqueous dispersion to a substrate, drying the dispersion, and optionally firing the workpiece; impregnation achieved by impregnating a porous support such as nonwoven fabric or a resin molded article with the aqueous dispersion, drying the dispersion, and preferably firing the workpiece; and casting achieved by applying the aqueous dispersion to a substrate such as glass, drying the dispersion, optionally immersing the workpiece into water to remove the substrate and to thereby provide a thin film. Examples of such applications include aqueous dispersion-type coating materials, binders for electrodes, and water repellents for electrodes.

The aqueous dispersion may be used in the form of an aqueous coating material for coating by mixing with a known compounding agent such as a pigment, a thickener, a dispersant, a defoaming agent, an antifreezing agent, a film-forming aid, or by compounding another polymer compound.

In addition, the aqueous dispersion may be used for additive applications, for example, for a binder application for preventing the active material of an electrode from falling off, for a compound application such as a drip inhibitor, or for a dust suppression treatment application for preventing floating of sand, dust, and the like.

For the purpose of adjusting the viscosity of the aqueous dispersion or improving the miscibility with a pigment or filler, the aqueous dispersion may preferably contain an anionic surfactant. The anionic surfactant may be appropriately added to an extent that causes no problems from the economic and environmental viewpoints.

Examples of the anionic surfactant include non-fluorinated anionic surfactants and fluorine-containing anionic surfactants. Preferred are fluorine-free, non-fluorinated anionic surfactants, i.e., anionic hydrocarbon surfactants.

For the purpose of adjusting the viscosity, any known anionic surfactants may be used, for example, anionic surfactants disclosed in International Publication No. WO2013/146950 and International Publication No. WO2013/146947. Examples thereof include those having a saturated or unsaturated aliphatic chain having 6 to 40 carbon atoms, preferably 8 to 20 carbon atoms, and more preferably 9 to 13 carbon atoms. The saturated or unsaturated aliphatic chain may be either linear or branched, or may have a cyclic structure. The hydrocarbon may have aromaticity, or may have an aromatic group. The hydrocarbon may contain a hetero atom such as oxygen, nitrogen, or sulfur.

Examples of the anionic surfactants include alkyl sulfonates, alkyl sulfates, and alkyl aryl sulfates, and salts thereof; aliphatic (carboxylic) acids and salts thereof; and phosphoric acid alkyl esters and phosphoric acid alkyl aryl esters, and salts thereof. Of these, preferred are alkyl sulfonates, alkyl sulfates, and aliphatic carboxylic acids, or salts thereof.

Preferred examples of the alkyl sulfates or salts thereof include ammonium lauryl sulfate and sodium lauryl sulfate.

Preferred examples of the aliphatic carboxylic acids or salts thereof include succinic acid, decanoic acid, undecanoic acid, undecenoic acid, lauric acid, hydrododecanoic acid, or salts thereof.

The amount of the anionic surfactant added depends on the types of the anionic surfactant and other compounding agents, but is preferably 10 to 5,000 ppm based on the mass of the solid content of the fluoropolymer.

The lower limit of the amount of the anionic surfactant added is more preferably 50 ppm or more, still more preferably 100 ppm or more. Too small an amount of the anionic surfactant may result in a poor viscosity adjusting effect.

The upper limit of the amount of the anionic surfactant added is more preferably 3,000 ppm or less, still more preferably 2,000 ppm or less. Too large an amount of the anionic surfactant may impair mechanical stability and storage stability of the aqueous dispersion.

For the purpose of adjusting the viscosity of the aqueous dispersion, components other than the anionic surfactants, such as methyl cellulose, alumina sol, polyvinyl alcohol, and carboxylated vinyl polymers may also be added.

The aqueous dispersion may optionally contain other polymer compounds to an extent that does not impair the characteristics of the aqueous dispersion.

Examples of the other polymer compound include, but are not limited to, polyethylene oxide (dispersion stabilizer), polyethylene glycol, polyvinylpyrrolidone (dispersion stabilizer), phenol resin, urea resin, epoxy resin, melamine resin, polyester resin, polyether resin, silicone acrylic resin, silicone resin, silicone polyester resin, and polyurethane resin.

The fluoropolymer can be produced by washing and drying a coagulation product containing the fluoropolymer obtained by coagulation of the fluoropolymer aqueous dispersion. The surfactant, decomposition products and by-products of the surfactant by-produced by the surfactant, and residual monomers or the like may be collected from discharge water generated in the coagulation or the washing and/or from off gas generated in the drying, and then purified to reuse the surfactant, the decomposition products and by-products of the surfactant, and the residual monomers or the like by-produced by the surfactant. The collection and the purification may be performed by known methods, although not limited thereto. For example, such as the methods disclosed National Publication of International Patent Application No. 2011-520020, U.S. Patent Application Publication No. 2007/15937, U.S. Patent Application Publication No. 2007/25902, and U.S. Patent Application Publication No. 2007/27251. Specific examples of the methods are as follows.

An example of the method of collecting the surfactant, the decomposition products and by-products of the surfactant by-produced by the surfactant, the residual monomers, and the like from discharge water is a method in which the discharge water is brought into contact with adsorbent particles formed of ion exchange resin, activated carbon, silica gel, clay, zeolite, or the like, so that the particles are allowed to adsorb the surfactant and the others, and then the discharge water and the adsorbent particles are separated. Incinerating the adsorbent particles having adsorbed the surfactant and the others can prevent emission of the surfactant and the others into the environment.

Alternatively, the surfactant and the others may be removed and eluted by a known method from the ion exchange resin particles having adsorbed the surfactant and the others, and collected. For example, in the case of using anion exchange resin particles as the ion exchange resin particles, the surfactant and the others can be eluted by bringing a mineral acid into contact with an anion exchange resin. When a water-soluble organic solvent is added to the resulting eluate, the mixture is usually separated into two phases. Since the lower phase contains the surfactant and the others, it is possible to collect the surfactant and the others by collecting and neutralizing the lower phase. Examples of the water-soluble organic solvent include polar solvents such as alcohols, ketones, and ethers.

Other methods of collecting the surfactant and the others from ion exchange resin particles include a method of using an ammonium salt and a water-soluble organic solvent and a method of using an alcohol and, if necessary, an acid. In the latter method, ester derivatives of the surfactant and the others are generated, and they can easily be separated from the alcohol by distillation.

When the discharge water contains fluoropolymer particles and other solids, they are preferably removed before the discharge water and the adsorbent particles are brought into contact with each other. Examples of methods of removing the fluoropolymer particles and other solids include a method of adding an aluminum salt, for example, to deposit these components, and then separating the discharge water and the deposits, and an electrocoagulation method. The components may also be removed by a mechanical method, and examples thereof include a cross-flow filtration method, a depth filtration method, and a precoat filtration method.

From the viewpoint of productivity, the discharge water preferably contains the fluoropolymer in a non-agglomerated form in a low concentration, more preferably less than 0.4% by mass, and particularly preferably less than 0.3% by mass.

An example of the method of collecting the surfactant and the others from the off gas is a method in which a scrubber is brought into contact with deionized water, an alkaline aqueous solution, an organic solvent such as a glycol ether solvent, or the like to provide a scrubber solution containing the surfactant and the others. When the alkaline aqueous solution used is a highly concentrated alkaline aqueous solution, the scrubber solution can be collected in a state where the surfactant and the others are phase-separated, and thus the surfactant and the others can be easily collected and reused. Examples of the alkali compound include alkali metal hydroxides and quaternary ammonium salts.

The scrubber solution containing the surfactant and the others may be concentrated using a reverse osmosis membrane, for example. The concentrated scrubber solution usually contains fluoride ions. Still, the fluoride ions may be removed by adding alumina after the concentration so that the surfactant and the others can easily be reused. Alternatively, the scrubber solution may be brought into contact with adsorbent particles so that the adsorbent particles can adsorb the surfactant and the others, and thereby the surfactant and the others may be collected by the aforementioned method.

The surfactant and the others collected by any of the methods may be reused in the production of fluoropolymer.

EXAMPLES

Next, the production method of the present disclosure is described with reference to examples, but the production method of the present disclosure is not intended to be limited by these examples.

The parameters in the Examples and Comparative Examples were determined by the following methods.
Solid Content In an air dryer, 1 g of PTFE aqueous dispersion was dried at a condition of 150° C. for 60 minutes, and the ratio of the mass of the non-volatile matter to the mass of the aqueous dispersion (1 g) was expressed by percentage and taken as the solid concentration thereof.

Average Primary Particle Size

The average particle size was determined by dynamic light scattering. Measurement was performed by preparing a fluoropolymer aqueous dispersion adjusted to a fluoropolymer solid concentration of about 1.0% by mass using ELSZ-1000S (manufactured by Otsuka Electronics Co., Ltd.) at 25° C. with 70 measurement processes. The refractive index of the solvent (water) was 1.3328 and the viscosity of the solvent (water) was 0.8878 mPa·s.

The surfactant A used in Synthesis Example 1 is sodium 10-oxoundecyl sulfate.

Synthesis Example 1

To a reactor made of SUS with an internal volume of 6 L and equipped with a stirrer, 3,600 g of deionized degassed water, 180 g of paraffin wax, and 0.540 g of surfactant A were added. The reactor was sealed and the system was purged with nitrogen, so that oxygen was removed. The reactor was heated up to 90° C. and TFE was filled into the reactor such that the reactor was adjusted to 2.70 MPaG. Then, 0.031 g of ammonium persulfate (APS) and 1.488 g of disuccinic acid peroxide (DSP) serving as polymerization initiators were charged thereinto. TFE was charged so as to keep the reaction pressure constant at 2.70 MPaG. When 1650 g of TFE was charged, the stirring was stopped and the pressure was released until the reactor was adjusted to the atmospheric pressure. The reaction product was collected from the reactor and cooled so that the paraffin wax was separated, whereby a PTFE aqueous dispersion was obtained.

The solid content of the resulting PTFE aqueous dispersion was 31.7% by mass, and the average primary particle size was 357 nm.

In Examples 1 and 2 and Comparative Example 1 below, the brown PTFE aqueous dispersion obtained above was diluted and used after adjusting the solid content to 17.3% by mass.

Example 1

Pure water was added to 84.14 g of the PTFE aqueous dispersion (solid content: 17.3% by mass) obtained in Synthesis Example 1, diluted to 416.59 g, and the aqueous dispersion was filled in quartz cells 1 cm in length and 1 cm in width, and the lightness L* was measured by an X-rite colorimeter. The lightness L* at this time was 70.28.

In addition, water was distilled off from 37.3 g of the aqueous dispersion (dispersion in which the lightness L* was measured) using an evaporator, extracted with 5 g of heavy methanol, and $^1$H-NMR spectra were measured to confirm the presence of a peak derived from the surfactant A.

Pure water was added to 84.14 g of a brown PTFE aqueous dispersion (solid content 17.3% by mass), diluted to 416.59 g, and 0.72 g of a nonionic surfactant (T-Det A138, manufactured by Hacros Chemicals) was added to the aqueous dispersion.

As additional water, 0.072 g of a nonionic surfactant (T-Det A 138, manufactured by Hacros Chemicals) per 416.59 g of pure water was added, and the aqueous dispersion was brought into contact with an ultrafiltration membrane (made of polyacrylonitrile, inner diameter 800 μm, length 130 mm, molecular weight cutoff 50,000 Da, effective membrane area 170 cm$^2$) at a water pressure of 0.1 MPa and a temperature of 25° C., and ultrafiltration was performed. The flow rate at this time was 80 mL/min. Ultrafiltration was continued until 2,100 g of filtrate was finally eluted. As a result, 2.68% by mass of 812 g of white PTFE aqueous dispersion was obtained.

Further, to 40 g of the obtained PTFE aqueous dispersion, 38.9 g of methanol was added, centrifuged at 15000 r.p.m. for 30 minutes to precipitate the powder, and the powder was then vacuum dried at 40° C. for 4 hours.

Finally, 1.0 g of white powder was obtained.

In the same manner as the PTFE aqueous dispersion before ultrafiltration was performed, the PTFE aqueous dispersion after ultrafiltration was filled in quartz cells 1 cm in length and 1 cm in width, and the lightness L* was measured with an X-rite colorimeter. The lightness L* at this time was 97.98.

In addition, water was distilled off from 37.3 g of the aqueous dispersion (dispersion in which the lightness L* was measured) using an evaporator, extracted with 5 g of heavy methanol, and $^1$H-NMR spectra were measured. No peak derived from surfactant A was observed.

Example 2

The PTFE aqueous dispersion (solid content: 17.3% by mass) obtained in Synthesis Example 1 was filled in quartz cells 1 cm in length and 1 cm in width, and the lightness L* was measured by an X-rite colorimeter. The lightness L* at this time was 55.28.

In addition, water was distilled off from 5.78 g of the aqueous dispersion (dispersion in which the lightness L* was measured) using an evaporator, extracted with 5 g of heavy methanol, and $^1$H-NMR spectra were measured. A peak derived from the surfactant A was confirmed.

To 261.54 g of the brown PTFE aqueous dispersion (solid content: 17.3% by mass), 2.26 g of a nonionic surfactant (T-Det A138, manufactured by Hacros Chemicals) was added.

As additional water, 0.226 g of a nonionic surfactant (T-Det A 138, manufactured by Hacros Chemicals) per 261.54 g of pure water was added, and the aqueous dispersion was brought into contact with an ultrafiltration membrane (made of polyacrylonitrile, inner diameter 800 μm, length 130 mm, molecular weight cutoff 50,000 Da, effective membrane area 170 cm$^2$) at a water pressure of 0.1 MPa and a temperature of 25° C., and ultrafiltration was performed. The flow rate at this time was 80 mL/min, and the ultrafiltration was continued until 2100 g of the filtrate was finally eluted. As a result, 13.0% by mass of 345 g of white PTFE aqueous dispersion was obtained.

Further, to 40 g of the obtained PTFE aqueous dispersion, 34.8 g of methanol was added, centrifuged at 15000 r.p.m. for 30 minutes to precipitate the powder, and the powder was then vacuum dried at 40° C. for 4 hours.

Finally, 5.2 g of white powder was obtained.

In the same manner as the PTFE aqueous dispersion before ultrafiltration was performed, the PTFE aqueous dispersion after ultrafiltration was filled in quartz cells 1 cm in length and 1 cm in width, and the lightness L* was measured with an X-rite colorimeter. The lightness L* at this time was 98.32.

In addition, water was distilled off from 37.3 g of the aqueous dispersion (dispersion in which the lightness L* was measured) using an evaporator, extracted with 5 g of heavy methanol, and $^1$H-NMR spectra were measured. No peak derived from surfactant A was observed.

Example 3

An aqueous dispersion was obtained by emulsion polymerization using the surfactant A in the same manner as in Synthesis Example 1, and the aqueous dispersion was diluted to obtain a brown PTFE aqueous dispersion having an average primary particle size of about 220 nm and a solid content of 16.7% by mass.

The PTFE aqueous dispersion obtained by the emulsion polymerization was filled in quartz cells 1 cm in length and 1 cm in width, and the lightness L* was measured by an X-rite colorimeter. The lightness L* at this time was 57.28.

In addition, water was distilled off from 6.13 g of the aqueous dispersion (dispersion in which the lightness L* was measured) using an evaporator, extracted with 5 g of heavy methanol, and $^1$H-NMR spectra were measured. A peak derived from the surfactant A was confirmed.

To 130 g of a brown PTFE aqueous dispersion, 1.13 g of a nonionic surfactant (T-Det A138, manufactured by Hacros Chemicals) was added.

As additional water, 7.12 g of a nonionic surfactant (T-Det A 138, manufactured by Hacros Chemicals) per 1040 g of pure water was added, and the aqueous dispersion was brought into contact with a microfiltration membrane (made of polyethylene, inner diameter 0.7 mm, length 130 mm, average pore diameter 0.1 μm, effective membrane area 150 cm$^2$) at a water pressure of 0.1 MPa and a temperature of 25° C., and microfiltration was performed. The flow rate at this time was 80 mL/min. Microfiltration was continued until 1,050 g of filtrate was finally eluted. As a result, 11.0% by mass of 186.3 g of white PTFE aqueous dispersion was obtained.

Further, to 40 g of the obtained PTFE aqueous dispersion, 35.6 g of methanol was added, centrifuged at 15000 r.p.m. for 30 minutes to precipitate the powder, and the powder was then vacuum dried at 40° C. for 4 hours.

Finally, 4.4 g of white powder was obtained.

In the same manner as the PTFE aqueous dispersion before ultrafiltration was performed, the PTFE aqueous dispersion after ultrafiltration was filled in quartz cells 1 cm in length and 1 cm in width, and the lightness L* was measured with an X-rite colorimeter. The lightness L* at this time was 98.12.

In addition, water was distilled off from 6.13 g of the aqueous dispersion (dispersion in which the lightness L* was measured) using an evaporator, extracted with 5 g of heavy methanol, and $^1$H-NMR spectra were measured. A peak derived from the surfactant A was confirmed.

Comparative Example 1

To 180.0 g of the brown dispersion system (PTFE aqueous dispersion) obtained in Synthesis Example 1, 1.55 g of a nonionic surfactant (T-Det A138, manufactured by Hacros Chemicals) was added.

The aqueous dispersion was brought into contact with the filter paper (filter paper No. 4 for Kiriyama funnel (holding particles 1 μm)) at a temperature of 25° C., and filtration was performed.

As a result, 17.3% by mass of 186.3 g of brown PTFE aqueous dispersion was obtained.

Further, to 50 g of the obtained aqueous dispersion, 41.3 g of methanol was added, centrifuged at 15000 r.p.m. for 30 minutes to precipitate the powder, and the powder was then vacuum dried at 40° C. for 4 hours.

Finally, 8.6 g of a pale yellow powder was obtained.

The invention claimed is:
1. A method for producing a fluoropolymer aqueous dispersion, comprising a step A of subjecting a pre-treatment aqueous dispersion containing a fluoropolymer obtained by polymerization in the presence of a hydrocarbon surfactant to ultrafiltration, microfiltration, or dialysis membrane treatment, or a combination thereof,
wherein water is added to the pre-treatment aqueous dispersion while performing ultrafiltration, microfiltration, or dialysis membrane treatment, and
the ultrafiltration is performed using an ultrafiltration membrane having a molecular weight cutoff of $0.3 \times 10^4$ Da or more.

2. The production method according to claim 1, wherein the step A is performed at a temperature of 3° C. or higher.

3. The production method according to claim 1, wherein the ultrafiltration is performed using an ultrafiltration membrane having a molecular weight cutoff of $3.0 \times 10^4$ Da or more.

4. The production method according to claim 1, wherein the ultrafiltration is performed using an ultrafiltration membrane having a molecular weight cutoff of $4.0 \times 10^4$ Da or more.

5. The production method according to claim 1, wherein the ultrafiltration is performed using an ultrafiltration membrane having a molecular weight cutoff of $8.0 \times 10^4$ Da or more.

6. The production method according to claim 1, wherein the ultrafiltration is performed at a pressure of 0.01 MPa or higher.

7. The production method according to claim 1, comprising a step B of adding a hydrocarbon surfactant to the pre-treatment aqueous dispersion before the step A.

8. The production method according to claim 7, wherein the hydrocarbon surfactant added in the step B is a nonionic surfactant.

9. The production method according to claim 7, wherein the hydrocarbon surfactant added in the step B is at least one nonionic surfactant selected from the group consisting of a compound represented by the following general formula (i):

$$R^3\text{—O-}A^1\text{-H} \qquad (i)$$

wherein R3 is a linear or branched primary or secondary alkyl group having 8 to 18 carbon atoms, and A1 is a polyoxyalkylene chain, and a compound represented by the following general formula (ii):

$$R^4\text{-}C_6H_4\text{-O-}A^2\text{-H} \qquad (ii)$$

wherein R4 is a linear or branched primary or secondary alkyl group having 4 to 12 carbon atoms, and A2 is a polyoxyalkylene chain.

10. The production method according to claim 1, wherein the fluoropolymer is a polytetrafluoroethylene.

* * * * *